United States Patent
Zhang et al.

(10) Patent No.: US 12,159,444 B2
(45) Date of Patent: Dec. 3, 2024

(54) SYSTEMS AND METHODS FOR IMAGE PROCESSING BASED ON GRAYSCALE FEATURES

(71) Applicant: SHANGHAI UNITED IMAGING HEALTHCARE CO., LTD., Shanghai (CN)

(72) Inventors: Na Zhang, Shanghai (CN); Le Yang, Shanghai (CN); Chunhua Jiang, Shanghai (CN); Haihua Zhou, Shanghai (CN); Juan Feng, Shanghai (CN); Yan'ge Ma, Shanghai (CN); Shurui Zhao, Shanghai (CN); Wanli Teng, Shanghai (CN); Guanji Leng, Shanghai (CN); Yang Hu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 430 days.

(21) Appl. No.: 17/456,568

(22) Filed: Nov. 24, 2021

(65) Prior Publication Data

US 2022/0084305 A1 Mar. 17, 2022

Related U.S. Application Data

(63) Continuation of application No. PCT/CN2020/091969, filed on May 24, 2020.

(30) Foreign Application Priority Data

May 24, 2019 (CN) .......................... 201910441812.2
Sep. 6, 2019 (CN) .......................... 201910840699.5

(Continued)

(51) Int. Cl.
*G06V 10/50* (2022.01)
*G06T 7/00* (2017.01)
(Continued)

(52) U.S. Cl.
CPC ............ *G06V 10/50* (2022.01); *G06T 7/0012* (2013.01); *G06T 7/136* (2017.01); *G06V 10/56* (2022.01); *G06T 2207/20112* (2013.01)

(58) Field of Classification Search
USPC ...................................................... 382/173
See application file for complete search history.

(56) References Cited

U.S. PATENT DOCUMENTS

2008/0219568 A1* 9/2008 Sakai ...................... G06T 1/005
                                                                  382/232
2017/0032547 A1    2/2017 Dennerlein et al.
(Continued)

FOREIGN PATENT DOCUMENTS

CN         101114340 A      1/2008
CN         101430759 A      5/2009
(Continued)

OTHER PUBLICATIONS

International Search Report in PCT/CN2020/091969 mailed on Aug. 21, 2020, 4 pages.
(Continued)

*Primary Examiner* — Jacky X Zheng
(74) *Attorney, Agent, or Firm* — METIS IP LLC

(57) ABSTRACT

A method may include obtaining an image of a subject and determining a plurality of image blocks in the image. The method may also include extracting grayscale features from each of the plurality of image blocks and determining, based on the grayscale features, a segmentation threshold. The method may further include segmenting, based on the segmentation threshold, the image.

20 Claims, 27 Drawing Sheets

(30) Foreign Application Priority Data

Sep. 9, 2019 (CN) .......................... 201910850220.6
Oct. 22, 2019 (CN) .......................... 201911008158.2

(51) Int. Cl.
*G06T 7/136* (2017.01)
*G06V 10/56* (2022.01)

(56) References Cited

U.S. PATENT DOCUMENTS

| | | | |
|---|---|---|---|
| 2017/0039704 A1 | 2/2017 | Kasmi | |
| 2017/0301095 A1* | 10/2017 | Zhang | ........................ G06T 5/10 |
| 2020/0058112 A1 | 2/2020 | Wang | |
| 2020/0258225 A1 | 8/2020 | Zhang et al. | |

FOREIGN PATENT DOCUMENTS

| | | | | |
|---|---|---|---|---|
| CN | 103903254 A | | 7/2014 | |
| CN | 105118030 A | | 12/2015 | |
| CN | 105374025 A | | 3/2016 | |
| CN | 105447879 A | | 3/2016 | |
| CN | 107292815 A | | 10/2017 | |
| CN | 107564021 A | | 1/2018 | |
| CN | 107808381 A | | 3/2018 | |
| CN | 107945200 A | * | 4/2018 | ............. G06T 7/136 |
| CN | 108108739 A | | 6/2018 | |
| CN | 108682008 A | | 10/2018 | |
| CN | 108765421 A | | 11/2018 | |
| CN | 109060842 A | | 12/2018 | |
| CN | 109087357 A | | 12/2018 | |
| CN | 109299634 A | | 2/2019 | |
| CN | 109389653 A | | 2/2019 | |
| CN | 109447912 A | | 3/2019 | |
| CN | 109461148 A | | 3/2019 | |
| CN | 109741334 A | | 5/2019 | |
| CN | 109758170 A | | 5/2019 | |
| CN | 109870461 A | | 6/2019 | |
| CN | 110163857 A | | 8/2019 | |
| CN | 110570445 A | | 12/2019 | |
| JP | 2009043111 A | | 2/2009 | |

OTHER PUBLICATIONS

Written Opinion in PCT/CN2020/091969 mailed on Aug. 21, 2020, 5 pages.

First Office Action in Chinese Application No. 201910840699.5 mailed on Aug. 25, 2021, 18 pages.

First Office Action in Chinese Application No. 201910850220.6 mailed on Sep. 22, 2021, 12 pages.

First Office Action in Chinese Application No. 201910441812.2 mailed on Dec. 21, 2020, 16 pages.

Guo, Zhongyuan, Research on Infrared Image Detail Enhancement Method, China Excellent Doctoral and Master's Thesis Full-text Database (Master's) Information Technology Series, 2018, 68 pages.

Zhao, Lanfei et al., Image Enhancement Algorithm Based on Sub-Image Fusion, Systems Engineering and Electronics, 39(12): 2840-2848, 2017.

Han, Ping et al., Change Detection Algorithm of Polarimetric SAR Image Based on Joint Weighted Polarization Difference Degree, Journal of Signal Processing, 29(10): 1390-1397, 2013.

Yu, Bin et al., Image Processing Based on MATLAB and Genetic Algorithm, Xidian University Press, 2015, 9 pages.

Fang, Ziyan et al., Photogrammetry, Changjiang Press, 2012, 10 pages.

\* cited by examiner

|       |       |       |
|-------|-------|-------|
| 1/1 A | 1/2 B | 1/3 C |
| 2/1 D | 2/2 E | 2/3 F |
| 3/1 G | 3/2 H | 3/3 I |

FIG. 17A

|         |         |         |
|---------|---------|---------|
| 1/1 A-D | 1/2 B-E | 1/3 C-F |
| 2/1 D-G | 2/2 E-H | 2/3 F-I |

FIG. 17B

|         |         |
|---------|---------|
| 1/1 A-B | 1/2 B-C |
| 2/1 D-E | 2/2 E-F |
| 3/1 G-H | 3/2 H-I |

FIG. 17C

|  |  |  |
|---|---|---|
| 1/1<br>(\|A-B\|+\|A-D\|) | 1/2<br>(\|B-E\|+\|B-C\|) | 1/3<br>(\|C-F\|) |
| 2/1<br>(\|D-G\|+\|D-E\|) | 2/2<br>(\|E-H\|+\|E-F\|) | 2/3<br>(\|F-I\|) |
| 3/1<br>(\|G-H\|) | 3/2<br>(\|H-I\|) | 3/3<br>I |

FIG. 18A

|  |  |
|---|---|
| 1/1<br>(\|A-B\|+\|A-D\|) | 1/2<br>(\|B-E\|+\|B-C\|) |
| 2/1<br>(\|D-G\|+\|D-E\|) | 2/2<br>(\|E-H\|+\|E-F\|) |

$Intensity_H=0$  $Intensity_H=20$

Image 1  Image 2

$Intensity_L=0$  $Intensity_L=20$

Image 1  Image 2

SYSTEMS AND METHODS FOR IMAGE PROCESSING BASED ON GRAYSCALE FEATURES

CROSS-REFERENCE TO RELATED APPLICATIONS

This application is a continuation of International Application No. PCT/CN2020/091969, filed on May 24, 2020, which claims priority to Chinese Patent Application No. 201910840699.5, filed on Sep. 6, 2019, Chinese Patent Application No. 201910850220.6, filed on Sep. 9, 2019, Chinese Patent Application No. 201911008158.2, filed on Oct. 22, 2019, and Chinese Patent Application No. 201910441812.2, filed on May 24, 2019, the contents of each of which are hereby incorporated by reference.

TECHNICAL FIELD

The disclosure generally relates to medical systems and methods, and more particularly relates to medical systems and methods for image processing.

BACKGROUND

A medical imaging system, such as an X-ray imaging device has been widely used in clinical examinations and medical diagnoses in recent years. The X-ray imaging device (e.g., a digital radiography (DR), a computed tomography (CT) device, etc.) may scan an object using radiation rays and generate one or more images relating to the object. Before the screening and/or diagnosis of disease, one or more image processing operations may be performed on an image relating to the object. For example, an image segmentation operation may be performed to identify a target region (e.g., a breast region) and/or a background region from an image which may allow a detection range of a lesion within the target region and/or reduce an effect of the background region on the target region. As another example, an image equalization operation may be performed to equalize gray values in an image, thereby improving the contrast of the image. Thus, it is desired to provide systems and methods for image processing with improved accuracy and/or efficiency.

SUMMARY

According to a first aspect of the present disclosure, a system is provided. The system may include at least one storage device storing executable instructions, and at least one processor in communication with the at least one storage device. When executing the executable instructions, the at least one processor may cause the system to perform one or more of the following operations. The system may obtain an image of a subject and determine a plurality of image blocks in the image. The system may also extract grayscale features from each of the plurality of image blocks and determine, based on the grayscale features, a segmentation threshold. The system may further segment, based on the segmentation threshold, the image.

In some embodiments, to determine a plurality of image blocks in the image, the system may determine a first count of first lines along a first direction, determine a second count of second lines along a second direction; and divide, based on the first count of first lines and the second count of second lines, the image into the plurality of image blocks.

In some embodiments, the grayscale features may include a grayscale feature of a first type and a grayscale feature of a second type. And to determine, based on the grayscale features, a segmentation threshold, the system may determine, based on the grayscale features extracted from each of the plurality of image blocks, a relationship between the grayscale feature of the first type and the grayscale feature of the second type. The system may also determine, based on the relationship, the segmentation threshold.

In some embodiments, the grayscale feature of the first type may include a mean or median of gray values of pixels in an image block, and the grayscale feature of the second type may include a standard deviation or a variance of the gray values of the pixels in the image block.

In some embodiments, to determine a relationship between the grayscale feature of the first type and the grayscale feature of the second type, the system may determine, based on the grayscale features, a plurality of points in a coordinate system associated with the grayscale feature of the first type and the grayscale feature of the second type, coordinates of each of the plurality of points representing the grayscale features extracted from one of the plurality of image blocks; and determine, based on at least a portion of the plurality of points, the relationship between the grayscale feature of the first type and the grayscale feature of the second type using a fitting technique.

In some embodiments, the segmenting, based on the segmentation threshold, the image may include determining one or more target regions from the images.

In some embodiments, the fitting technique may be determined based on a count of the one or more target regions.

In some embodiments, the system may determine the at least a portion of the plurality of points by performing at least one of a downsampling operation or an operation for removing abnormal points.

In some embodiments, for removing abnormal points, the system may determine a range of grayscale features of the first type of the plurality of points and divide the range of the grayscale features of the first type into multiple sub-ranges. For each of the multiple sub-ranges, the system may determine a first mean of grayscale features of the second type of points each of whose grayscale feature of the first type is in the sub-range, and classify, based on the first mean, the points into multiple groups. The system may also determine a second mean of grayscale features of the second type of points in each of the multiple groups and determine, based on the second mean, the abnormal points.

In some embodiments, the multiple groups may include a first group and a second group. The first group may include points each of whose grayscale feature of the second type exceeds the first mean, and the second group may include points each of whose grayscale feature of the second type is less than the first mean. An abnormal point in the first group may include the grayscale feature of the second type that exceeds the second mean; and an abnormal point in the second group may include the grayscale feature of the second type that is less than the second mean.

In some embodiments, to determine, based on the relationship, the segmentation threshold, the system may determine, based on the relationship, a value of the grayscale feature of the first type when the grayscale feature of the second type is minimum or maximum, and designate the value of the grayscale feature of the first type as the segmentation threshold.

In some embodiments, the segmenting, based on the segmentation threshold, the image may include determining, based on the segmentation threshold, a target region that includes a representation of the subject.

In some embodiments, the system may determine a distribution of gray values of pixels in the target region, the distribution indicating a count of pixels corresponding to each gray value in the target region. The system may also determine, based on the distribution of the gray values of the pixels in the target region, a characteristic display parameter for the target region, and display, based on the characteristic display parameter, the image.

In some embodiments, the characteristic display parameter may include a window width or a window level for the target region.

In some embodiments, to determine, based on the distribution of the gray values of the pixels in the target region, the at least one of a window width or a window level for the target region, the system may perform an iterative process including a plurality of iterations. For each iteration of the iterative process, the system may determine an accumulated count of pixels in a current iteration by summing a count of pixels corresponding to a current gray value with an accumulated count of pixels determined in a prior iteration, and determine whether the accumulated count of pixels in the current iteration satisfies a current condition. In response to determining that the accumulated count of pixels in the current iteration does not satisfy the condition, the system may designate a gray value in the target region as the current gray value; and update the current condition. The system may terminate the iterative process until the accumulated count of pixels in the current iteration satisfies the current condition, and determine, based at least in part on the current gray value, the at least one of the window width or the window level for the target region.

In some embodiments, the distribution of the gray values of the pixels in the target region may include a grayscale histogram that includes a transverse axis denoting the gray values and a vertical axis denoting a count of pixels corresponding to each of the gray values.

In some embodiments, to perform an iterative process, the system may divide the grayscale histogram along the vertical axis into multiple intervals, each of the multiple intervals including a range of counts of pixels of certain gray values.

In some embodiments, the designating a gray value in the target region as the current gray value may include determining the gray value according to at least one of a first rule or a second rule. The first rule may relate to determining an interval from the multiple intervals from a bottom interval to a top interval along the vertical axis in sequence, and the second rule may relate to determining the gray value in the interval from two sides to a center of the transverse axis.

In some embodiments, the system may determine the gray value from gray values in the interval from a left side to the center of the transverse axis in sequence; or determine the gray value from the gray values in the interval from a right side to the center of the transverse axis in sequence when the current gray value is a maximum gray value that is less than a gray value corresponding to the center of the transverse axis in the one of the multiple intervals.

In some embodiments, to determine, based at least in part on the current gray value, the system may determine that the current gray value is located on the right side of the center of the transverse axis. The system may further designate the current gray value as a first end of the window width if the current gray value is located at the right side of the center of the transverse axis, and designate a gray value corresponding to a same interval as the current gray value that is located on the left side of the center of the transverse axis as a second end of the window width.

In some embodiments, to determine, based at least in part on the current gray value, the at least one of the window width or the window level for the target region, the system may determine that the current gray value is located on the right side of the center of the transverse axis. The system may also designate the current gray value as a first end of the window width if the current gray value is located at the right side of the center of the transverse axis, and designate a gray value corresponding to a same interval as the current gray value that is located on the left side of the center of the transverse axis as a second end of the window width.

In some embodiments, to determine, based at least in part on the current gray value, the at least one of the window width or the window level for the target region, the system may determine that the current gray value is located on a left side of the center of the transverse axis, designate the current gray value as a first end of the window width if the current gray value is located on the left side of the center of the transverse axis, and designate a gray value corresponding to a same interval as the current gray value as a second end of the window width, the second end of the window width being located on a right side of the center of the transverse axis.

In some embodiments, the current condition may include a count threshold.

In some embodiments, the updating the current condition may include decreasing, based on a range of the gray values in the grayscale histogram, a total count of pixels in the grayscale histogram, and an interval corresponding to the current gray value, and a count of the multiple intervals, the count threshold.

In some embodiments, to perform an iterative process, the system may divide the grayscale histogram along the transverse axis into multiple intervals, each of the multiple intervals including a range of gray values and a count of pixels corresponding to each gray value in the range.

In some embodiments, the designating a gray value in the target region as the current gray value may include determining the gray value according to at least one of a first rule or a second rule. The first rule may relate to determining an interval from the multiple intervals from two sides to a center of the transverse axis in sequence, and the second rule may relate to determining the gray value in the interval.

In some embodiments, the designating a gray value in the target region as the current gray value may include determining the gray value from gray values in a first interval of the multiple intervals from a left side to the center of the transverse axis in sequence, or determining the gray value from gray values in a second interval of the multiple intervals from a right side to the center of the transverse axis when the current gray value is a maximum gray value in the first interval.

According to another aspect of the present disclosure, a method is provided. The method may include obtaining an image of a subject and determining a plurality of image blocks in the image. The method may also include extracting grayscale features from each of the plurality of image blocks and determining, based on the grayscale features, a segmentation threshold. The method may further include segmenting, based on the segmentation threshold, the image.

According to another aspect of the present disclosure, a non-transitory computer readable medium is provided. The non-transitory computer readable medium storing instructions, the instructions, when executed by a computer, may cause the computer to implement a method. The method may include obtaining an image of a subject and determining a plurality of image blocks in the image. The method may also include extracting grayscale features from each of the plurality of image blocks and determining, based on the grayscale features, a segmentation threshold. The method may further include segmenting, based on the segmentation threshold, the image.

According to another aspect of the present disclosure, a system is provided. The system may include an acquisition module configured to obtain an image of a subject, an image block determination module configured to determine a plurality of image blocks in the image, a grayscale feature extraction module configured to extract grayscale features from each of the plurality of image blocks, a segmentation threshold determination module configured to determine, based on the grayscale features, a segmentation threshold, and a segmentation threshold configured to segment, based on the segmentation threshold, the image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein:

FIG. 17A is a schematic diagram illustrating an exemplary first image according to some embodiments of the present disclosure;

FIG. 17B shows a first operation image of the first image as shown in FIG. 1A7A according to some embodiments of the present disclosure;

FIG. 17C shows a second operation image of the first image as shown in FIG. 1A7A according to some embodiments of the present disclosure;

FIGS. 18A-18B show third images obtained based on the first operation image and the second operation image obtained in FIG. 1A7B and FIG. 1A7C according to some embodiments of the present disclosure;

DETAILED DESCRIPTION

Figure 1A:
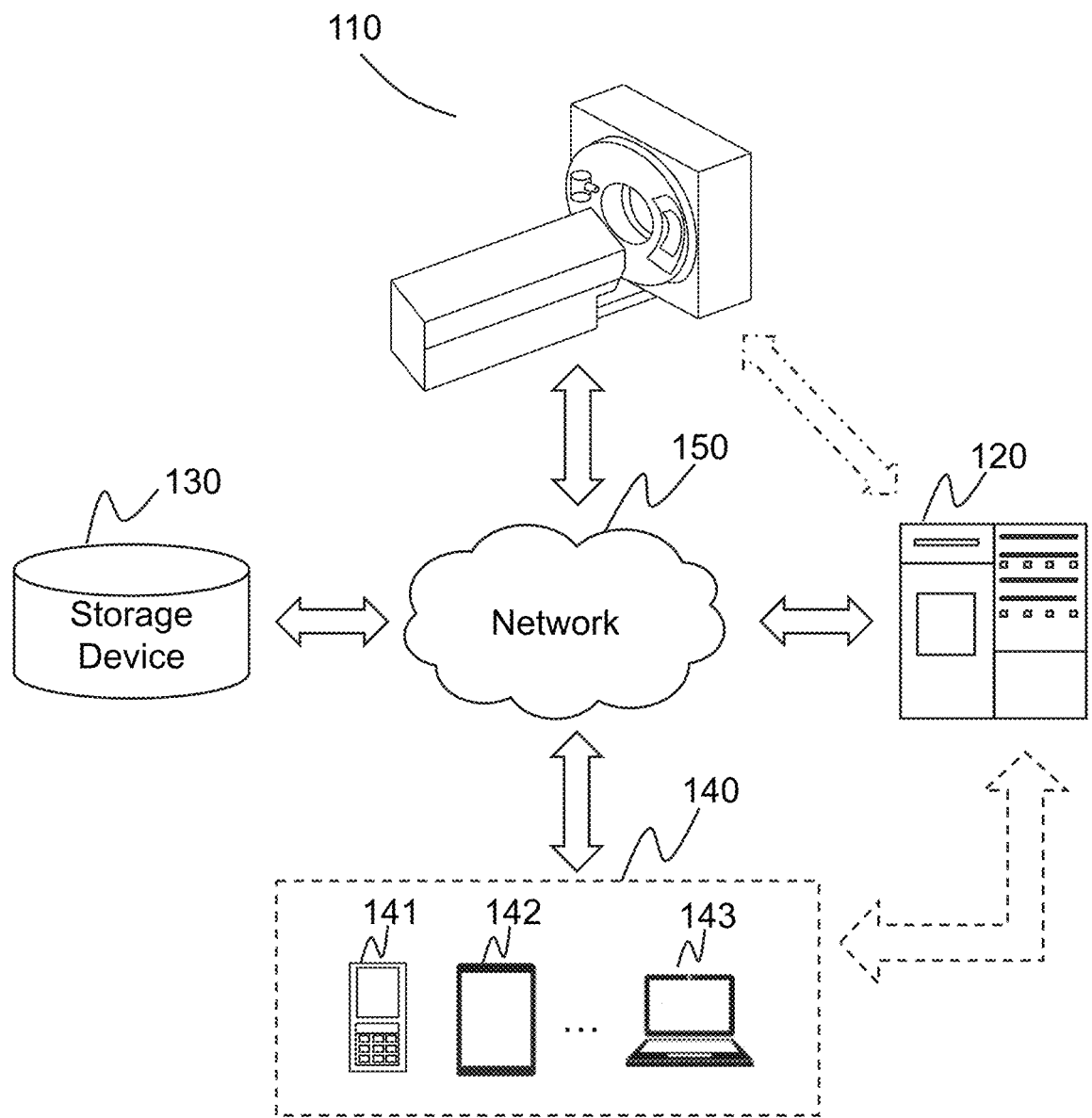
FIG. 1A is a schematic diagram illustrating an exemplary system for processing image according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description regarding the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

FIG. 1A is a schematic diagram illustrating an exemplary medical system according to some embodiments of the present disclosure. In some embodiments, the medical system 100 may be a single-modality system or a multi-modality system. Exemplary single-modality systems may include a magnetic resonance (MR) system, an X-ray mammography system, a digital X radiographic system (e.g., a computed tomography (CT) system, a digital radiography (DR) system, etc.), a positron emission tomography (PET)

system, a single-photon emission computed tomography (SPECT) system, etc. Exemplary X-ray mammography system may include a breast dry plate X-ray photography system, a film-screen mammography system, a digital radiography (DR) system (e.g. a full-field digital mammography (FFDM), a digital breast tomosynthesis (DBT) system, a phase contrast mammography (PCM) system, a computed radiography (CR) system, a multi-modality system, or the like, or a combination thereof. Exemplary multi-modality systems may include an MR-CT system, a PET-CT system, etc. In some embodiments, the medical system 100 may include modules and/or components for performing imaging and/or related analysis. It should be noted that the descriptions of an imaging system in the present disclosure are merely provided for illustration, and not intended to limit the scope of the present disclosure.

Merely by way of example, as illustrated in FIG. 1A, the medical system 100 may include a medical device 110, a processing device 120, a storage device 130, one or more terminals 140, and a network 150. The components in the medical system 100 may be connected in one or more of various ways. Merely by way of example, the medical device 110 may be connected to the processing device 120 through the network 150. As another example, the medical device 110 may be connected to the processing device 120 directly as illustrated in FIG. 1A. As a further example, the terminal(s) 140 may be connected to another component of the medical system 100 (e.g., the processing device 120) via the network 150. As still a further example, the terminal(s) 140 may be connected to the processing device 120 directly as illustrated by the dotted arrow in FIG. 1A. As still a further example, the storage device 130 may be connected to another component of the medical system 100 (e.g., the processing device 120) directly as illustrated in FIG. 1A, or through the network 150.

The medical device 110 may be configured to acquire image data relating to at least one part of a subject. For example, the medical device 110 may be configured to scan an object using radiation rays and generate imaging data used to generate one or more images relating to the object. In some embodiments, the medical device 110 may transmit the imaging data to the processing device 120 for further processing (e.g., generating one or more images). In some embodiments, the imaging data and/or the one or more images associated with the object may be stored in the storage device 130 and/or the processing device 120.

In some embodiments, the medical device 110 may be a CT scanner, a suspended X-ray imaging device, a DR scanner (e.g., a mobile digital X-ray imaging device), a digital subtraction angiography (DSA) scanner, a dynamic spatial reconstruction (DSR) scanner, an X-ray microscopy scanner, a multimodality scanner, or the like, or a combination thereof. Exemplary multi-modality scanners may include a computed tomography-positron emission tomography (CT-PET) scanner, a computed tomography-magnetic resonance imaging (CT-MRI) scanner, etc. The object may be biological or non-biological. Merely by way of example, the object may include a patient, a man-made object, etc. As another example, the object may include a specific portion, organ, and/or tissue of a patient. For example, the object may include the head, the brain, the neck, a body, a shoulder, an arm, the thorax, the heart, the stomach, blood vessels, soft tissues, a knee, feet, or the like, or any combination thereof.

The processing device 120 may process data and/or information obtained from the medical device 110, the terminal(s) 140, and/or the storage device 130. In some embodiments, the processing device 120 may acquire an image and perform image segmentation on the image. For example, the processing device 120 may determine a plurality of image blocks in the image and extract grayscale features from each of the plurality of image blocks. The processing device 120 may further determine a segmentation threshold based on the grayscale features and segment the image based on the segmentation threshold. As another example, the processing device 120 may determine a first segmentation threshold based on the image and determine a second segmentation threshold based on the first segmentation threshold and gray values of pixels in the image. The processing device 120 may further segment the image based on the second segmentation threshold.

In some embodiments, the processing device 120 may perform an image equalization operation on the image. For example, the processing device 120 may determine, based on the image of the subject, a first image and a second image, the first image representing low-frequency information in the image, and the second image representing high-frequency information in the image. The processing device 120 may determine multiple ranges of gray values represented in the first image and determine, based at least in part on the multiple ranges of the gray values of the pixels in the first image, a local transform model. The processing device 120 may determine a third image by processing the first image using the local transform model and determine, based on the third image and the second image, an equalized image of the subject.

In some embodiments, the processing device 120 may determine a type of the image. For example, the processing device 120 may obtain a first image and obtain a second image based on the first image. The processing device 120 may determine one or more image blocks in the second image. The processing device 120 may further determine at least one statistic result associated with a pixel parameter of a type for pixels in each of the one or more image blocks. The processing device 120 further may determine a type of the first image based at least in part on the at least one statistic result.

In some embodiments, the processing device 120 may process an image using a trained machine learning model that is obtained by training a machine learning model using a plurality of training samples obtained from a sample set. The trained machine learning model used in the present disclosure (e.g., the trained machine learning model) may be updated from time to time, e.g., periodically or not, based on a sample set that is at least partially different from the original sample set from which the original trained machine learning model is determined. For instance, the trained machine learning model (e.g., the trained machine learning model) may be updated based on a sample set including new samples that are not in the original sample set. In some embodiments, the determination and/or updating of the trained machine learning model (e.g., the trained machine learning model) may be performed on a processing device, while the application of the trained machine learning model may be performed on a different processing device. In some embodiments, the determination and/or updating of the trained machine learning model (e.g., the trained machine learning model) may be performed on a processing device of a system different than the medical system 100 or a server different than a server including the processing device 120 on which the application of the trained machine learning model is performed. For instance, the determination and/or updating of the trained machine learning model (e.g., the trained machine learning model) may be performed on a first system of a vendor who provides and/or maintains such a machine learning model and/or has access to training samples used to determine and/or update the trained machine learning model, while the application of the trained machine learning model may be performed on a second system of a client of the vendor. In some embodiments, the determination and/or updating of the trained machine learning model (e.g., the trained machine learning model) may be performed online in response to a request for image generation. In some embodiments, the determination and/or updating of the trained machine learning model may be performed offline.

In some embodiments, the processing device 120 may be a computer, a user console, a single server or a server group, etc. The server group may be centralized or distributed. In some embodiments, the processing device 120 may be local or remote. For example, the processing device 120 may access information and/or data stored in the medical device 110, the terminal(s) 140, and/or the storage device 130 via the network 150. As another example, the processing device 120 may be directly connected to the medical device 110, the terminal(s) 140, and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 130 may store data, instructions, and/or any other information. In some embodiments, the storage device 130 may store data obtained from the terminal(s) 140 and/or the processing device 120. The data may include image data acquired by the processing device 120, algorithms and/or models for processing the image data, etc. For example, the storage device 130 may store image data (e.g., MR images, image data of the subject, etc.) acquired by the medical device 110. As another example, the storage device 130 may store one or more algorithms for processing the image data. In some embodiments, the storage device 130 may store data and/or instructions that the processing device 120 may execute or use to perform exemplary methods/systems described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the medical system 100 (e.g., the processing device 120, the terminal(s) 140, etc.). One or more components in the medical system 100 may access the data or instructions stored in the storage device 130 via the network 150. In some embodiments, the storage device 130 may be directly connected to or communicate with one or more other components in the medical system 100 (e.g., the processing device 120, the terminal(s) 140, etc.). In some embodiments, the storage device 130 may be part of the processing device 120.

The terminal(s) 140 may include a mobile device 141, a tablet computer 142, a laptop computer 143, or the like, or any combination thereof. In some embodiments, the mobile device 141 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 140 may be part of the processing device 120.

The network 150 may include any suitable network that can facilitate the exchange of information and/or data for the medical system 100. In some embodiments, one or more components of the medical device 110 (e.g., an MRI device), the terminal(s) 140, the processing device 120, the storage device 130, etc., may communicate information and/or data with one or more other components of the medical system 100 via the network 150. For example, the processing device 120 may obtain data from the medical device 110 via the network 150. As another example, the processing device 120 may obtain user instructions from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information.

It should be noted that the above description of the medical system 100 is merely provided for illustration, and not intended to limit the scope of the present disclosure. For persons having ordinary skills in the art, multiple variations and modifications may be made under the teachings of the present disclosure. For example, the assembly and/or function of the medical system 100 may be varied or changed according to specific implementation scenarios.

Figure 1B:
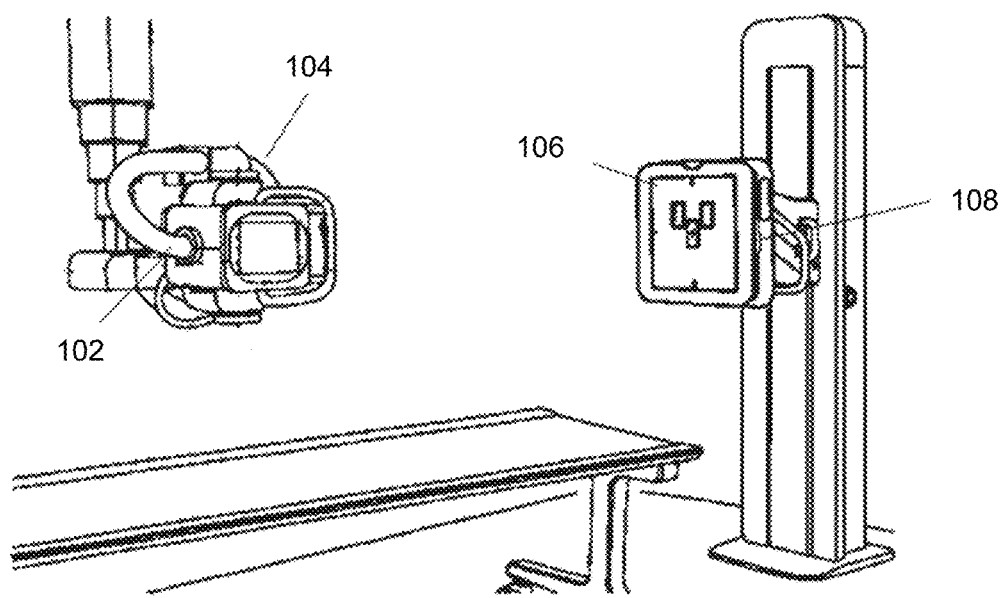
FIG. 1B is a schematic structural diagram illustrating an exemplary X-ray system for image segmentation according to some embodiments of the present disclosure.

FIG. 1B, is a schematic structural diagram illustrating an exemplary X-ray imaging device according to some embodiments of the present disclosure.

As shown in FIG. 1B, the X-ray medical device 110 may include a radiation source 102, a collimator 104, an electronic cassette 106, a detector 108, and a processing device (not shown in the figure).

The radiation source 102 may include a tube (not shown in FIG. 1B). The tube may generate and/or emit radiation beams travelling toward the object. The radiation may include a particle ray, a photon ray, or the like, or a combination thereof. In some embodiments, the radiation may include a plurality of radiation particles (e.g., neutrons, protons, electron, p-mesons, heavy ions), a plurality of radiation photons (e.g., X-ray, a y-ray, ultraviolet, laser), or the like, or a combination thereof. In some embodiments, the tube may include an anode target and a filament. The filament may be configured to generate electrons to bombard the anode target. The anode target may be configured to generate the radiation rays (e.g., X-rays) when the electrons bombard the anode target. The collimator 104 may be configured to control the irradiation region (i.e., radiation field) on the object. The collimator 104 may also be configured to adjust the intensity and/or the number of the radiation beams that irradiate on the object.

The detector 108 may detect radiation beams. For example, the detector 108 may convert the received radiation rays (e.g., X-rays) into visible light and convert the visible light into an analog electrical signal that represents the intensity of the received radiation rays (e.g., X-rays).

The electronic cassette 106 may include one or more electronic circuits configured to convert an analog electrical signal that represents the intensity of the received radiation rays (e.g., X-rays) to a digital signal and generate scan data (e.g., projection data) based on the digital signal.

The processing device may be the same as or similar to the processing device 120 as described in FIG. 1A. For example, the processing device 120 may determine a background region from an image acquired by the X-ray medical device 110.

Figure 2:
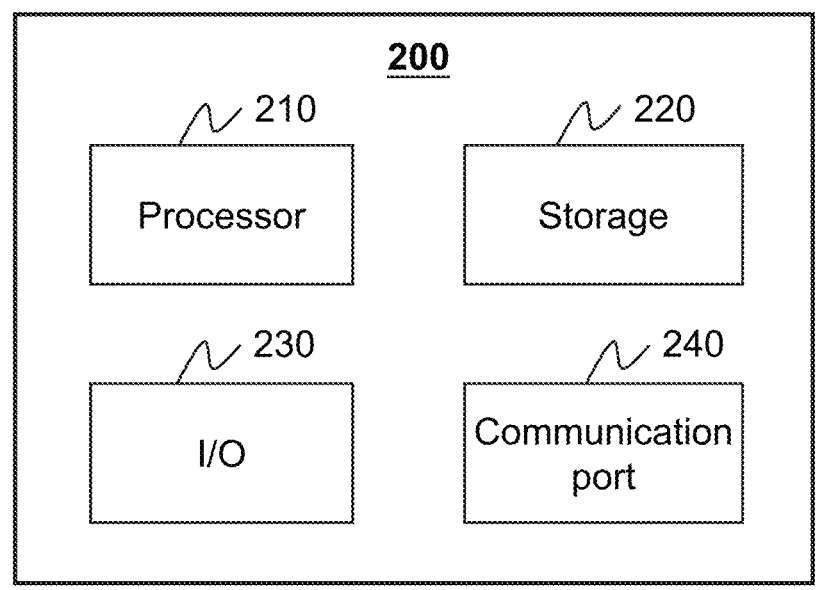
FIG. 2 is a schematic diagram illustrating hardware and/or software components of an exemplary computing device 200 on which the processing device 120 may be implemented according to some embodiments of the present disclosure.

FIG. 2 is a schematic diagram illustrating hardware and/or software components of an exemplary computing device 200 on which the processing device 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program codes) and perform functions of the processing device 120 in accordance with techniques described herein. The computer instructions may include, for example, routines, programs, objects, components, signals, data structures, procedures, modules, and functions, which perform particular functions described herein. For example, the processor 210 may process data obtained from the medical device 110, the terminal(s) 140, the storage device 130, and/or any other component of the medical system 100. Specifically, the processor 210 may process one or more measured data sets obtained from the medical device 110. For example, the processor 210 may generate an image based on the data set(s). In some embodiments, the generated image may be stored in the storage device 130, the storage 220, etc. In some embodiments, the generated image may be displayed on a display device by the I/O 230. In some embodiments, the processor 210 may perform instructions obtained from the terminal(s) 140. In some embodiments, the processor 210 may include one or more hardware processors, such as a microcontroller, a microprocessor, a reduced instruction set computer (RISC), an application-specific integrated circuit (ASIC), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the medical device 110, the terminal(s) 140, the storage device 130, or any other component of the medical system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the medical device 110, the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
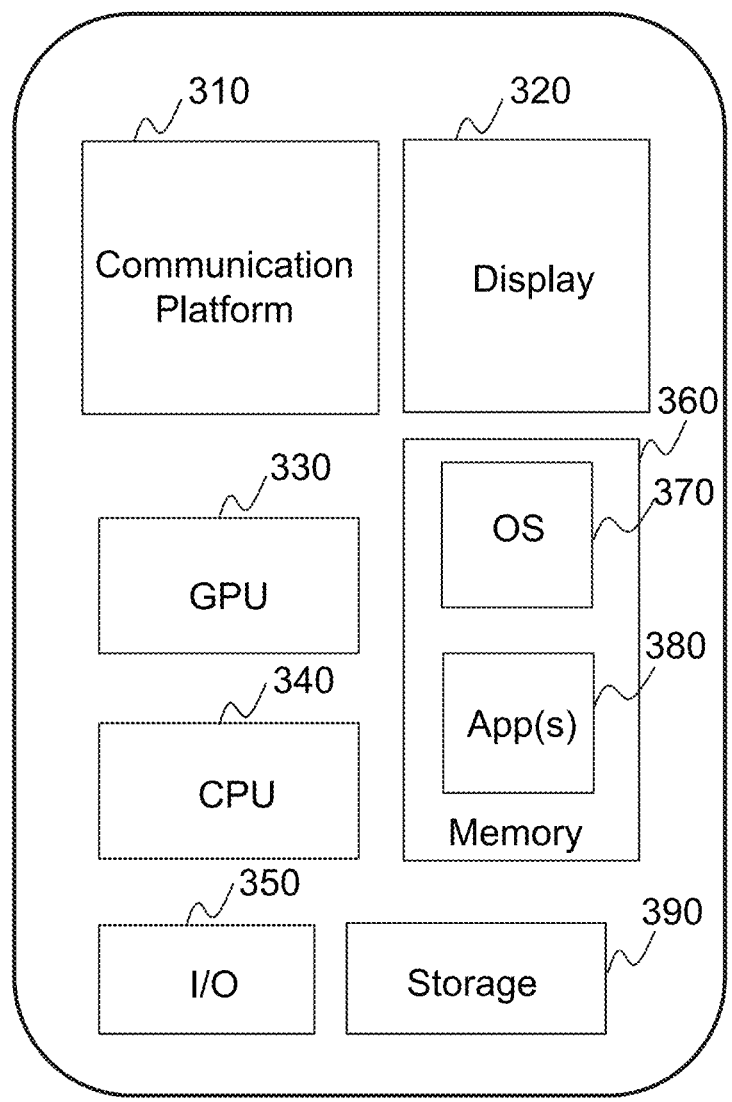
FIG. 3 is a schematic diagram illustrating hardware and/or software components of an exemplary mobile device 300 according to some embodiments of the present disclosure.

FIG. 3 is a schematic diagram illustrating hardware and/or software components of an exemplary mobile device 300 according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 to be executed by the CPU 340. The applications 380 may include a browser or any other suitable mobile apps for receiving and rendering information relating to image data acquisition or other information from the processing device 120. User interactions with the information stream may be achieved via the I/O 350 and provided to the processing device 120 and/or other components of the medical system 100 via the network 150.

To implement various modules, units, and functionalities described in the present disclosure, computer hardware platforms may be used as the hardware platform(s) for one or more of the elements described herein. The hardware elements, operating systems and programming languages of such computers are conventional, and it is presumed that those skilled in the art are adequately familiar therewith to adapt those technologies for image data acquisition as described herein. A computer with user interface elements may be used to implement a personal computer (PC) or another type of work station or terminal device, although a computer may also act as a server if appropriately programmed. It is believed that those skilled in the art are familiar with the structure, programming, and general operation of such computer equipment and as a result, the drawings should be self-explanatory.

Figure 4:
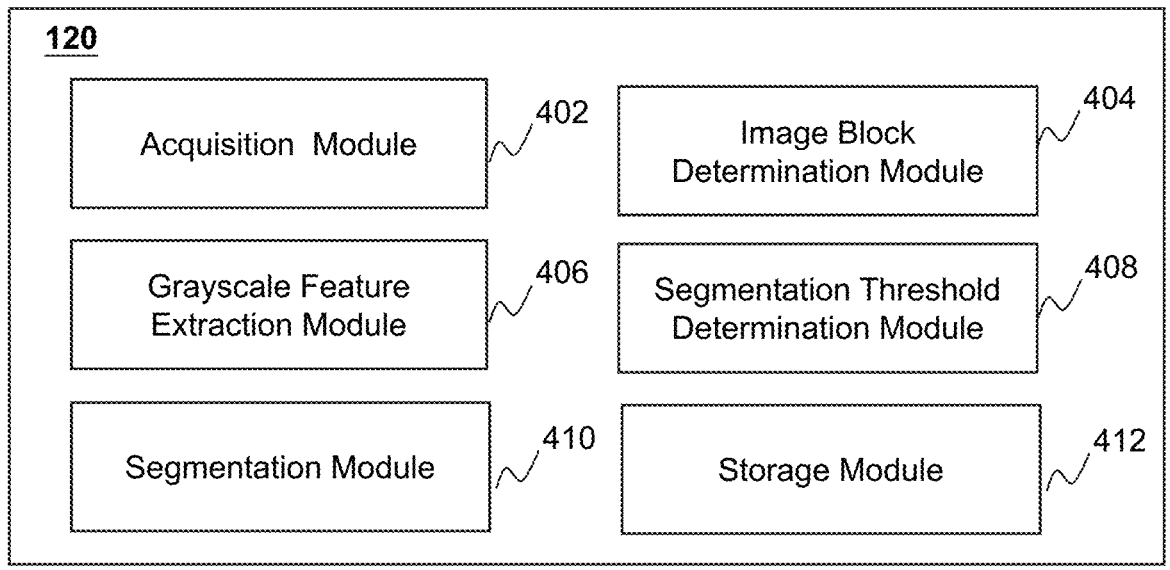
FIG. 4 is a schematic diagram illustrating an exemplary processing device for an image segmentation according to some embodiments of the present disclosure.

FIG. 4 is a schematic diagram illustrating an exemplary processing device for an image segmentation according to some embodiments of the present disclosure. As shown, the processing device 120 may include an acquisition module 402, an image block determination module 404, a grayscale feature extraction module 406, a segmentation threshold determination module 408, a segmentation module 410, and a storage module 412. In some embodiments, the acquisition module 402, the image block determination module 404, the grayscale feature extraction module 406, the segmentation threshold determination module 408, the segmentation module 410, and the storage module 412 may be connected to and/or communicate with each other via a wireless connection (e.g., a network), a wired connection, or a combination thereof.

The acquisition module 402 may be configured to obtain information related to an image. The image may include a medical image. For example, the image may include a DR image, an MR image, a PET image, a CT image, etc. As another example, the subject may include a breast. In some embodiments, the acquisition module 402 may obtain the image from the storage device 130, the storage module 412, a local storage device (e.g., a storage device implemented on the terminal device(s) 140 or the medical device 110) or other storage devices that be in communication with the processing device 120. In some embodiments, the acquisition module 402 may obtain the image from an imaging device (e.g., the medical device 110).

The image block determination module 404 may be configured to determine a plurality of image blocks in the image. In some embodiments, the image block determination module 404 may determine a first count of first lines (also referred to as first division lines) along a first direction and a second count of second lines (also referred to as second division lines) along a second direction. In some embodiments, the image block determination module 404 may divide the image into the plurality of image blocks based on the first count of first lines and the second count of second lines.

The grayscale feature extraction module 406 may be configured to extract grayscale features from each of the plurality of image blocks. As used herein, a grayscale feature extracted from an image block may refer to a statistic associated with gray values of pixels in the image block. Exemplary statistics associated with gray values of pixels in an image block may include a mean, a median, a standard deviation, a variance, etc., of the gray values of the pixels in the image block.

In some embodiments, the grayscale features may include a grayscale feature of a first type and a grayscale feature of a second type. The grayscale feature of the first type associated with gray values of pixels in an image block may indicate a level or trend of the gray values of the pixels in the image block. The grayscale feature of the second type associated with gray values of pixels in an image block may indicate a deviation between each of the gray values of pixels in the image block and the grayscale feature of the first type (i.e., the level or trend of the gray values of the pixels in the image block).

The segmentation threshold determination module 408 may be configured to determine a segmentation threshold based on the grayscale features.

In some embodiments, the segmentation threshold determination module 408 may determine a relationship between the grayscale feature of the first type and the grayscale feature of the second type based on the grayscale features extracted from each of the plurality of image blocks. In some embodiments, the segmentation threshold determination module 408 may further determine the segmentation threshold based on the relationship.

In some embodiments, the segmentation threshold determination module 408 may determine, based on the relationship between the grayscale feature of the first type and the grayscale feature of the second type, a specific value of the grayscale feature of the first type when the grayscale feature of the second type is minimum or maximum locally or globally. In some embodiments, the segmentation threshold determination module 408 may designate the specific value of the grayscale feature of the first type as the segmentation threshold.

In some embodiments, the segmentation threshold determination module 408 may determine, based on the grayscale features, a plurality of points in a coordinate system associated with the grayscale feature of the first type and the grayscale feature of the second type. Coordinates of each of the plurality of points may represent the grayscale features extracted from one of the plurality of image blocks. In some embodiments, the segmentation threshold determination module 408 may determine, based on at least a portion of the plurality of points, the relationship between the grayscale feature of the first type and the grayscale feature of the second type using a fitting technique.

In some embodiments, the segmentation threshold determination module 408 may determine, based on gray features extracted from each of a plurality of image blocks in an image, a plurality of points in a coordinate system associated with the gray feature of a first type and the gray feature of a second type. In some embodiments, the segmentation threshold determination module 408 may determine at least a portion of the plurality of points by performing at least one of a downsampling operation or an operation for removing abnormal points. In some embodiments, the segmentation threshold determination module 408 may determine a relationship between the grayscale feature of the first type and the grayscale feature of the second type based on the at least a portion of the plurality of points. In some embodiments, the segmentation threshold determination module 408 may determine the segmentation threshold based on the relationship between the gray feature of the first type and the gray feature of the second type.

The segmentation module 410 may be configured to segment the image based on the segmentation threshold.

In some embodiments, the segmentation module 410 may segment the image by determining one or more regions from the image based on the segmentation threshold.

In some embodiments, the segmentation module 410 may determine the target region by comparing the gray values of the pixels in the image and the segmentation threshold. In some embodiments, the segmentation module 410 may further perform an image equalization operation on the image before segmenting the image.

The storage module 412 may be configured to store data, instructions, and/or any other information for an image segmentation. For example, the storage module 412 may store the image of the subject, data of the plurality of image blocks, the grayscale features, etc., extracted from the plurality of image blocks. In some embodiments, the storage module 412 may be the same as the storage device 130 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the image block determination module 404 and the grayscale feature extraction module 406 may be integrated into a single module. As another example, some other components/modules may be added into and/or omitted from the processing device 120.

Figure 5:
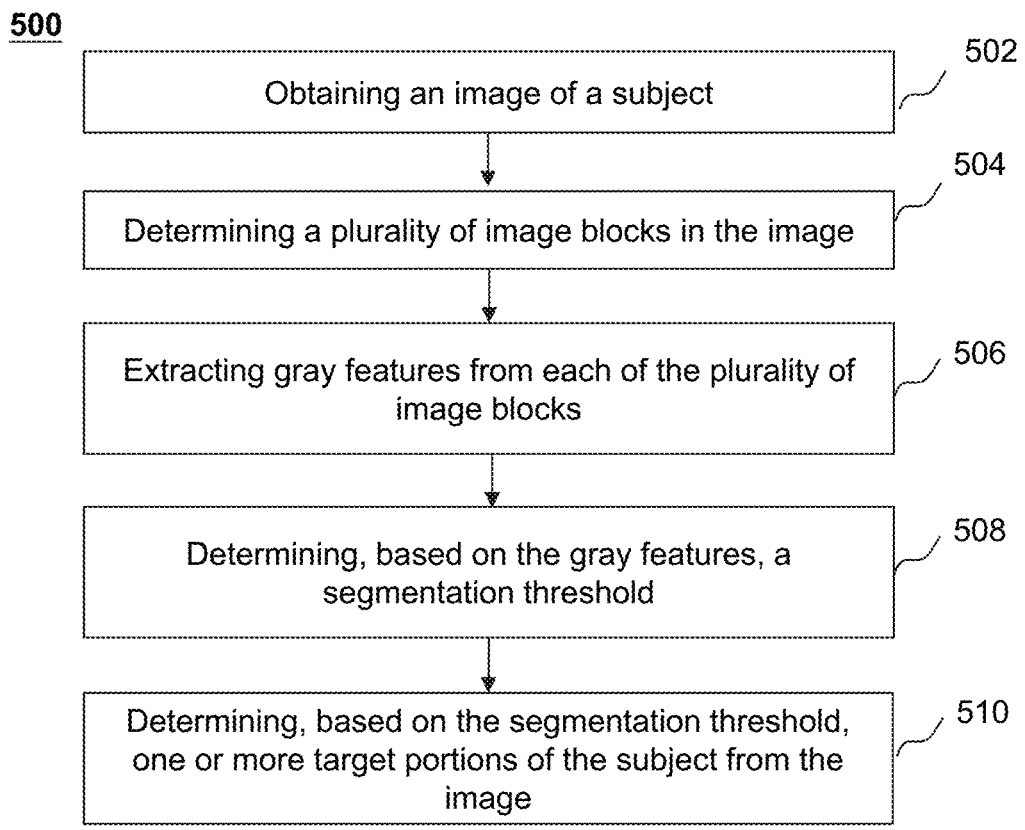
FIG. 5 is a flowchart illustrating an exemplary process for segmenting an image according to some embodiments of the present disclosure.

FIG. 5 is a flowchart illustrating an exemplary process for segmenting an image according to some embodiments of the present disclosure. In some embodiments, process 500 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the terminal 140, the processor 210, and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 illustrated in FIG. 5 and described below is not intended to be limiting.

Process 500 may be used to image segmentation, for example, image segmentation of a medical image (e.g., a digital X-ray image). As used herein, the image segmentation refers to classifying pixels in an image based on a pixel parameter of the type (e.g., a grayscale, a luminance, chrominance, etc.) and/or an image feature (e.g., a texture feature, a shape feature, a space feature, etc.), to distinguish different subjects represented in the image and/or distinguish background and the one or more subjects represented in the image. In some embodiments, the image segmentation may include segmenting or distinguishing a target region (e.g., a region representing at least a portion of a subject (e.g., a breast)) from a background region in an image (e.g., a medical image). In some embodiments, the image segmentation may include segmenting or distinguishing different regions representing different portions of the subject (e.g., tissues of different types), etc.

In 502, the processing device 120 (e.g., the acquisition module 402) may obtain an image of a subject may be obtained.

In some embodiments, the image may include a medical image. For example, the image may include a DR image, an MR image, a PET image, a CT image, etc. The subject may be biological or non-biological. For example, the subject may include a patient, a man-made object, etc. As another example, the subject may include a specific portion, organ, and/or tissue of a patient. As still another example, the subject may include a breast. More descriptions for the subject may be found elsewhere in the present disclosure (e.g., FIG. 1A and the descriptions thereof).

In some embodiments, the processing device 120 may obtain the image from the storage device 130, the storage module 412, a local storage device (e.g., a storage device implemented on the terminal device(s) 140 or the medical device 110) or other storage devices that be in communication with the processing device 120.

In some embodiments, the processing device 120 may obtain the image from an imaging device (e.g., the medical device 110). The imaging device may acquire the image after receiving an image acquisition instruction. The imaging device may include a digital X radiographic device (e.g., a DR device, a CT device, etc.). For example, in response to receiving the image acquisition instruction, a DR device may scan the subject via generating and emitting X-ray photons, and converting X-ray photons absorbed by the subject into scan data (e.g., projection data, the image) using an electronic cassette (e.g., the chest radiograph cassette 106 as shown in FIG. 1B). In some embodiments, the processing device 120 may reconstruct the image based on the scan data.

In 504, the processing device 120 (e.g., the image block determination module 404) may determine a plurality of image blocks in the image.

The sizes of at least two of the plurality of image blocks may be the same or different. For example, the plurality of image blocks may have the same size. The size of an image block may be defined by a length, a width, and/or an area of the image block, and/or a count of pixels in the image block.

In some embodiments, the processing device 120 may determine a first count of first lines (also referred to as first division lines) along a first direction and a second count of second lines (also referred to as second division lines) along a second direction. The processing device 120 may divide the image into the plurality of image blocks based on the first count of first lines and the second count of second lines. As used herein, a first line along the first direction refers to that the first line is parallel with the first direction. A second line along the second direction refers to that the second line is parallel with the second direction.

In some embodiments, the first direction may be perpendicular to the second direction. For example, the first direction may include a row direction of the image and the second direction may include a column direction of the image. As another example, the first direction may include a horizontal direction and the second direction may include a vertical direction.

In some embodiments, the first count and/or the second count may be set by a user or according to a default setting of the medical system 100. For example, the first count and/or the second count may be equal to 16, 32, 64, etc. The first count and the second count may be the same or different. For example, the first count and the second count may both be 32.

In some embodiments, the first count and/or the second count may be determined according to the size of the image. The size of the image may be defined by a length in the column direction of the image and/or a width in the row direction of the image. For example, if the first direction includes the row direction of the image, the processing device 120 may determine the first count based on the length of the image and determine the second count based on the width of the image. As another example, a relationship between the size of the image, the first count, and the second count may be obtained. The processing device 120 may determine the first count and the second count according to the relationship between the size of the image, the first count, and the second count. The relationship between the size of the image, the first count, and the second count may be set by a user or according to a default setting of the medical system 100. The processing device 120 may obtain the relationship between the size of the image, the first count, and the second count from the storage device 130, the storage module 412, etc. More descriptions for image block division may be found in FIG. 7 and the descriptions thereof.

In 506, the processing device 120 (e.g., the grayscale feature extraction module 406) may extract grayscale features from each of the plurality of image blocks. As used herein, a grayscale feature extracted from an image block may refer to a statistic associated with gray values of pixels in the image block. Exemplary statistics associated with gray values of pixels in an image block may include a mean, a median, a standard deviation, a variance, etc., of the gray values of the pixels in the image block.

In some embodiments, the grayscale features may include a grayscale feature of a first type and a grayscale feature of a second type. The grayscale feature of the first type associated with gray values of pixels in an image block may indicate a level or trend of the gray values of the pixels in the image block. The grayscale feature of the second type associated with gray values of pixels in an image block may indicate a deviation between each of the gray values of pixels in the image block and the grayscale feature of the first type (i.e., the level or trend of the gray values of the pixels in the image block).

In some embodiments, the grayscale feature of the first type of an image block may include a mean or median of gray values of pixels in the image block. The grayscale feature of the second type of the image block may include a standard deviation or a variance of the gray values of the pixels in the image block. For example, the grayscale feature of the first type of an image block may include a mean of pixel values in the image block and the grayscale feature of the second type of the image block may include a standard deviation of the pixel values in the image block.

In some embodiments, if the image represents a subject including one type of tissues (e.g., adipose tissue), the gray values of pixels in each image block may be close or similar, and no obvious boundary may exist in the image. The distribution of the grayscale features of the first type in the plurality of image blocks may be relatively concentrated, and the grayscale feature of the second type of each image block may be relatively smaller with respect to an image that represents one or more subjects including multiple types of tissues (e.g., adipose tissue and bone tissue). If the image represents one or more subjects including multiple types of tissues (e.g., adipose tissue and bone tissue), the gray values of pixels corresponding to different types of tissues may include a large difference, and one or more obvious boundaries may exist in the image. The grayscale feature of the second type of an image block may be smaller, and the distribution of the grayscale features of the first type of image blocks may be relatively decentralized with respect to an image that represents a subject including one type of tissues (e.g., adipose tissue).

In 508, the processing device 120 (e.g., the segmentation threshold determination module 408) may determine a segmentation threshold based on the grayscale features.

In some embodiments, the processing device 120 may determine a relationship between the grayscale feature of the first type and the grayscale feature of the second type based on the grayscale features extracted from each of the plurality of image blocks. The processing device 120 may further the segmentation threshold based on the relationship.

The relationship between the grayscale feature of the first type and the grayscale feature of the second type may provide a law that the grayscale feature of the second type changes with the grayscale feature of the first type. In some embodiments, the relationship between the grayscale feature of the first type and the grayscale feature of the second type may be presented in the form of a model, a function, a curve, etc., associated with the grayscale feature of the first type and the grayscale feature of the second type.

In some embodiments, the processing device 120 may determine, based on the relationship between the grayscale feature of the first type and the grayscale feature of the second type, a specific value of the grayscale feature of the first type when the grayscale feature of the second type is minimum or maximum locally or globally. The processing device 120 may designate the specific value of the grayscale feature of the first type as the segmentation threshold. For example, if the relationship between the grayscale feature of the first type and the grayscale feature of the second type is presented in the form of a curve, the processing device 120 may determine the specific value of the grayscale feature of the first type corresponding to a peak or a trough of the curve as the segmentation threshold.

In some embodiments, the processing device 120 may determine, based on the grayscale features, a plurality of points in a coordinate system associated with the grayscale feature of the first type and the grayscale feature of the second type. Coordinates of each of the plurality of points may represent the grayscale features extracted from one of the plurality of image blocks. The processing device 120 may determine, based on at least a portion of the plurality of points, the relationship between the grayscale feature of the first type and the grayscale feature of the second type using a fitting technique. More descriptions for determining the relationship between the grayscale feature of the first type and the grayscale feature of the second type may be found in FIG. 6, and the descriptions thereof.

In 510, the processing device 120 (e.g., the segmentation module 410) may segment the image based on the segmentation threshold.

In some embodiments, the processing device 120 may segment the image by determining one or more regions from the image based on the segmentation threshold. The one or more regions may include a background region and/or a target region including a representation of at least a portion of the subject. For example, the one or more regions may include the background region and/or a breast region.

In some embodiments, the processing device 120 may determine the target region by comparing the gray values of the pixels in the image and the segmentation threshold. For example, if a gray value of a pixel in the image exceeds the segmentation threshold, the processing device 120 may determine that the pixel belongs to the background region; if a gray value of a pixel is less than the segmentation threshold, the processing device 120 may determine that the pixel belongs to the target region (e.g., the breast region).

In some embodiments, the processing device 120 may further include performing an image equalization operation on the image before segmenting the image. More descriptions for image equalization may be found in FIGS. 22 and 25, and the descriptions thereof.

In some embodiments, the processing device 120 may further include determining one or more characteristic display parameters for displaying the image based on the determined target region in the image. More descriptions for determining one or more characteristic display parameters may be found in FIGS. 34 and 35, and the descriptions thereof.

According to some embodiments of the present disclosure, by dividing the image into multiple image blocks and extracting the grayscale features of each of the image blocks, the systems and methods may determine the segmentation threshold based on the grayscale features of each of the image block, which may improve the efficiency of segmentation threshold determination, thereby improving the efficiency of image segmentation. The segmentation threshold may be correlated with the grayscale features of each of the image blocks, which may improve the accuracy of the segmentation threshold, thereby improving the accuracy of image segmentation.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 502 and operation 504 may be combined into a single operation.

Figure 6:
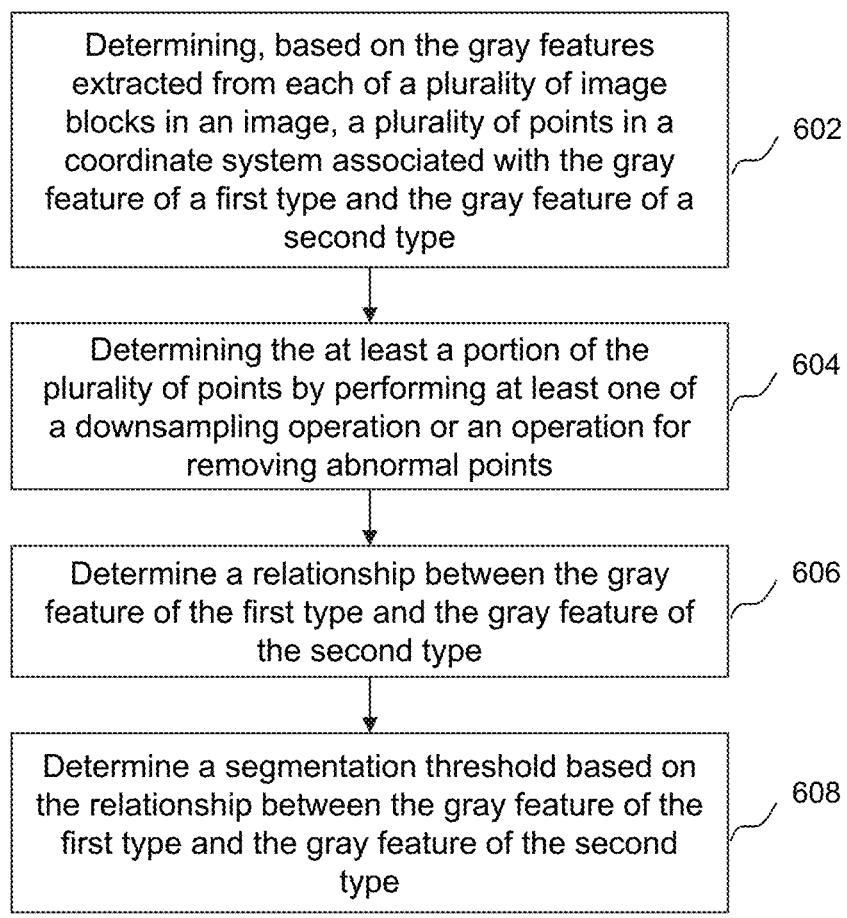
FIG. 6 is a flowchart illustrating an exemplary process for determining a relationship between grayscale features according to some embodiments of the present disclosure.

FIG. 6 is a flowchart illustrating an exemplary process for determining a segmentation threshold according to some embodiments of the present disclosure. In some embodiments, process 600 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the terminal 140, the processor 210, and/or the CPU 340 may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. Operation 508 may be performed according to process 600 as illustrated in FIG. 6.

In 602, the processing device 120 (e.g., the segmentation threshold determination module 408) may determine, based on gray features extracted from each of a plurality of image blocks in an image, a plurality of points in a coordinate system associated with the gray feature of a first type and the gray feature of a second type.

The gray features may be extracted from each of the plurality of image blocks in the image as described in connection with operation 506 as described in FIG. 5.

Each of the plurality of points may correspond to one of the plurality of image blocks. In some embodiments, the coordinates of each of the plurality of points may represent the grayscale features for one of the plurality of image blocks. For example, the coordinates of each of the plurality of points may represent the grayscale feature of the first type and the grayscale feature of the second type of an image block. As a further example, the coordinates of each of the plurality of points may represent a mean of gray values of pixels in an image block and a standard deviation of the gray values of the pixels in the image block.

In some embodiments, the coordinate system may include axes (denoted as an X-axis and a Y-axis) representing the grayscale feature of the first type and the grayscale feature of the second type. For example, if the X-axis represents the grayscale feature of the first type (e.g., the mean of gray values of pixels) and the Y-axis represents the grayscale feature of the second type (e.g., the standard deviation of gray values of pixels), the coordinates of a point may be denoted as (the grayscale feature of the first type, a grayscale feature of the second type), e.g., (the mean, the standard deviation). If the X-axis represents the grayscale feature of the second type (e.g., the standard deviation of gray values of pixels) and the Y-axis represents the grayscale feature of the first type (e.g., the mean of gray values of pixels), the coordinates of a point may be denoted as (the grayscale feature of the second type, the grayscale feature of the first type), e.g., (the standard deviation, the mean).

In some embodiments, the plurality of points in the coordinate system may be distributed in the coordinate system to form a feature scatter plot.

In 604, the processing device 120 (e.g., the segmentation threshold determination module 408) may determine at least a portion of the plurality of points by performing at least one of a downsampling operation or an operation for removing abnormal points.

In some embodiments, if the size of the image is large, the count of the plurality of image blocks may be large, and the grayscale features extracted from the plurality of image blocks may be more, which leads to a large number of the plurality of points in the coordinate system to be processed, thereby decreasing a computing speed or efficiency of for subsequent operations. Therefore, the processing device 120 may perform the downsampling operation on the plurality of points to decrease the count of points to be processed. By performing a downsampling operation, the processing device 120 may shorten the time-consuming for subsequent operations, which may improve the efficiency of image segmentation.

In some embodiments, the downsampling operation may be performed according to the distance between points among the plurality of points. For example, when the distance between the two points is less than a distance threshold, one of the two points may be retained and the other one may be removed. As another example, if multiple points are located in a region whose area is less than an area threshold, one of the multiple points may be retained and the others may be removed.

In some embodiments, since the image may be affected by various factors (e.g., the positioning of the subject or the scanning dose) during image acquisition, the image may include one or more pixels (e.g., noises) with abnormal gray values, which may lead to abnormal points in the plurality of points determined based on the grayscale features. A pixel with an abnormal gray value may also be referred to as an abnormal pixel, such as a noise pixel. Therefore, the processing device 120 may remove the abnormal points among the plurality of points, which may improve the accuracy of a segmentation threshold that is determined based on the plurality of points, and improve the robustness of image segmentation.

In some embodiments, the processing device 120 may determine a range of grayscale features of the first type (e.g., the means corresponding to the plurality of image blocks) of the plurality of points and divide the range of the grayscale features of the first type into multiple sub-ranges. For each of the multiple sub-ranges, the processing device 120 may determine a first mean of grayscale features of the second type of points each of whose grayscale feature of the first type is in the sub-range. The processing device 120 may classify the points into multiple groups based on the first mean and determine a second mean of grayscale features of the second type of points in each of the multiple groups. The processing device 120 may determine, based on the second mean, the abnormal points in each of the multiple groups.

In some embodiments, the processing device 120 may determine the range of grayscale features of the first type (e.g., the means corresponding to the plurality of image blocks) of the plurality of points based on a maximum value and a minimum value among the grayscale features of the first type (e.g., the means corresponding to the plurality of image blocks) of the plurality of points. The range of grayscale features of the first type may be from the maximum value to the minimum value among the grayscale features of the first type (e.g., the means corresponding to the plurality of image blocks) of the plurality of points.

In some embodiments, the count of the multiple sub-ranges may be set by a user or according to a default setting of the medical system 100. For example, the processing device 120 may determine the count of the multiple sub-ranges according to the range of the grayscale features of the first type. As a further example, the processing device 120 may obtain a relationship between the range of the grayscale features of the first type and the count of the multiple sub-ranges. The processing device 120 may determine the count of the multiple sub-ranges based on the relationship between the range of the grayscale features of the first type and the count of the multiple sub-ranges. In some embodiments, the count of the multiple sub-ranges may be 30, or 50, or 70, etc.

In some embodiments, the multiple groups may include a first group and a second group. The first group may include points each of whose grayscale feature of the second type exceeds the first mean. The second group may include points each of whose grayscale feature of the second type is less than the first mean. The processing device 120 may further determine the abnormal points based on the second mean and then remove the abnormal points. An abnormal point in the first group may include the grayscale feature of the second type that exceeds the second mean. An abnormal point in the second group may include the grayscale feature of the second type that is less than the second mean.

Accordingly, the processing device 120 may determine a point whose grayscale feature of the first type is deviated greatly from the first mean as an abnormal point. For example, in the first group, the grayscale feature of the first type of a point whose grayscale feature of the second type exceeds or equals the second mean may deviate greatly from the first mean. In the second group, the grayscale feature of the first type of a point whose grayscale feature of the second type is less than or equal to the second mean may deviate greatly from the first mean.

In some embodiments, after the abnormal points are removed based on the second mean, the retained points (also referred to as candidate points) may be further classified into multiple groups. The processing device 120 may determine a third mean of grayscale features of the second type of candidate points in each of the multiple groups. The processing device 120 may determine abnormal points based on the third mean, which may improve the accuracy of abnormal point determination.

In 606, the processing device 120 (e.g., the segmentation threshold determination module 408) may determine a relationship between the grayscale feature of the first type and the grayscale feature of the second type based on the at least a portion of the plurality of points.

In some embodiments, based on at least a portion of the plurality of points, the processing device 120 may determine the relationship between the grayscale feature of the first type and the grayscale feature of the second type using a fitting technique. Exemplary fitting techniques may include a linear fitting (e.g., a first-order linear fitting, a quadratic linear fitting, a cubic linear fitting, a polynomial curve fitting, etc.), a nonlinear fitting (e.g., the least square fitting), etc.

In some embodiments, the processing device 120 may determine the fitting technique based on a count of one or more target regions that need to be determined from the image. Each of the one or more target regions may include a representation of at least a portion of a subject (also referred to as a target portion) represented in the image. For example, for a breast image, the one or more regions may include a breast region including a representation of a breast and a pectoral region including a representation of at least a portion of a pectoral.

For example, if the count of one or more regions that need to be segmented from the image is large, e.g., exceeding a threshold, a complex fitting technique (e.g., a cubic linear fitting, a polynomial curve fitting, etc.) may be used to determine the relationship. As a further example, if the count of one or more regions that need to be segmented from the image is 2, the fitting technique may include a quadratic fitting; if the count of one or more regions that need to be segmented from the image exceeds 2, the fitting technique may include a complex fitting (e.g., a cubic linear fitting, a polynomial curve fitting, etc.) than the quadratic curve.

In 608, the processing device 120 (e.g., the segmentation threshold determination module 408) may determine a segmentation threshold based on the relationship between the gray feature of the first type and the gray feature of the second type. For example, the relationship may be denoted as a fitted curve. The value of the grayscale feature of the first type coordinate corresponding to a peak and/or trough of the fitted curve may be used as the gray segmentation threshold. In some embodiments, the value of the grayscale feature of the first type corresponding to the peak and/or trough point may be not within the range of grayscale features of the first type of the plurality of points, the processing device 120 may change the fitting technique and determine the relationship based on the changed fitting technique.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 7:
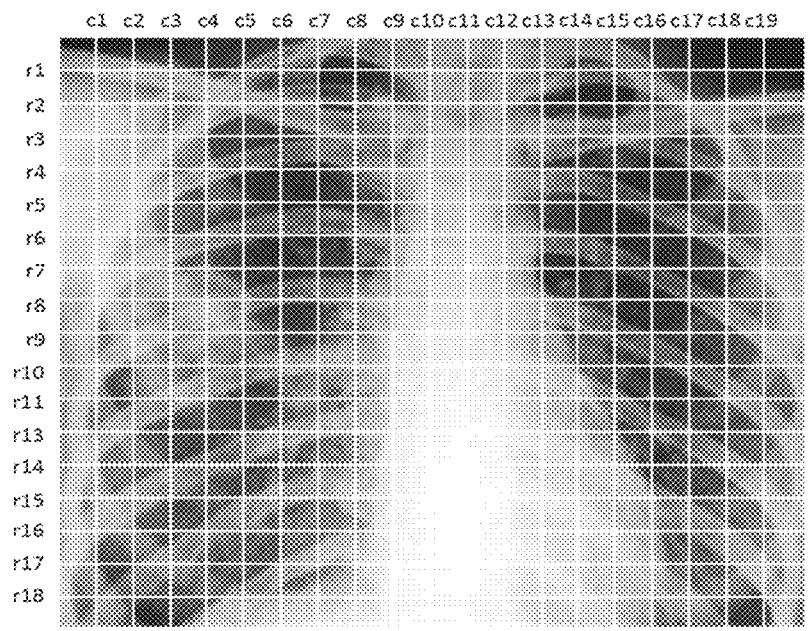
FIG. 7 is a schematic diagram illustrating exemplary image blocks in an image according to some embodiments of the present disclosure.

FIG. 7 is a schematic diagram illustrating exemplary image blocks in an image according to some embodiments of the present disclosure. As shown in FIG. 7, the image is a chest medical image. A first count of first lines along a first direction is 19, and the first lines are c1-c19. The first direction is the vertical direction or column direction. A first line may also be referred to as a column division line. A second count of second lines along a second direction is 18, and the second lines are r1-r18. The second direction is the horizontal direction or row direction. A second line may also be referred to as a row division line. The image is divided into multiple image blocks by the first lines and the second lines.

Figure 8:
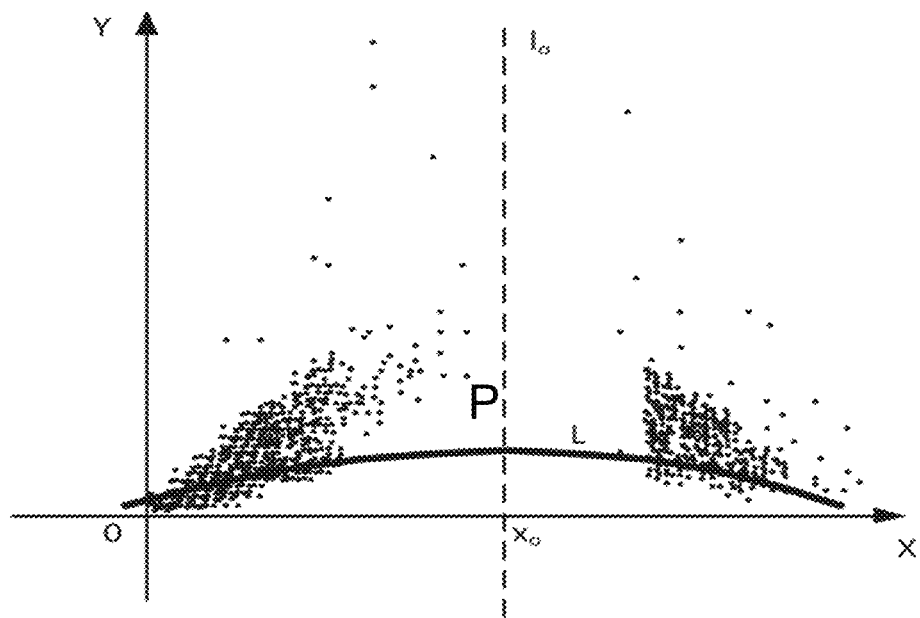
FIG. 8 is a schematic diagram illustrating an exemplary fitted curve using a quadratic fitting technique according to some embodiments of the present disclosure.

FIG. 8 is a schematic diagram illustrating an exemplary fitted curve using a quadratic fitting technique according to some embodiments of the present disclosure. As shown in FIG. 8, the X-axis of a coordinate system denotes the mean (i.e., the grayscale feature of the first type as described in FIG. 6) of gray values of pixels in an image block, and Y-axis denotes the standard deviation (i.e., the grayscale feature of the second type as described in FIG. 6) of gray values of pixels in an image block. The fitted curve L (i.e., quadratic curve L) is obtained by fitting a plurality of points associated with the grayscale features using the quadratic curve fitting. $I_0$ is the symmetry axis of the fitted curve L. The intersection point ($X_0$) of the $I_0$ and the X-axis is the abscissa of peak P of the quadratic curve L. And $X_0$ may be designated as a segmentation threshold.

Figure 9:
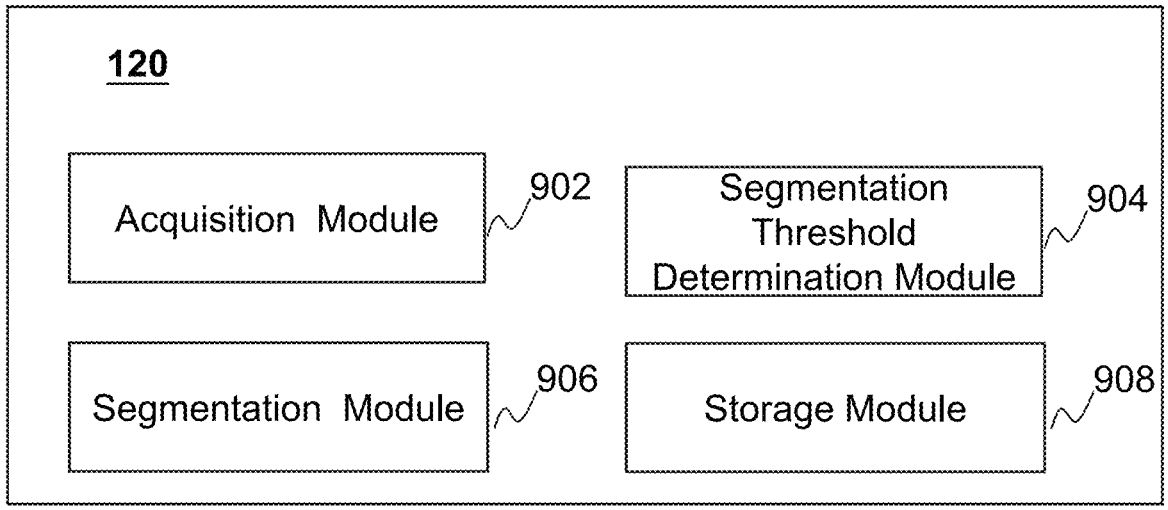
FIG. 9 is a schematic diagram illustrating an exemplary processing device for image segmentation according to some embodiments of the present disclosure.

FIG. 9 is a schematic diagram illustrating an exemplary processing device for image segmentation according to some embodiments of the present disclosure. As shown, the processing device 120 may include an acquisition module 902, a segmentation threshold determination module 904, a segmentation module 906, and a storage module 908. In some embodiments, the acquisition module 902, the segmentation threshold determination module 904, the segmentation module 906, and the storage module 908 may be connected to and/or communicate with each other via a wireless connection (e.g., a network), a wired connection, or a combination thereof.

The acquisition module 902 may be configured to obtain information related to an image. In some embodiments, the image may include a medical image. The image may include a medical image. For example, the image may include a DR image, an MR image, a PET image, a CT image, etc. As another example, the subject may include a breast. In some embodiments, the acquisition module 902 may obtain the image from the storage device 130, the storage module 908, a local storage device (e.g., a storage device implemented on the terminal device(s) 140 or the medical device 110) or other storage devices that be in communication with the processing device 120. In some embodiments, the acquisition module 902 may obtain the image from an imaging device (e.g., the medical device 110).

In some embodiments, the acquisition module 902 may obtain information related to a preprocessed image that is determined by performing a preprocessing operation on the image. The preprocessing operation may include a filtering operation, a smoothing operation, an enhancement operation, a suppression operation, a transform operation, or the like, or any combination thereof.

The segmentation threshold determination module 904 may be configured to determine one or more segmentation threshold. For example, the segmentation threshold determination module 904 may determine a first segmentation threshold based on the image. In some embodiments, the segmentation threshold determination module 904 may determine the first segmentation threshold according to operations a1 to a3. In operation a1, the segmentation threshold determination module 904 may obtain a plurality of candidate segmentation thresholds. In operation a2, the segmentation threshold determination module 904 may determine multiple segmentation results based on using each of the plurality candidate segmentation thresholds based on the image. In operation a3, the segmentation threshold determination module 904 may determine a first segmentation threshold based on the multiple segmentation results.

In some embodiments, the segmentation threshold determination module 904 may determine at least a portion of the plurality of candidate segmentation thresholds based on the gray values of the pixels in the image. Each of the at least a portion of the plurality of candidate segmentation thresholds may satisfy a condition. The condition may be set by a user or according to a default setting of the medical system 100. In some embodiments, the segmentation threshold determination module 904 may determine the condition based on the gray values and/or distribution of the gray values in the image.

In some embodiments, the segmentation threshold determination module 904 may obtain a segmentation result by classifying the pixels in the image (or the preprocessed image) into multiple groups based on a candidate segmentation threshold. In some embodiments, the segmentation threshold determination module 904 may determine the first segmentation threshold based on a portion of process 500. In some embodiments, the segmentation threshold determination module 904 may determine the first segmentation threshold using the Otsu algorithm.

In some embodiments, the segmentation threshold determination module 904 may divide gray values in the image that exceed the first segmentation threshold into multiple ranges. For each of the multiple ranges, the segmentation threshold determination module 904 may determine a count of pixels in the image whose gray values are in the range. The segmentation threshold determination module 904 may determine the second segmentation threshold based on the count of pixels whose gray values are in each of the multiple ranges. In some embodiments, the segmentation threshold determination module 904 may divide the gray values in the image that exceed the first segmentation threshold into multiple ranges by dividing a portion of the grayscale histogram of the image with gray values exceeding the first segmentation threshold into multiple intervals along an axis representing gray values.

In some embodiments, the segmentation threshold determination module 904 may determine a relationship between a mean of gray values of pixels and the count of the pixels whose gray values are in the each of the multiple ranges. The segmentation threshold determination module 904 may determine the second segmentation threshold based on the relationship between the mean of gray values of pixels and the count of the pixels whose gray values are in the each of the multiple ranges.

In some embodiments, the segmentation threshold determination module 904 may adjust the first segmentation threshold to the trough of the grayscale histogram by increasing the first segmentation threshold based on the grayscale histogram of the image when a horizontal coordinate in the grayscale histogram represents the gray value of each pixel in the image, and an ordinate coordinate in the grayscale histogram is the count of pixels with the same gray value.

In some embodiments, the segmentation threshold determination module 904 may determine first gray values from an image based on a segmentation threshold. In some embodiments, the segmentation threshold determination module 904 may determine a second gray value based on the first gray values. In some embodiments, the segmentation threshold determination module 904 may determine a target segmentation threshold based on the segmentation threshold and the second gray value.

The segmentation module 906 may be configured to segment the image based on the second segmentation threshold.

In some embodiments, the segmentation module 906 may determine a background region from the image based on the second segmentation threshold.

In some embodiments, the segmentation module 906 may determine the background region of the image based on the second segmentation threshold and the maximum gray value in the image (or the preprocessed image).

In some embodiments, the segmentation module 906 may determine first gray values in the image that exceed the second segmentation threshold, and determine a count of pixels with each of the first gray values. In some embodiments, the segmentation module 906 may identify a second gray value from the first gray values. A count of pixels with the second gray value may be maximum among the first gray values. In some embodiments, the segmentation module 906 may determine, based on the second segmentation threshold and the second gray value, the background region.

The storage module 908 may be configured to store data, instructions, and/or any other information for an image segmentation. For example, the storage module 908 may store the image of the subject, segmentation thresholds, etc.

In some embodiments, the storage module 908 may be the same as the storage device 130 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the segmentation threshold determination module 904 and the segmentation module 906 may be integrated into a single module. As another example, some other components/modules may be added into and/or omitted from the processing device 120.

Figure 10:
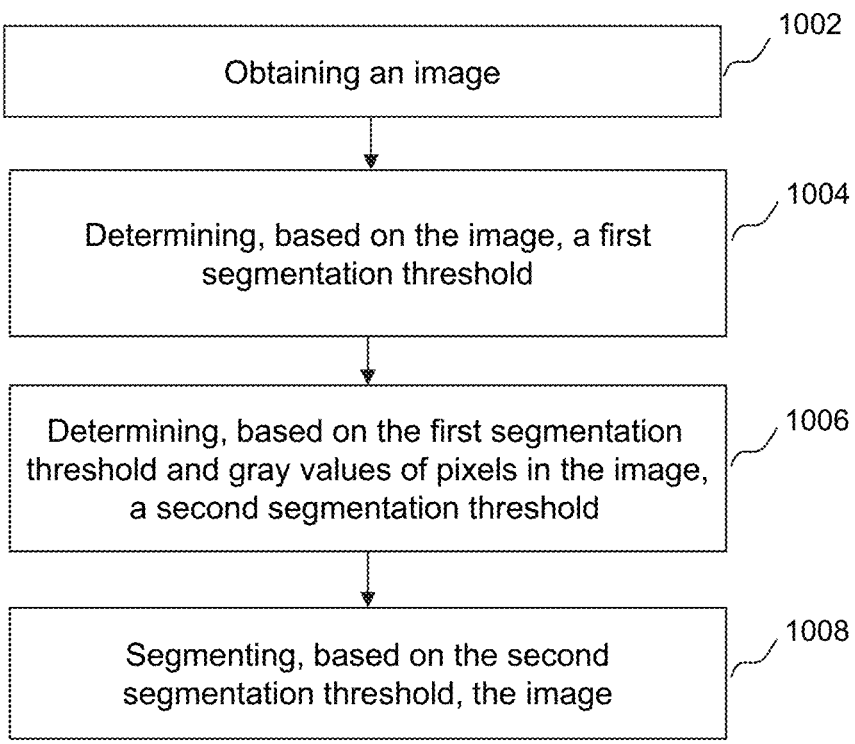
FIG. 10 is a flowchart illustrating an exemplary process for image segmentation according to some embodiments of the present disclosure.

FIG. 10 is a flowchart illustrating an exemplary process for image segmentation according to some embodiments of the present disclosure. In some embodiments, process 1000 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the terminal 140, the processor 210, and/or the CPU 340 may be configured to perform the process 1000. The operations of the illustrated process presented below are intended to be illustrative. In some embodiments, the process 1000 may be accomplished with one or more additional operations not described and/or without one or more of the operations discussed. Additionally, the order of the operations of the process 1000 illustrated in FIG. 10 and described below is not intended to be limiting.

In 1002, the processing device 120 (e.g., the acquisition module 902) may obtain an image.

In some embodiments, the image may include a medical image. For example, the image may include a DR image, an MR image, a PET image, a CT image, etc. The image may include a representation of a subject. The subject may be biological or non-biological. For example, the subject may include a specific portion, organ, and/or tissue of a patient. As another example, the subject may include a breast. More descriptions for the subject may be found elsewhere in the present disclosure (e.g., FIG. 1A and the descriptions thereof). The processing device 120 may obtain the image from the medical device 110, the storage device 130, or any storage device. More descriptions for the image may be found elsewhere in the present disclosure (e.g., FIG. 5, and the descriptions thereof).

In some embodiments, the image may include a plurality of pixels. Each of the plurality of pixels may be described using a pixel parameter of a type. The type of the pixel parameter may include a grayscale, a luminance, chrominance, etc. Each of the plurality of pixels in the image may correspond to a value of the pixel parameter of the type. For example, if the type of the pixel parameter includes the grayscale, each of the plurality of pixels in the image may correspond to a value of the grayscale (also referred to as gray value). If the type of the pixel parameter includes the chrominance, each of the plurality of pixels in the image may correspond to a value of the chrominance (also referred to as chrominance value). The image may be segmented based on the pixel parameter of the type of each of the plurality of pixels.

The following descriptions are provided with reference to the pixel parameter of the type as the grayscale unless otherwise stated. It is understood that this is for illustration purposes and not intended to be limiting. In some embodiments, the image may be in the form of a grayscale histogram. The grayscale histogram may present distribution of gray values of a plurality of pixels. For example, the grayscale histogram may present a count of pixels that correspond to the same gray value.

In some embodiments, the processing device 120 may perform a preprocessing operation on the image to obtain a preprocessed image. The preprocessing operation may include a filtering operation, a smoothing operation, an enhancement operation, a suppression operation, a transform operation, or the like, or any combination thereof. The processing device 120 may further segment the preprocessed image using each of the plurality candidate segmentation thresholds to obtain one of the multiple segmentation results.

In some embodiments, the processing device 120 may preprocess the image by smoothing the grayscale histogram of the image, and/or reduce the range of the grayscale histogram. For example, the maximum gray value in the grayscale histogram may be BMAX, and the minimum value may be BMIN. In the grayscale histogram, the pixels each of whose gray value exceeds 95% of BMAX and is less than 105% of BMIN may be removed from the grayscale histogram of the image. The smoothing of the grayscale histogram of the image may increase the efficiency for determining a second threshold in operation 1006.

In 1004, the processing device 120 (e.g., the segmentation threshold determination module 904) may determine a first segmentation threshold based on the image.

In some embodiments, the processing device 120 may determine the first segmentation threshold according to operations a1 to a3. In operation a1, the processing device 120 may obtain a plurality of candidate segmentation thresholds. In operation a2, the processing device 120 may determine multiple segmentation results based on using each of the plurality candidate segmentation thresholds based on the image. In operation a3, the processing device 120 (e.g., the segmentation threshold determination module 904) may determine a first segmentation threshold based on the multiple segmentation results.

In some embodiments, the processing device 120 may determine at least a portion of the plurality of candidate segmentation thresholds based on the gray values of the pixels in the image. Each of the at least a portion of the plurality of candidate segmentation thresholds may satisfy a condition. The condition may be set by a user or according to a default setting of the medical system 100. In some embodiments, the processing device 120 may determine the condition based on the gray values and/or distribution of the gray values in the image. For example, the condition may be such that a candidate segmentation threshold is less than a ratio of a total count of the pixels in the image to a total count of the gray values in the image (i.e., an average height of the grayscale histogram of the image). As another example, the condition may be that a candidate segmentation threshold exceeds a minimum gray value among the gray values in the image. As used herein, the total count of the gray values in the image refers to a count of gray values after deduplication in the image.

For instance, the processing device 120 may designate a portion of the gray values in the image as the at least a portion of the plurality of candidate segmentation thresholds. Each of the at least a portion of the plurality of candidate segmentation thresholds may exceed a minimum gray value among the gray values in the image and less than an average height of a grayscale histogram of the image.

Each of the multiple segmentation results may correspond to one of the plurality candidate segmentation thresholds. In some embodiments, the processing device 120 may segment the image using each of the plurality candidate segmentation thresholds to obtain one of the multiple segmentation results.

In some embodiments, the processing device 120 may obtain a segmentation result by classifying the pixels in the image (or the preprocessed image) into multiple groups based on a candidate segmentation threshold. For example, one of the multiple groups may relate to a first subject (or a tissue of a first type, e.g., adipose tissue) and another one of the multiple groups may relate to a second subject (or a tissue of a second type, e.g., muscle tissue). As another example, one of the multiple groups may relate to a target region (e.g., a breast region) in the image and another one of the multiple groups may relate to a background region. As a further example, the processing device 120 may classify a pixel whose gray value is less than the candidate segmentation threshold into one of the multiple groups relating to the target region (e.g., a breast region), and classify a pixel whose gray value exceeds the candidate segmentation threshold into one of the multiple groups relating to the background region. The processing device 120 may determine a variance between means of gray values of pixels in the multiple groups. The processing device 120 may determine multiple variances based on the multiple segmentation results. Each of the multiple variances may correspond to one of the multiple segmentation results generated based on one of the plurality of candidate segmentation thresholds. The processing device 120 may determine a maximum variance among the multiple variances and designate a candidate segmentation threshold corresponding to the maximum variance as the first segmentation threshold.

In some embodiments, the processing device 120 may determine the first segmentation threshold based on a portion of process 500. For example, the processing device 120 may determine a plurality of image blocks in the image and extract grayscale features from each of the plurality of image blocks. The processing device 120 may determine the first segmentation threshold based on the grayscale features extracted from each of the plurality of image blocks. More descriptions for determining the first segmentation threshold may be found in FIG. 5 and FIG. 6.

In some embodiments, the processing device 120 may determine the first segmentation threshold using the Otsu algorithm. The Otsu algorithm may also be referred to as the maximum between-class variance algorithm, which is an adaptive threshold determination technique. Using the Otsu algorithm, the processing device 120 may divide the pixels in the image into a first group (e.g., a background group) and a second group (e.g., a target group.) using each of a plurality of candidate segmentation thresholds. The processing device 120 may determine a variance between a mean of gray values of pixels in the first group and a mean of gray values of pixels in the second group. The processing device 120 may further determine the first segmentation threshold based on the variance.

In 1006, the processing device 120 (e.g., the segmentation threshold determination module 904) may determine a second segmentation threshold based on the first segmentation threshold and gray values of pixels in the image.

In some embodiments, the processing device 120 may divide gray values in the image that exceed the first segmentation threshold into multiple ranges. For each of the multiple ranges, the processing device 120 may determine a count of pixels in the image whose gray values are in the range. The processing device 120 may determine the second segmentation threshold based on the count of pixels whose gray values are in each of the multiple ranges. In some embodiments, the processing device 120 may divide the gray values in the image that exceed the first segmentation threshold into multiple ranges by dividing a portion of the grayscale histogram of the image with gray values exceeding the first segmentation threshold into multiple intervals along an axis representing gray values.

In some embodiments, the processing device 120 may determine a relationship between a mean of gray values of pixels and the count of the pixels whose gray values are in the each of the multiple ranges. For example, the processing device 120 may determine a fitting curve based on the mean of gray values of pixels and the count of pixels whose gray values are in the each of the multiple ranges. The processing device 120 may determine a specific range from the multiple ranges where a trough of the fitting curve belongs to. The processing device 120 may determine a median or the mean of gray values in the specific range as the second segmentation threshold.

The processing device 120 may adjust the first segmentation threshold to the trough of the grayscale histogram by increasing the first segmentation threshold based on the grayscale histogram of the image when a horizontal coordinate in the grayscale histogram represents the gray value of each pixel in the image, and an ordinate coordinate in the grayscale histogram is the count of pixels with the same gray value. The count of pixels corresponding to the trough of the grayscale histogram may be less than the count of pixels with other gray values around the trough. The gray value corresponding to the trough of the grayscale histogram may be designated as the second segmentation threshold. Accordingly, multiple pixels that are classified into the background region based on the first segmentation threshold may be classified into a target region based on the second segmentation threshold, which may improve the accuracy for image segmentation.

In 1008, the processing device 120 (e.g., the segmentation module 906) may segment the image based on the second segmentation threshold.

In some embodiments, the processing device 120 may determine a background region from the image based on the second segmentation threshold. For example, the processing device 120 may classify pixels whose gray values exceed the second segmentation threshold to the background region.

In some embodiments, the processing device 120 may determine the background region of the image based on the second segmentation threshold and the maximum gray value in the image (or the preprocessed image). For example, the background region may include pixels whose gray values in the range from the second segmentation threshold to the maximum gray value in the image (or the preprocessed image).

As another example, the processing device 120 may decrease the maximum gray value with a proportion to obtain a decreased maximum gray value. The background region may include pixels whose gray values are in the range from the second segmentation threshold to the decreased maximum gray value. The proportion may be set by a user, or according to a default setting of the medical system 100. For example, the proportion may be 10%, 5%, or other values. The decreased maximum gray value may be 90% of the maximum gray value, 95% of the maximum gray value, 98% of the maximum gray value, etc.

In some embodiments, the processing device 120 may determine first gray values in the image that exceed the second segmentation threshold, and determine a count of pixels with each of the first gray values. The processing device 120 may identify a second gray value from the first gray values. A count of pixels with the second gray value may be maximum among the first gray values. The processing device 120 may determine, based on the second segmentation threshold and the second gray value, the background region. More descriptions for determining the background region based on the second segmentation threshold may be found in FIG. 11.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 11:
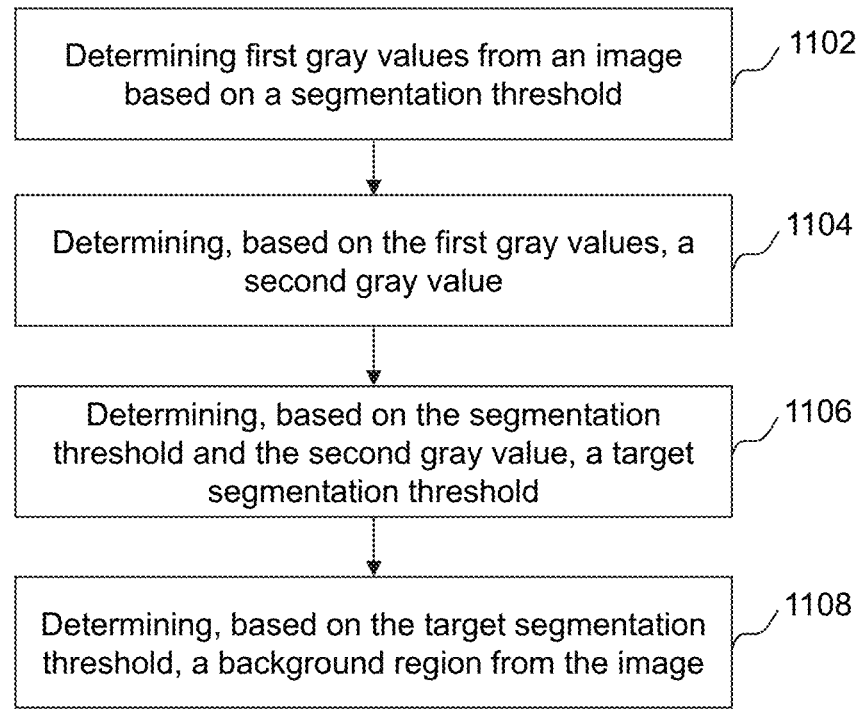
FIG. 11 is a flowchart illustrating an exemplary process for determining a background region from the image according to some embodiments of the present disclosure.

FIG. 11 is a flowchart illustrating an exemplary process for determining a background region from the image according to some embodiments of the present disclosure. In some embodiments, process 1100 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the terminal 140, the processor 210, and/or the CPU 340 may be configured to perform the process 1100. The operations of the illustrated process presented below are intended to be illustrative. In some embodiments, the process 1100 may be accomplished with one or more additional operations not described and/or without one or more of the operations discussed. Additionally, the order of the operations of the process 1100 illustrated in FIG. 11 and described below is not intended to be limiting. Operation 1008 in FIG. 10 may be performed according to process 1100 as illustrated in FIG. 11.

In 1102, the processing device 120 (e.g., the segmentation threshold determination module 904) may determine first gray values from an image based on a segmentation threshold.

The segmentation threshold may be determined as described elsewhere in the present disclosure (e.g., FIG. 10, and the descriptions thereof). The segmentation threshold may also be referred to as a candidate segmentation threshold. For example, the processing device 120 may designate the first segmentation threshold determined as described in operation 1004 in FIG. 10 as the segmentation threshold. As another example, the processing device 120 may designate the second segmentation threshold as described in 1006 in FIG. 10 as the segmentation threshold. As still another example, the processing device 120 may determine the segmentation threshold based on a portion of processing 500 as described in FIG. 5.

Figure 12:
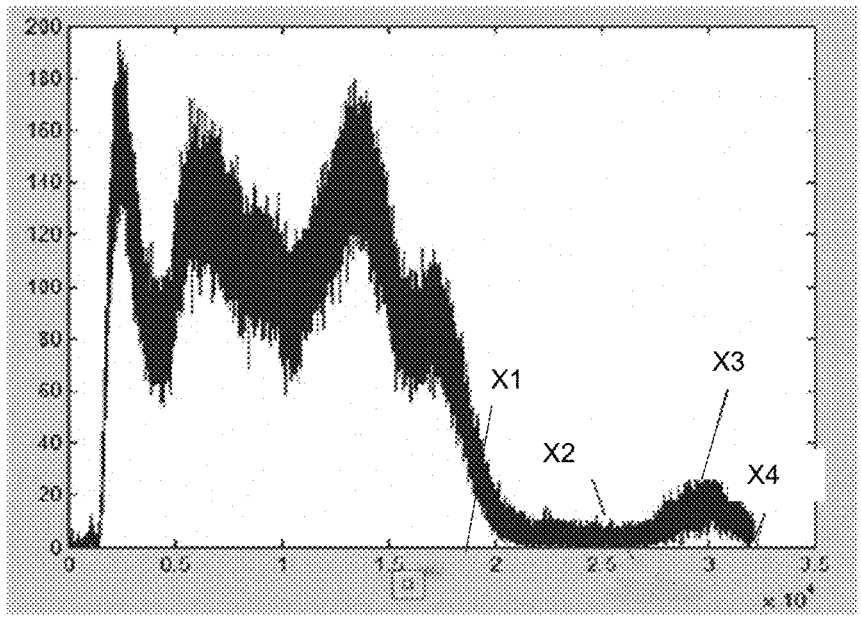
FIG. 12 shows a grayscale histogram of the image according to some embodiments of the present disclosure.

In some embodiments, the processing device 120 may determine first gray values in the image that exceed the segmentation threshold. For example, FIG. 12 shows an exemplary grayscale histogram of the image according to some embodiments of the present disclosure. As shown in FIG. 12, the grayscale histogram of the image includes a plurality of points. A vertical coordinate of a point denotes a gray value in the image, and a horizontal coordinate of the point denotes the count of pixels with the gray value. X2 refers to the segmentation threshold. X4 refers to the maximum gray value in the image. The processing device 120 may designate gray values in the image that are in a range from X2 to X4 as the first gray values. The pixels with the first gray values may belong to an estimated background region that is segmented based on the segmentation threshold.

In 1104, the processing device 120 (e.g., the segmentation threshold determination module 904) may determine a second gray value based on the first gray values.

In some embodiments, the processing device 120 may determine a count of pixels of each of the first gray values in the image and identify the second gray value from the first gray values based on the count of pixels of each of the first gray values. A count of pixels with the second gray value may be maximum among the first gray values. As shown in FIG. 12, X3 denotes the second gray value that is a gray value of a point whose vertical coordinate is maximum among points located at the right side of the segmentation threshold X2 on the grayscale histogram (i.e., points whose horizontal coordinates exceed the segmentation threshold X2). In other words, the second gray value corresponds to a peak of a portion of the grayscale histogram that is located at the right side of the segmentation threshold X2. In some embodiments, the processing device 120 may obtain the point with the largest vertical coordinate (that is, the largest count of pixels) by comparing point by point in the portion of the grayscale histogram that is located at the right side of the segmentation threshold. In some embodiments, the processing device 120 may sort all points in the grayscale histogram that is located the right of the segmentation threshold (e.g., the second segmentation threshold as described in FIG. 10) according to the ordinates of the all points to obtain the point with the largest vertical coordinate.

In some embodiments, the processing device 120 may classify gray values in the image that exceed the segmentation threshold (e.g., the second segmentation threshold as described in FIG. 10) into multiple ranges. The processing device 120 may determine an average count of pixels whose gray values are in each of the multiple ranges. The processing device 120 may determine one of the multiple ranges with the largest average count of pixels. The processing device 120 may determine a mean or a median of gray values of pixels whose gray values are in the one of the multiple ranges with the largest average count of pixels as the second gray value.

In 1106, the processing device 120 (e.g., the segmentation threshold determination module 904) may determine a target segmentation threshold based on the segmentation threshold and the second gray value. In some embodiments, the target segmentation threshold may also be referred to as a third segmentation threshold.

In some embodiments, the processing device 120 may determine whether the image includes a background region based on the segmentation threshold (e.g., the second segmentation threshold as described in FIG. 10) and the second gray value. For example, the processing device 120 may determine a count of pixels with the segmentation threshold and a count of pixels with the second gray value in the image. The processing device 120 may determine whether the image includes the background region based on a difference between the count of pixels with the segmentation threshold (e.g., the second segmentation threshold as described in FIG. 10) and the count of pixels with the second gray value. In response to a determination that the difference between the count of pixels with the segmentation threshold (e.g., the second segmentation threshold as described in FIG. 10) and the count of pixels with the second gray value is less than a count threshold, the processing device 120 may determine that the background region does not exists in the image, i.e., the gray values in the image may be stable. In response to a determination that the difference between the count of pixels with the segmentation threshold and the count of pixels with the second gray value exceeds the count threshold, the processing device 120 may determine that the background region exists in the image. The count threshold may be set by a user, or may be set according to an experience value, and may be a default value, such as 20, 25, 30, or a larger or smaller value.

Figure 14:
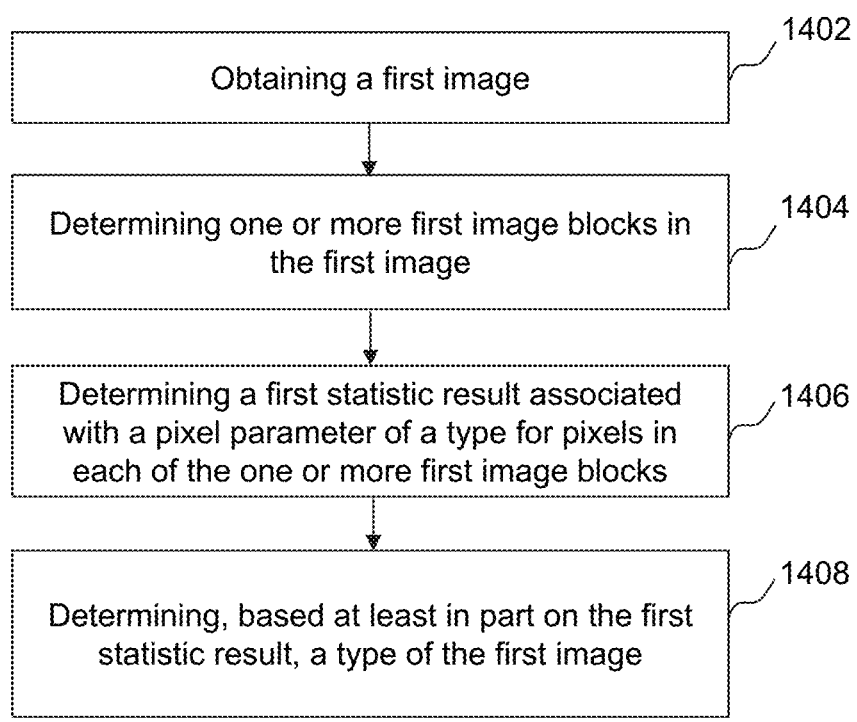
FIG. 14 is a flowchart illustrating an exemplary process for determining image type according to some embodiments of the present disclosure.

In some embodiments, the processing device 120 may determine whether the image include the background according to process 1400 as illustrated in FIG. 14.

In some embodiments, if the image includes the background region, the processing device 120 may determine the target segmentation threshold based on the segmentation threshold and the second gray value.

In some embodiments, the processing device 120 may determine a third count of pixels with a same gray value based on a first count of pixels with a same gray value that is equal to the second segmentation threshold and a second count of pixels with a same gray value that is equal to the second gray value in the image. The processing device 120 may further determine the target segmentation threshold based on the third count of pixels with the same gray value. For example, the processing device 120 may determine, based on the third count of pixels with the same gray value, a third gray value in the image. The third gray value may exceed the second segmentation threshold and is less than the second gray value. A count of pixels with the third gray value in the image may be equal to the third count of pixels. The processing device 120 may designate the third gray value as the target segmentation threshold. As another example, the processing device 120 may identify a point from the grayscale histogram of the image whose vertical coordinate is equal to the third count of pixels and designate the gray value of the point as the target segmentation threshold. The target segmentation threshold may also be referred to as a background segmentation threshold.

In some embodiments, the processing device 120 may determine the third count of pixels by averaging the first count of pixels and the second count of pixels. In some embodiments, the processing device 120 may determine a difference between the first count of pixels and the second count of pixels. The processing device 120 may determine the third count of pixels based on the first count of pixels and the second count of pixels and a difference between the first count of pixels and the second count of pixels. For example, the processing device 120 may decrease the difference between the first count of pixels and the second count of pixels with a proportion (e.g., 92%, 90%, 85%) to obtain a decreased difference. The decreased difference may be 8%, 10%, 25%, etc., of the difference between the first count of pixels and the second count of pixels. The processing device 120 may determine a sum between the first count of pixels and the decreased difference or a sum of the second count of pixels and the decreased difference as the third count of pixels.

In some embodiments, the processing device 120 may determine multiple different third gray values each of which corresponds to the third count of pixels. The processing device 120 may determine a mean, a median, a maximum gray value, or a minimum gray value, etc., of the multiple different third gray values as the target segmentation threshold.

In some embodiments, the processing device 120 may determine a point in a portion of the grayscale histogram of the image between the segmentation threshold and the second gray value that includes a maximum change rate of counts of pixels. The processing device 120 may designate the gray value of the point as the target segmentation threshold.

In 1108, the processing device 120 (e.g., the segmentation module 906) may determine a background region from the image based on the target segmentation threshold.

In some embodiments, the background region may include pixels each of which gray value exceeds the target segmentation threshold.

Accordingly, the systems and methods of the present disclosure may determine the target segmentation threshold for determining a background region based on a difference between the first segmentation threshold and the second segmentation threshold, which may improve the accuracy of the target segmentation threshold. By determining whether the image includes the background region, thus the false detection of the background region may be effectively decreased, and the accuracy of background region detection may be further improved.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 13:
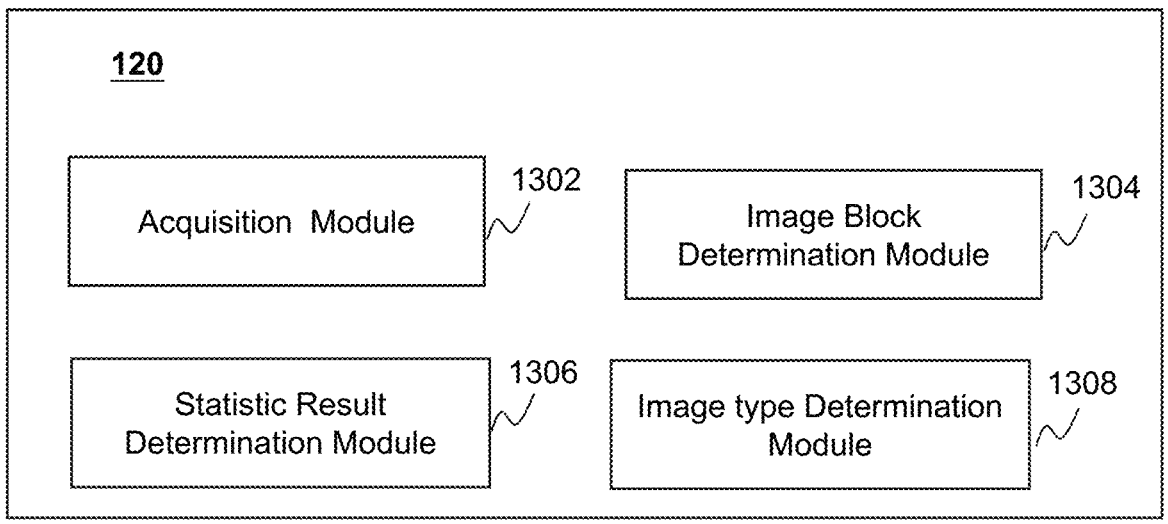
FIG. 13 is a schematic diagram illustrating an exemplary processing device for determining image type according to some embodiments of the present disclosure.

FIG. 13 is a schematic diagram illustrating an exemplary processing device for determining image type according to some embodiments of the present disclosure. As shown, the processing device 120 may include an acquisition module 1302, an image block determination module 1304, a statistic result determination module 1306, and an image type determination module 1308. In some embodiments, the acquisition module 1302, the image block determination module 1304, the statistic result determination module 1306, and the image type determination module 1308 may be connected to and/or communicate with each other via a wireless connection (e.g., a network), a wired connection, or a combination thereof.

The acquisition module 1302 may be configured to obtain information related to a first image of a subject.

In some embodiments, the first image may be acquired by an imaging device (e.g., the medical device 110). In some embodiments, the first image may be obtained by performing a preprocessing operation on an image of the subject acquired by the imaging device.

The imaging device may include a camera, a video camera, a medical imaging device, an industrial X-ray flaw detection device, a security monitoring device, etc. The medical imaging device (e.g., the medical device 110) may include a CT device, a DR device, a mammography device, a CR device, a DSA device, a mobile X-ray device (such as a mobile C-arm machine), a screen X-ray device, an MRI device, an ultrasound device, a SPECT, a PET, a γ camera, etc. For example, the first image may be a medical image acquired by the DR or the mammography device. In some embodiments, the first image may be a 2D image or a 3D image. More descriptions of the subject may be found elsewhere in the present disclosure.

In some embodiments, the acquisition module 1302 may obtain the first image from the imaging device, for example, via a wired or wireless connection (e.g., the network 150). In some embodiments, the acquisition module 1302 may obtain the image from the storage device 130, a local storage device (e.g., a storage device implemented on the terminal device(s) 140 or the medical device 110, or the processing device 120, etc.) or other storage devices that be in communication with the processing device 120.

In some embodiments, the acquisition module 1302 may obtain a second image of the first image. The second image may be an operation image of the first image.

The image block determination module 1304 may be configured to determine one or more image blocks in an image. For example, the image block determination module 1304 may be configured to determine one or more first image blocks in the first image. As another example, the image block determination module 1304 may determine one or more second image blocks in the second image.

In some embodiments, the image block determination module 1304 may divide the first image to obtain the one or more first image blocks. The division of the first image may be a regular division or an irregular division. As used herein, the regular division refers to dividing an image according to a rule. The rule may relate to the size of each image block, the shape of each image block, a position of each image block, etc. The determination of the second image blocks may be the same as or similar to the determination of the one or more first image blocks.

The statistic result determination module 1306 may be configured to determine one or more statistic result associated with a pixel parameter of a type for pixels in each of one or more image blocks. The pixel parameter of a pixel may indicate the attribute of the pixel. The type of the pixel parameter may include grayscale, chrominance, luminance (or brightness), etc. The attribute of the pixel may be indicated by a value of the pixel parameter (also referred to as a pixel value, such as a gray value) and a type of the pixel parameter. For example, the statistic result determination module 1306 may be configured to determine a first statistic result associated with a pixel parameter of a type for pixels in each of the one or more first image blocks. As another example, the statistic result determination module 1306 may be configured to determine a second statistic result associated with a pixel parameter of a type for pixels in each of the one or more second image blocks.

In some embodiments, the statistic result determination module 1306 may obtain the first statistic result corresponding to a first image block using a calculation formula of each of the one or more statistic values, such as a variance calculation formula, a mean calculation formula, a standard deviation calculation formula, or the like, or a combination thereof.

In some embodiments, the statistic result determination module 1306 may determine a grayscale histogram of pixels in a first image block and then determine the statistic values based on the grayscale histogram.

The determination of the second statistic result may be the same as or similar to the determination of the first statistic result.

The image type determination module 1308 may be configured to determine a type of the first image based on the first statistic result and/or the second statistic result. The type of the first image may indicate whether the first image includes a region representing air.

In some embodiments, the image type determination module 1308 may determine the type of the first image based on the type of each of at least a portion of the one or more first image blocks.

In some embodiments, the image type determination module 1308 may determine the type of a first image block by comparing the first statistic result with a first condition to obtain a first comparison result. The image type determination module 1308 may determine the type of a first image block based on the first comparison result.

In some embodiments, the image type determination module 1308 may obtain the first comparison result by comparing the one or more statistic values of a first image block with the one or more first statistic thresholds, respectively. The image type determination module 1308 may determine the type of the first image block based on the first comparison result.

In some embodiments, the image type determination module 1308 may determine the type of the first image using an image classification model based at least in part on the first statistic result. The image classification model may include a statistical model, a trained machine learning model, or the like. The statistical model may include a multiple regression model, a cluster analysis model, a discriminant analysis model, a principal component analysis model, a factor analysis model, etc. The trained machine learning model may be constructed based a logistic regression model, a k-nearest neighbor (kNN) model, a naive Bayes (NB) model, a support vector machine (SVM), a decision tree (DT) model, a random forests (RF) model, a classification and regression trees (CART) model, a gradient boosting decision tree (GBDT) model, a xgboost model (eXtreme Gradient Boosting), an Adaboost model, a light gradient boosting machine (Light GBM), a gradient boosting machine (GBM), a least absolute shrinkage and selection operator (LASSO), an artificial neural network (ANN) model, etc. The image classification model may be obtained by a processing device that is the same as or different from the processing device 120 using a plurality of training samples based on a training algorithm (e.g., a backpropagation algorithm, a gradient descent algorithm, etc.). Each of the plurality of training samples may include a statistic result (e.g., one or more statistical values) and the corresponding image type of an image block or an image. The statistic result may be used as an input and the corresponding image type may be used as a desired output in a training process of a machine learning model.

In some embodiments, the image type determination module 1308 may input the first statistic result of the one or more first image blocks into the image classification model to obtain the type of the first image. In some embodiments, the image type determination module 1308 may input the first statistic result of each of the one or more first image blocks into the image classification model to obtain the type of the each of the one or more first image blocks.

In some embodiments, the image type determination module 1308 may determine the type of a first image block by comparing the first statistic result with a first condition to obtain a first comparison result and comparing the second statistic result to obtain a second comparison result. The image type determination module 1308 may determine the type of a first image block based on the first comparison result and the second comparison result.

In some embodiments, the image type determination module 1308 may determine the type of a first image block by comparing the second statistic result to obtain a second comparison result. The image type determination module 1308 may determine the type of a first image block based on the second comparison result.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, some other components/modules (e.g., a storage module) may be added into and/or omitted from the processing device 120.

FIG. 14 is a flowchart illustrating an exemplary process for determining image type according to some embodiments of the present disclosure. In some embodiments, process 1400 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the terminal 140, the processor 210 and/or the CPU 340 may be configured to perform the process 1400. The operations of the illustrated process presented below are intended to be illustrative. In some embodiments, the process 1400 may be accomplished with one or more additional operations not described and/or without one or more of the operations discussed. Additionally, the order of the operations of the process 1400 illustrated in FIG. 14 and described below is not intended to be limiting.

In 1402, the processing device 120 (e.g., the acquisition module 1302) may obtain a first image of a subject.

In some embodiments, the first image may be acquired by an imaging device (e.g., the medical device 110). In some embodiments, the first image may be obtained by performing a preprocessing operation on an image of the subject acquired by the imaging device. For example, the processing device 120 may perform a negative film operation on the image of the subject. More descriptions for the preprocessing operation may be found elsewhere in the present disclosure (e.g., FIG. 10 and the descriptions thereof).

The imaging device may include a camera, a video camera, a medical imaging device, an industrial X-ray flaw detection device, a security monitoring device, etc. The medical imaging device (e.g., the medical device 110) may include a CT device, a DR device, a mammography device, a CR device, a DSA device, a mobile X-ray device (such as a mobile C-arm machine), a screen X-ray device, an MRI device, an ultrasound device, a SPECT, a PET, a γ camera, etc. For example, the first image may be a medical image acquired by the DR or the mammography device. In some embodiments, the first image may be a 2D image or a 3D image. More descriptions of the subject may be found elsewhere in the present disclosure.

In some embodiments, the processing device 120 may obtain the first image from the imaging device, for example, via a wired or wireless connection (e.g., the network 150). In some embodiments, the processing device 120 may obtain the image from the storage device 130, a local storage device (e.g., a storage device implemented on the terminal device(s) 140 or the medical device 110, or the processing device 120, etc.) or other storage devices that be in communication with the processing device 120.

In 1404, the processing device 120 (e.g., the image block determination module 1304) may determine one or more first image blocks in the first image.

In some embodiments, the processing device 120 may divide the first image to obtain the one or more first image blocks. The division of the first image may be a regular division or an irregular division. As used herein, the regular division refers to dividing an image according to a rule. The rule may relate to the size of each image block, the shape of each image block, a position of each image block, etc. For example, the regular division of an image may include dividing the image into multiple image blocks whose sizes and/or shapes are the same. The irregular division of an image may include dividing the image into multiple image blocks whose sizes and/or shapes are different. As another example, the regular division of an image may include dividing the image into multiple image blocks whose positions in the image are distributed along a row direction and/or a column direction of the image. The irregular division of an image may include dividing the image into multiple image blocks whose positions in the image are distributed disorderly. In some embodiments, as the number (or count) of rows is not an integral multiple of the number (or count) of rows of an image block and/or the number (or count) of columns of the image is not an integral multiple of columns (or count) of the image block obtained by the regular division, the sizes of image blocks located at an edge region of the image may be different from the sizes of image blocks located at other regions such as the middle region of the image. This is also within the scope of the present disclosure.

In some embodiments, adjacent first image blocks may not include an overlapped region. For example, the processing device 120 may determine a first count of first lines along a first direction and a second count of second lines along a second direction. The processing device 120 may determine the one or more first image blocks based on the first count of first lines and the second count of second lines. A first image block may be defined by at least one first line and at least one second line. As shown in FIG. 7, adjacent image blocks do not include an overlapped region.

In some embodiments, adjacent first image blocks may include an overlapped region. For example, the processing device 120 may sequentially obtain the one or more first image blocks of axa size by a step size b from the first image. When the step size b is less than a, adjacent first image blocks may include an overlapped region.

In 1406, the processing device 120 (e.g., the statistic result determination module 1306) may determine a first statistic result associated with a pixel parameter of a type for pixels in each of the one or more first image blocks.

The pixel parameter of a pixel may indicate the attribute of the pixel. The type of the pixel parameter may include grayscale, chrominance, luminance (or brightness), etc. The attribute of the pixel may be indicated by a value of the pixel parameter (also referred to as a pixel value, such as a gray value) and a type of the pixel parameter.

Each of the one or more first image blocks may correspond to a first statistic result. The first statistic result corresponding to a first image block may include one or more statistic values associated with values of the pixel parameter of the type of the pixels in the first image block. The one or more statistic values may include a sum, a variance, a mean, a standard deviation of values of the pixel parameter of the type of pixels in the first image block.

In some embodiments, the processing device 120 may obtain the first statistic result corresponding to a first image block using a calculation formula of each of the one or more statistic values, such as a variance calculation formula, a mean calculation formula, a standard deviation calculation formula, or the like, or a combination thereof.

In some embodiments, the processing device 120 may determine a grayscale histogram of pixels in a first image block and then determine the statistic values based on the grayscale histogram.

In 1408, the processing device 120 (e.g., the image type determination module 1308) may determine a type of the first image based at least in part on the first statistic result.

The type of the first image may indicate whether the first image includes a region representing air. For example, the type of the first image may include that the first image includes a region representing air (or referred to as an air region for brevity), that the first image lacks or does not include any air region, or that the first image includes one or more intermediate regions. As used herein, an air region in an image refers to a portion of the image representing a physical region that includes only air and is void of any imagable item. As used herein, an imagable item refers to an item including at least one non-air material. The non-air material may be biological or non-biological including, e.g., water, blood, bone, soft tissue, hard tissue, plastic, metal. For instance, an imagable item may be a solid item including at least one non-air material, a porous item including at least one non-air material, or an item with a 2D or 3D boundary made of a non-air material and/or within which there is at least one non-air material. For example, an air region in an image may include a background region. The first image lacking or not including an air region may also refers to an image void of an air region. An intermediate region in an image refers to a region in the image that is other than an air region and also other than a region void of air. In some embodiments, an intermediate region in an image refers to a portion of the image representing a physical region with some air and at least an imagable item, in which the proportion of the volume of air to the total volume of the physical region is below a proportion threshold.

Figure 19:
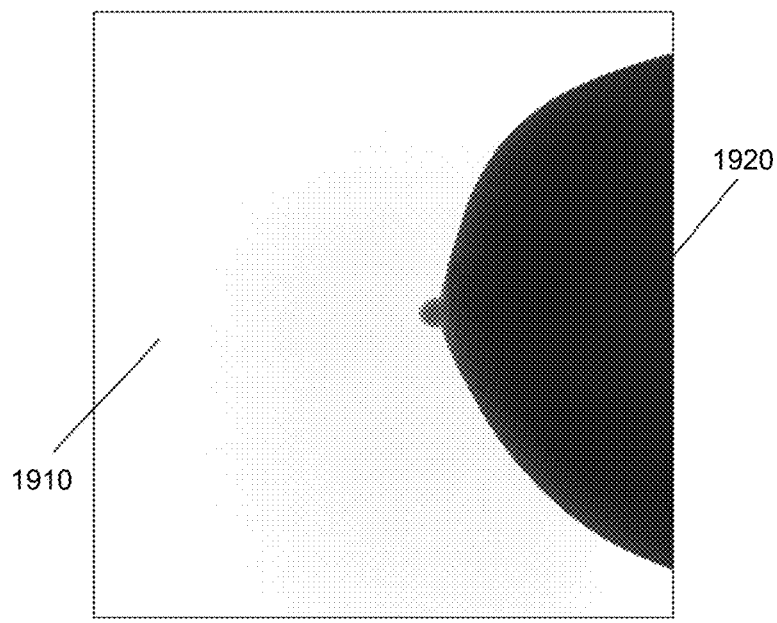
FIG. 19 and FIG. 20 show exemplary images of different types according to some embodiments of the present disclosure.
Figure 20:
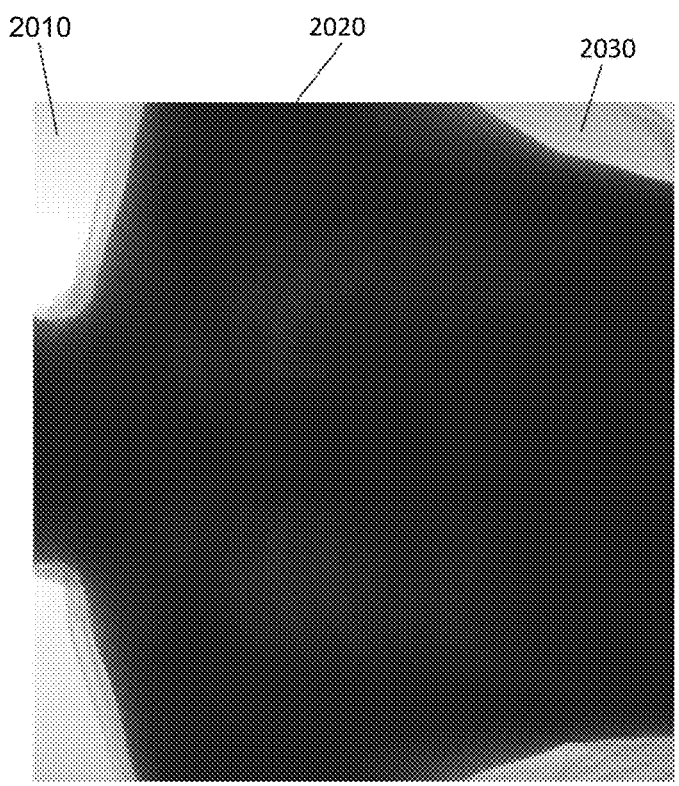

For example, FIG. 19 and FIG. 20 show exemplary images of different types according to some embodiments of the present disclosure. FIG. 19 shows an image of a breast obtained after a negative film operation was performed on a breast image acquired by a mammography device. FIG. 20 shows an image of the chest obtained after a negative film operation was performed on a chest image acquired by a DR device. As shown in FIG. 19, region 1910 is an air region (i.e., background region), and region 1920 is a region representing airless representing a breast (i.e., breast region). As shown in FIG. 20, region 2010 is a region representing air, region 2020 is a region void of air that includes a representation of the chest cavity, and region 2030 is an intermediate region, that includes a representation of cloth and air. According to some embodiments of the present disclosure, the types of regions and/or images may effectively and quickly be distinguished, which may improve image processing speed.

In some embodiments, the processing device 120 may determine the type of the first image based on the type of each of at least a portion of the one or more first image blocks. For example, if one of the one or more first image blocks include an air region, the type of the first image may indicate that the first image includes an air. If each of the first image blocks includes a region void of air, the type of the first image may indicate that the first image lacks or does not include any air region. If one of the one or more first image blocks includes an intermediate region, the type of the first image may indicate that the first image includes an intermediate region.

In some embodiments, the processing device 120 may determine the type of a first image block by comparing the first statistic result with a first condition to obtain a first comparison result. The processing device 120 may determine the type of a first image block based on the first comparison result.

In some embodiments, the first condition may include one or more first statistic thresholds corresponding to the one or more statistic values in the first statistic result. The first statistic thresholds may be set by a user or according to a default setting of the medical system 100. In some embodiments, the first statistic thresholds may be stored in a storage device (e.g., the storage device 130). The processing device 120 may obtain the first statistic thresholds from the storage device. In some embodiments, the first statistic thresholds may be determined based on prior statistical knowledge. The first statistic thresholds may be adjusted according to different application scenarios, which is not specifically limited in this disclosure.

In some embodiments, the processing device 120 may obtain the first comparison result by comparing the one or more statistic values of a first image block with the one or more first statistic thresholds, respectively. The processing device 120 may determine the type of the first image block based on the first comparison result. For example, if the first statistical result includes a first mean and a first standard deviation of gray values of pixels in a first image block, the first condition may include a first mean threshold and a first standard deviation threshold. The processing device 120 may compare the first mean with the first mean threshold and compare the first standard deviation with the first standard deviation threshold to obtain the first comparison result. In some embodiments, the first comparison result may include a magnitude relationship between each statistic value and its corresponding threshold. For example, the first comparison result may be that the first mean exceeds the first mean threshold, and the first standard deviation exceeds the first standard deviation threshold. After obtaining the first comparison result, the type of the first image block may be obtained. For example, if the first comparison result of a first image block includes that the first mean exceeds the first mean threshold and the first standard deviation exceeds the first standard deviation threshold, the processing device 120 may determine that the first image block includes an air region. If the processing device 120 determines that one of the one or more first image blocks includes an air region, the processing device 120 may determine the type of the first image indicating that the first image includes an air region.

If the first comparison result of a first image block includes that the first mean is less than the first mean threshold and the first standard deviation is less than the first standard deviation threshold, the processing device 120 may determine that the first image block includes a region void of air. If the processing device 120 determines that each of the one or more first image blocks includes a region void of air, the processing device 120 may determine the type of the first image indicating that the first image does not include or lack any air region.

If the first comparison result of a first image block includes that the first mean exceeds or equals the first mean threshold and the first standard deviation is less than or equal to the first standard deviation threshold, or the first comparison result of a first image block includes that the first mean is less than or equal to the first mean threshold and the first standard deviation exceeds or equals the first standard deviation threshold, the processing device 120 may determine that the first image block include an intermediate region. The processing device 120 may further determine the type of the first image indicating that the first image includes an intermediate region.

In some embodiments, the processing device 120 may determine the type of the first image using an image classification model based at least in part on the first statistic result. The image classification model may include a statistical model, a trained machine learning model, or the like. The statistical model may include a multiple regression model, a cluster analysis model, a discriminant analysis model, a principal component analysis model, a factor analysis model, etc. The trained machine learning model may be constructed based a logistic regression model, a k-nearest neighbor (kNN) model, a naive Bayes (NB) model, a support vector machine (SVM), a decision tree (DT) model, a random forests (RF) model, a classification and regression trees (CART) model, a gradient boosting decision tree (GBDT) model, a xgboost model (eXtreme Gradient Boosting), an Adaboost model, a light gradient boosting machine (Light GBM), a gradient boosting machine (GBM), a least absolute shrinkage and selection operator (LASSO), an artificial neural network (ANN) model, etc. The image classification model may be obtained by a processing device that is the same as or different from the processing device 120 using a plurality of training samples based on a training algorithm (e.g., a backpropagation algorithm, a gradient descent algorithm, etc.). Each of the plurality of training samples may include a statistic result (e.g., one or more statistical values) and the corresponding image type of an image block or an image. The statistic result may be used as an input and the corresponding image type may be used as a desired output in a training process of a machine learning model.

In some embodiments, the processing device 120 may input the first statistic result of the one or more first image blocks into the image classification model to obtain the type of the first image. In some embodiments, the processing device 120 may input the first statistic result of each of the one or more first image blocks into the image classification model to obtain the type of the each of the one or more first image blocks.

Accordingly, the systems and methods of the present disclosure may determine the type of an image based on the type of image blocks in an image and difference information in the image, which may improve the efficiency and accuracy of image classification. By determining whether the image includes air region with improved accuracy, thus the false detection of a background region may be effectively decreased, and the accuracy of background region detection may be further improved.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 15:
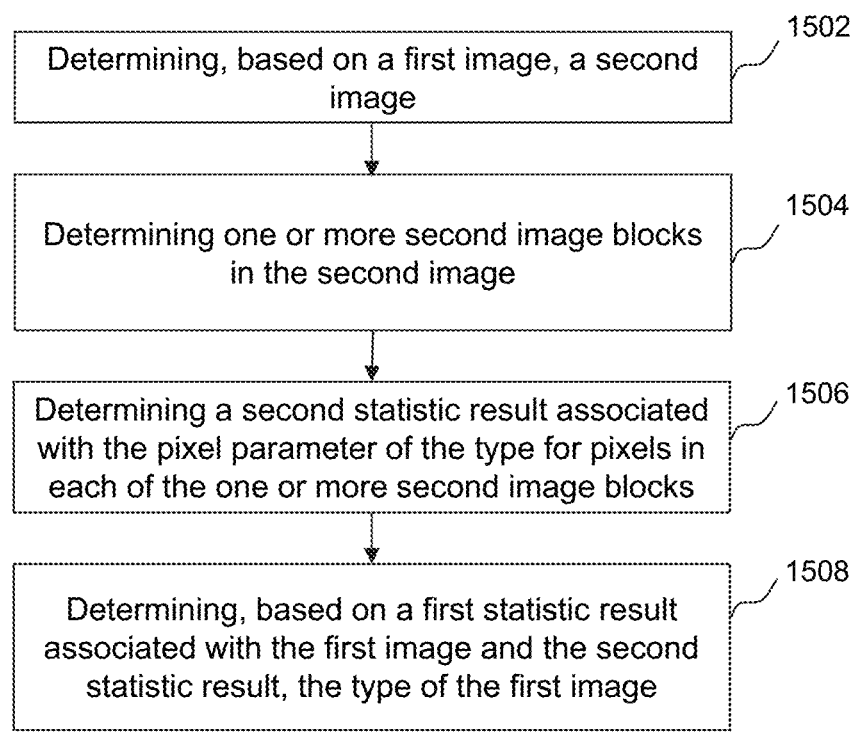
FIG. 15 is an exemplary flowchart illustrating an exemplary process for determining image type according to some embodiments of the present disclosure.

FIG. 15 is an exemplary flowchart illustrating an exemplary process for determining image type according to some embodiments of the present disclosure. In some embodiments, process 1500 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the terminal 140, the processor 210 and/or the CPU 340 may be configured to perform the process 1500. The operations of the illustrated process presented below are intended to be illustrative. In some embodiments, the process 1500 may be accomplished with one or more additional operations not described and/or without one or more of the operations discussed. Additionally, the order of the operations of the process 1500 illustrated in FIG. 15 and described below is not intended to be limiting.

In 1502, the processing device 120 (e.g., the image type determination module 1308) may determine a second image based on a first image.

The first image may be obtained as described in connection with operation 1402 as described in FIG. 14.

In some embodiments, the second image may include difference information of the first image. The difference information may refer to differences in an attribute of pixels caused by the pixels located at different locations or regions in the first image. For example, the difference between the gray value of a pixel with a high gray value (for example, 200) and a gray value with a low gray value (for example, 10) may indicate that the two pixels are in different locations of the image. A pixel value (e.g., the gray value or the brightness value) of a second pixel in the second image may show a difference between first pixels that are associated with the second pixel and are at different locations of the first image. As used herein, first pixels in the first image associated with a second pixel in a second image may refer to that a value of a pixel parameter of the second pixel is determined based on values of the pixel parameter of the first pixels in the first image.

In some embodiments, the second image may be obtained by performing one or more algebraic operations (e.g., an add operation, a subtraction operation, a multiplication operation, a division operation, a square operation, square, an integral operation, and/or a differential operation, etc.) on values of a pixel parameter (such as pixel values, gray values, or brightness values, etc.) of corresponding pixels in the first image. The second image may also be referred to as an operation image of the first image. As used herein, two or more corresponding pixels in the same image may refer to that the two or more pixels are in two or more columns and the same row, or the two or more pixels are in two or more rows and the same column.

In some embodiments, the one or more algebraic operations may be performed between each two or more pixels that are in two or more columns and the same row of the first image. For example, the processing device 120 may replace a gray value of each pixel in a specific column of the first image with the difference between the gray value of each pixel in the specific column and a gray value of the corresponding pixel that is in a column adjacent to or not to the specific column and the same row as the gray value of the each pixel in the specific column.

In some embodiments, the one or more algebraic operations may be performed between two or more pixels that are in two or more rows and the same column of the first image. For example, the processing device 120 may replace a gray value of each pixel in a specific row of the first image with the difference between the gray value of each pixel in the specific row and a gray value of the corresponding pixel that is in a row adjacent to or not to the specific row and the same column as the gray value of each pixel in the specific row.

In some embodiments, the second image may be obtained by compositing multiple operation images of the first image. For example, the processing device 120 may perform a first algebraic operation between each two or more pixels that are in two or more columns and in the same row of the first image to obtain a first operation image. The processing device 120 may perform a second algebraic operation between each two or more pixels that are in two or more rows and in the same column of the first image to obtain a second operation image. The first operation image and the second operation image may also be referred to as third images. The processing device 120 may determine the second image by compositing the first operation image and the second operation image. For example, the processing device 120 may perform an add operation between corresponding pixels in the first operation image and the second operation image. As used herein, two or more corresponding pixels in different images may refer to that the two or more pixels are located in the same column and same row of the different images.

The first algebraic operation and the second algebraic operation may be the same or different. For example, the first algebraic operation may include an add operation and the second algebraic operation may include a subtraction operation. As another example, the first algebraic operation and the second algebraic operation may be both the subtraction operation.

For example, the processing device 120 may obtain the first operation image by replacing a gray value of each pixel in a specific column of the first image with the difference between the gray value of each pixel in the specific row and a gray value of the corresponding pixel that is in a column adjacent to or not to the specific column and the same row as the gray value of each pixel in the specific column The processing device 120 may obtain the second operation image by replacing a gray value of each pixel in a specific row of the first image with the difference between the gray value of each pixel in the specific row and a gray value of the corresponding pixel that is in a row adjacent to or not to the specific row and the same column as the each pixel in the specific row. The processing device 120 may determine the second image by performing an add operation between two corresponding pixels that are in the same row and column of the first operation image and the second operation image.

In some embodiments, the first operation image may include a count of columns that are different from a count of columns in the second operation image and/or the first operation image may include a count of rows that are different from a count of rows in the second operation image. For example, the first operation image may include the count of columns less than the count of columns in the second operation image. The first operation image may include the count of rows exceeding the count of rows in the second operation image. The processing device 120 may determine a first portion of pixels values in the second image by performing an add operation between two corresponding pixels that are in the same row and column of the first operation image and the second operation image. The processing device 120 may determine a second portion of pixels values in the second image by designating pixel values in one or more columns and/or rows in the first operation image or the second operation image as the second portion of pixels values in the second image.

For example, if the count of columns in the first operation image is less than the count of columns in the second operation image, the processing device 120 may designate pixel values in one or more columns of the second operation image as pixel values in corresponding columns of the second image; if the count of rows in the first operation image exceeds the count of rows in the second operation image, the processing device 120 may designate pixel values in the one or more rows of the first operation image as pixel values of corresponding rows of the second image.

More descriptions for the algebraic operations and operation images may be found elsewhere in the present disclosure (e.g., FIGS. 17A-17C and FIGS. 18A-18B, and the descriptions thereof).

In 1504, the processing device 120 (e.g., the image block determination module 1304) may determine one or more second image blocks in the second image.

In some embodiments, the count of the second image blocks may be the same as the count of the first image blocks. Each of the one or more second image blocks may correspond to one of the one or more first image blocks. The size and shape of a second image block may be the same as or different from the size and shape of a first image block that corresponds to the second image block, respectively. As used herein, a second image block corresponding to a first image block may refer to that two corresponding image blocks in the first image and the second image may represent a same portion or position of the subject or the two corresponding image blocks are located in the same position in the first image and the second image.

In some embodiments, the count of the second image blocks may be different from the count of the first image blocks. For example, the count of the second image blocks may be less than the count of the first image blocks. Each of the one or more second image blocks may correspond to one or more of the one or more first image blocks. The size and/or shape of at least one second image block may be different from the size and/or shape of a first image block, respectively.

In some embodiments, the size of the first image and the size of the second image may be different, the size of a first image block obtained by the same division mode as a second image block at the edge of the two images (i.e., the first image and the second image) may be different.

The one or more second image blocks may be divided from the second image as similar to or same as the division of the one or more first image blocks in the first image. More descriptions for image block determination may be found in FIG. 14. For example, the processing device 120 may divide the second image into the one or more second image blocks of a×a size. As another example, the processing device 120 may determine a first count of lines along a first direction and determine a second count of lines along a second direction. The processing device 120 may divide the second image into the one or more second image blocks based on the first count of first lines and the second count of second lines. In some embodiments, the first direction may be perpendicular to the second direction. As still another example, the processing device 120 may sequentially obtain the one or more second image blocks of a×a size by a step size b (e.g., b<a) such that two adjacent second image blocks may have an overlapped region.

In 1506, the processing device 120 (e.g., the image type determination module 1308) may determine a second statistic result associated with the pixel parameter of the type for pixels in each of the one or more second image blocks.

Each of the one or more second image blocks may correspond to a second statistic result. The second statistic result corresponding to a second image block may include one or more statistic values on values of the pixel parameter of the type of the pixels in the second image block. The one or more statistic values may include a sum, a variance, a mean, a standard deviation, etc., of values of the pixel parameter of the type of pixels in the second image block. The determination of the second statistic result may be similar to or the same as the determination of the first statistic result.

In 1508, the processing device 120 (e.g., the image type determination module 1308) may determine the type of the first image based on a first statistic result associated with the first image and the second statistic result.

In some embodiments, the type of the first image may indicate whether the first image includes a region representing air. For example, the type of the first image may include that the first image includes a region representing air, the first image does not include a region representing air, or the first image includes a region representing few air. More descriptions for the type of the first image may be found elsewhere in the present disclosure (e.g., FIG. 14 and the descriptions thereof).

The first statistic result may be determined as described in connection with operation 1406 as described in FIG. 14. Each of the one or more first image blocks may correspond to a first statistic result. Each of the one or more first image blocks may correspond to one or more second image blocks. The first statistic result corresponding to a first image may correspond to one or more second statistic results corresponding to one or more second image blocks.

In some embodiments, the processing device 120 may determine the type of the first image by determining the types of the one or more first image blocks. The type of a first image block may indicate that the first image block includes a region representing air, or includes a region representing airless, or includes a region representing few airless. For example, if one of the one or more first image blocks includes a region representing air, the processing device 120 may determine the type of the first image indicating that the first image includes a region representing air; if each of the one or more first image blocks includes a region representing airless, the processing device 120 may determine the type of the first image indicating that the first image does not include a region representing air; if one of the one or more first image blocks includes a region representing few air, the processing device 120 may determine the type of the first image indicating that the first image includes a region representing few air.

In some embodiments, the processing device 120 may determine whether the first statistic result satisfies a first condition and the second statistic satisfies a second condition. The processing device 120 may further determine the type of a first image block based on whether the first statistic result of the first image block satisfies the first condition and whether the second statistic result of a second image block corresponding to the first image block satisfies the second condition. In response to determination that the first statistic result satisfies the first condition and the second statistic result satisfies the second condition, the processing device 120 may determine that the first image block includes a region representing air. In response to determination that the first statistic result satisfies the first condition and the second statistic result does not satisfy the second condition or the first statistic result does not satisfy the first condition and the second statistic result satisfies the second condition, the processing device 120 may determine that the first image block includes a region representing few air. In response to determination that the first statistic result does not satisfy the first condition and the second statistic result does not satisfy the second condition, the processing device 120 may determine that the first image block includes a region representing airless.

In some embodiments, the processing device 120 may compare the first statistic result with a first condition to obtain a first comparison result and compare the second statistic with a second condition to obtain a first comparison result. The processing device 120 may determine the type of a first image block based on the first comparison result and the second comparison result. In some embodiments, the first condition may include one or more first statistic thresholds each of which corresponds to one of one or more first statistic values in the first statistic result. The second condition may include one or more second statistic thresholds each of which corresponds to one of one or more second statistic values in the second statistic result. The first statistic thresholds and/or the second statistic thresholds may be set by a user or according to a default setting of the medical system 100. In some embodiments, the first statistic thresholds and/or the second statistic thresholds may be stored in a storage device (e.g., the storage device 130). The processing device 120 may obtain the first statistic thresholds and/or the second statistic thresholds from the storage device. In some embodiments, the first statistic thresholds and/or the second statistic thresholds may be determined based on prior statistical knowledge. The first statistic thresholds and/or the second statistic thresholds may be adjusted according to different application scenarios, which is not specifically limited in this disclosure.

In some embodiments, if each of the first statistic values of the second image block is less than a corresponding first statistic threshold of a first image block and each of the second statistic values of a second image block corresponding to the first image block exceeds a corresponding second statistic threshold, the processing device 120 may determine the type of the first image block indicating that the first image block includes a region void of air; if each of the first statistic values of the second image block exceeds a corresponding first statistic threshold of a first image block and each of the second statistic values of a second image block corresponding to the first image block is less than a corresponding second statistic threshold, the processing device 120 may determine the type of the first image block indicating that the first image block includes an air region.

For example, if the one or more first statistic values of the first image block includes a first mean value of gray values of pixels in the first image block, and the one or more second statistic values of a second image block corresponding to the first image block includes a second mean and a second standard deviation of gray values of the pixels in the second image block, the first condition may include a first mean threshold corresponding to the one or more first statistic values (i.e., the first mean) of the first image block, and the second condition may include a second mean threshold and a second standard deviation threshold corresponding to the statistics values (i.e., the second mean and the second standard deviation) of the second image block.

If the second mean of the second image block exceeds the second mean threshold, the second standard deviation of the second image block exceeds the second standard deviation threshold, and the first mean of the corresponding first image block is less than the first mean threshold, the processing device 120 may determine the type of the first image block indicating that the first image block includes a region void of air; if the second mean value of the second image block is less than the second mean threshold value, the second standard deviation of the second image block is less than the second standard deviation threshold, and the first second mean value of the corresponding first image block exceeds the second mean threshold, the processing device 120 may determine the type of the first image block indicating that the first image block includes an air region; if the second mean value of the second image block is less than the second mean threshold value, the second standard deviation of the second image block is less than the second standard deviation threshold, and the first second mean value of the corresponding first image block is less than the second mean threshold, or the second mean value of the second image block exceeds the second mean threshold value, the second standard deviation of the second image block exceeds the second standard deviation threshold, and the first second mean value of the corresponding first image block exceeds the second mean threshold, the processing device 120 may determine the type of the first image block indicating that the first image block includes an intermediate region.

In some embodiments, the processing device 120 may determine the type of the first image using an image classification model based on the first statistic result and the second statistic result. For example, the processing device 120 may input the first statistic result, and the second statistic result into the image classification model and obtain the type of the first image outputted by the image classification model. The image classification model may be obtained by a processing device that is the same as or different from the processing device 120 using a plurality of training samples based on a training algorithm (e.g., a backpropagation algorithm, a gradient descent algorithm, etc.). Each of the plurality of training samples may include a first statistic result, a second statistic result (e.g., one or more statistical values), and the corresponding image type of an image block or an image. More descriptions for the image classification model may be found elsewhere in the present disclosure (e.g., FIG. 14, and the descriptions thereof).

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 16:
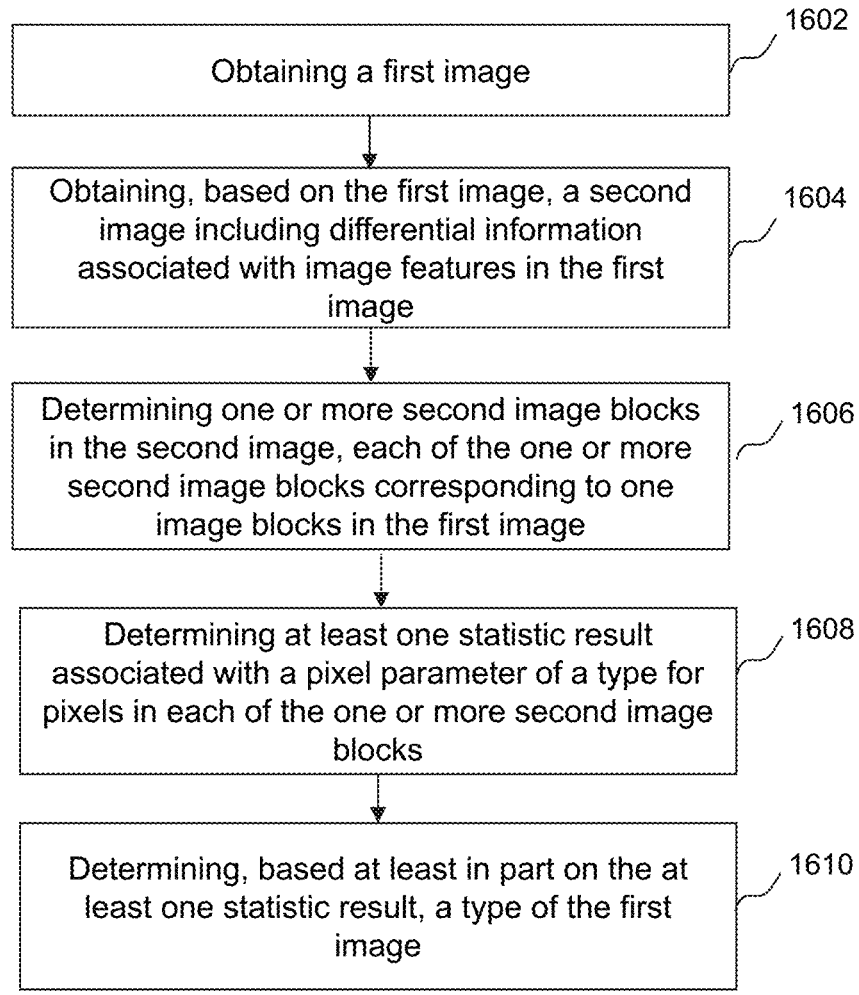
FIG. 16 is a flowchart for an exemplary process for determining image type according to some embodiments of the present disclosure.

FIG. 16 is a flowchart for an exemplary process for determining image type according to some embodiments of the present disclosure. In some embodiments, process 1600 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the terminal 140, the processor 210 and/or the CPU 340 may be configured to perform the process 1600. The operations of the illustrated process presented below are intended to be illustrative. In some embodiments, the process 1600 may be accomplished with one or more additional operations not described and/or without one or more of the operations discussed. Additionally, the order of the operations of the process 1600 illustrated in FIG. 16 and described below is not intended to be limiting.

In 1602, the processing device 120 (e.g., the acquisition module 1302) may obtain a first image.

In some embodiments, the first image may be obtained as described in connection with operation 1402 as described in FIG. 14.

In 1604, the processing device 120 (e.g., the acquisition module 1302) may obtain a second image based on the first image.

In some embodiments, the second image may include difference information of the first image. The second image may be obtained as described in connection with operation 1502 as described in FIG. 15.

In 1606, the processing device 120 (e.g., the image block determination module 1304) may determine one or more second image blocks in the second image.

The one or more second image blocks in the second image may correspond to one of one or more first image blocks in the first image. In some embodiments, the one or more second image blocks in the second image may be determined as described in connection with operation 1504 as described in FIG. 15.

In 1608, the processing device 120 (e.g., the image type determination module 1308) may determine at least one statistic result associated with a pixel parameter of a type for pixels in each of the one or more second image blocks.

In some embodiments, the processing device 120 may determine at least one statistic result associated with a pixel parameter of a type for pixels in each of the one or more second image blocks. The at least one statistic result may also be referred to as the second statistic result as described elsewhere in the present disclosure. More descriptions for determining the second statistic result may be found in FIG. 15 and the descriptions thereof.

In 1610, the processing device 120 (e.g., the image type determination module 1308) may determine a type of the first image based at least in part on the at least one statistic result.

The type of the first image may indicate whether the first image includes a region representing air. For example, the type of the first image may include that the first image includes a region representing air (or referred to as an air region for brevity), that the first image lacks or does not include any air region, or that the first image includes one or more intermediate regions. For example, the type of the first image may include that the first image includes a region representing air, the first image does not include a region representing air, or the first image includes one or more other regions. More descriptions for the type of the first image may be found elsewhere in the present disclosure (e.g., FIG. 14 and the descriptions thereof).

In some embodiments, the processing device 120 may determine the type of the first image based on the type of each of the one or more second image blocks. For example, if one of the one or more second image blocks includes an air region, the type of the first image may indicate that the first image includes an air region. If all regions corresponding to the second image blocks are void of air, the first image may not include or lack any air region. If one of the one or more second image blocks, the first image may include an intermediate region, the type of the first image may indicate that the first image includes an intermediate region.

In some embodiments, the processing device 120 (e.g., the image type determination module 1308) may determine the type of the first image by comparing the at least one statistic result with a condition. The condition may include one or more statistic thresholds corresponding to the one or more statistic values in the statistic result. The statistic thresholds may be set by a user or according to a default setting of the medical system 100. In some embodiments, the statistic thresholds may be stored in a storage device (e.g., the storage device 130). The processing device 120 may obtain the second statistic thresholds from the storage device. In some embodiments, the statistic thresholds may be determined based on prior statistical knowledge. The statistic thresholds may be adjusted according to different application scenarios, which is not specifically limited in this disclosure.

In some embodiments, the processing device 120 may compare the statistic result of a second image block with the one or more statistic thresholds to obtain a comparison result. The processing device 120 may determine the type of the second image block based on the comparison result. For example, if the statistical result includes a mean and a standard deviation of gray values of pixels in a second image block, the condition may include a mean threshold and a standard deviation threshold. The processing device 120 may compare the mean with the mean threshold and compare the standard deviation with the standard deviation threshold to obtain the comparison result. In some embodiments, the comparison result may include a magnitude relationship between each statistic value and its corresponding threshold. For example, the comparison result may be that the mean exceeds the mean threshold, and the standard deviation exceeds the standard deviation threshold. After obtaining the comparison result, the type of the second image block may be obtained. For example, if the comparison result of a second image block is that the mean exceeds the mean threshold and the standard deviation exceeds the standard deviation threshold, the processing device 120 may determine that the second image block in the second image includes a region void of air. If the processing device 120 determines that a region corresponding to each of the one or more second image blocks in the second image includes a region void of air, the processing device 120 may determine that the type of the first image indicating that the first image does not or lack any air region.

If the comparison result of a second image block is that the mean is less than the mean threshold and the s standard deviation is less than the second standard deviation threshold, the processing device 120 may determine that the second image block includes an air region. The processing device 120 may determine the type of the first image indicating that the first image includes an air region.

If the comparison result of a second image block is that the mean exceeds or equals the mean threshold and the standard deviation is less than or equal to the standard deviation threshold, or the comparison result of a second image block is that the mean is less than or equal to the mean threshold and the standard deviation exceeds or equals the standard deviation threshold, the processing device 120 may determine that the second image block includes an intermediate region. The processing device 120 may further determine the type of the first image indicating that the first image includes an intermediate region.

In some embodiments, the processing device 120 may determine the type of the first image using an image classification model based on the statistic result. The image classification model may be obtained by a processing device that is the same as or different from the processing device 120 using a plurality of training samples based on a training algorithm (e.g., a backpropagation algorithm, a gradient descent algorithm, etc.). Each of the plurality of training samples may include a statistic result (e.g., one or more statistical values) and the corresponding image type of an image block or an image.

FIG. 17A is a schematic diagram illustrating an exemplary first image according to some embodiments of the present disclosure. As shown in FIG. 1A7, the first image includes a size of 3×3. The position of each pixel in the first image may be denoted by a row (denoted by a number p) and a column (denoted by number q) where the pixel belongs to. For example, the position of a pixel in the first row and the first column is denoted as 1/1. The value of a pixel parameter (e.g., pixel value, grayscale, or brightness) of each pixel may be denoted by a letter, for example, A, B, C, etc.

An operation image of the first image as shown in FIG. 17A may be obtained by performing an algebraic operation on pixel values of corresponding pixels that are in multiple rows and the same column of the first image. For example, FIG. 17B shows a first operation image of the first image as shown in FIG. 17A according to some embodiments of the present disclosure. As shown in FIG. 17B, a subtraction operation was performed between pixel values of corresponding pixels in two adjacent rows of the first image to obtain the first operation image in FIG. 17B. Pixel values of pixels in the first row of the first operation image were determined by subtracting pixel values of corresponding pixels in the second row of the first image from pixel values of corresponding pixels in the first row of the first image. Especially, the pixel value of pixel 1/1 in the first operation image in FIG. 17B is equal to a difference between pixel values of pixel 1/1 and pixel 2/1, i.e., A-D. The pixel value of pixel 1/2 is equal to a difference between pixel values of pixel 1/2 and pixel 2/2, i.e., B-E. The pixel value of pixel 1/3 is equal to a difference between pixel values of pixel 1/3 and pixel 2/3, i.e., C-F. Pixel values of the pixels in the second row of the first operation image were determined by subtracting pixel values of corresponding pixels in the third row of the first image from pixel values of corresponding pixels in the second row of the first image. The pixel values of pixels 2/1, 2/2, and 2/3 in the first operation image in FIG. 17B is equal to D-G, E-H, and F-I, respectively.

For the pixels in the third row of the first image, since the third row is the last row of the first image, the subtraction operation may be not performed on the third row. After the subtraction operation was performed, the first operation image with a size of 2×3 was obtained as shown in FIG. 17B.

In some embodiments, the first operation image as shown in FIG. 17B may include a third row. The pixel value of each of pixels in the third row of the first operation image may be equal to a pixel value of a corresponding pixel in the third row of the first image.

As another example, FIG. 17C shows a second operation image of the first image as shown in FIG. 17A according to some embodiments of the present disclosure. As shown in FIG. 17C, a subtraction operation was performed between pixel values of corresponding pixels in two adjacent columns of the first image to obtain the second operation image in FIG. 17B.

Pixel values of the pixels in the first column of the operation image were determined by subtracting pixel values of corresponding pixels in the second column of the first image from pixel values of corresponding pixels in the first column of the first image. Especially, the pixel value of pixel 1/1 in the second operation image in FIG. 17C is equal to a difference between pixel values of pixel 1/1 and pixel 1/2, i.e., A-B. The pixel value of pixel 2/1 is equal to a difference between pixel values of pixel 1/1 and pixel 2/2, i.e., D-E. The pixel value of pixel 3/1 is equal to a difference between pixel values of pixel 3/1 and pixel 3/2 i.e., G-H.

Pixel values of the pixels in the second column of the second operation image were determined by subtracting pixel values of corresponding pixels in the third column of the first image from pixel values of corresponding pixels in the second column of the first image. The pixel values of pixels 1/2, 2/2, and 3/2 in the second operation image in FIG. 1A7B is equal to D-G, E-H, and F-I, respectively.

For the pixels in the third column of the first image, since the third column is the last column of the first image, the subtraction operation may be not performed on the third column. After the subtraction operation was performed, the second operation image with a size of 3×2 was obtained as shown in FIG. 17C.

In some embodiments, the second operation image shown in FIG. 17C may include a third column. The pixel value of each of pixels in the third column may be equal to the pixel value of a corresponding pixel in the third column of the first image.

In some embodiments, the processing device 120 may perform one or more algebraic operations on the pixel values of corresponding pixels in the first operation image and the second operation image to obtain one or more third operation images. For example, FIG. 18A-18B show third images obtained based on the first operation image and the second operation image as shown in FIG. 17B and FIG. 17C according to some embodiments of the present disclosure. An add operation is performed between pixel values of corresponding pixels in the first operation image and the second operation image.

In a third operation image as shown in FIG. 18A, the pixel value of pixel 1/1 is equal to (|A−B|+|A−D|), the pixel value of pixel 1/2 is equal to (|B−E|+|B−C|), the pixel value of pixel 2/1 is equal to (|D−G|+|D−E|), and the pixel value of pixel 2/2 is equal to (|E−H|+|E−F|).

The first operation image and the second operation image are in different sizes. The size of a third image may be determined based on the sizes of the first operation image and the second operation image. For example, the length of the first operation image is less than the width of the first image. The length of the second first operation image exceeds the width of the first image. The third image may include the length the same as the width. As shown in FIG. 18A, the width of the third operation image is equal to the width of the first operation image and the length of the third image is equal to the length of the second operation image. As shown in FIG. 18B, the width of the third operation image is equal to the width of the second operation image and the length of the third image is equal to the length of the first operation image.

As the width of the first operation image exceeds the width of the second operation image, each of pixels in the third column in the first operation image may not include a corresponding pixel in the second operation image when performing the add operation. The pixels in the third row of the third operation image in FIG. 18A may be determined based on the pixel values of the pixels in the third row of the first operation image and/or the pixel values of the pixels in the third row of the first image. For example, the pixel values of the pixels in the third column of the first operation image may be designated as pixel values of pixels in the third column of the third operation image in FIG. 18A. Especially, the pixel value of pixel 1/3 is equal to (|C−F|), the pixel value of pixel 2/3 is equal to (|F−I|), and the pixel value of pixel 3/3 is equal to I.

As the length of the second operation image exceeds the length of the first operation image, each of pixels in the third row in the second operation image may not include a corresponding pixel in the first operation image when performing the add operation. The pixels in the third row of the third operation image in FIG. 18A may be determined based on pixel values of the pixels in the third row of the first operation image and/or pixel values of pixels in the third row of the first image. For example, the pixel value of pixel 3/1 is equal to (|G−H|), the pixel value of pixel 3/2 is equal to |H−I|, and the pixel value of pixel 3/3 is equal to I.

As shown in FIG. 18B, pixels in the third column of the first operation image were removed and pixels in the third row of the second operation image to obtain the same size of the first operation image and the second operation image. The third image was obtained by performing an add operation between pixel values of corresponding pixels in the first operation image were removed and the second operation image with the same size.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 21:
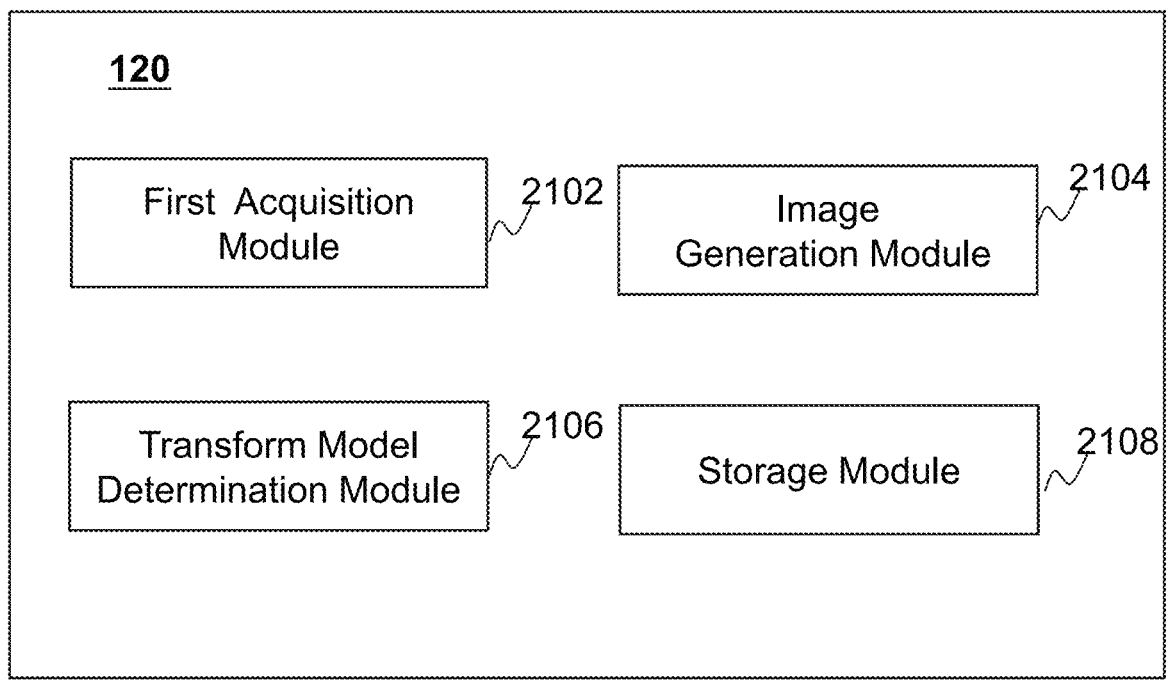
FIG. 21 is a schematic diagram illustrating an exemplary processing device for processing image according to some embodiments of the present disclosure.

FIG. 21 is a schematic diagram illustrating an exemplary processing device for processing image according to some embodiments of the present disclosure. As shown, the processing device 120 may include a first acquisition module 2102, an image generation module 2104, a transform model determination module 2106, and a storage module 2108. In some embodiments, the first acquisition module 2102, the image generation module 2104, the transform model determination module 2106, and the storage module 2108 may be connected to and/or communicate with each other via a wireless connection (e.g., a network), a wired connection, or a combination thereof.

The first acquisition module 2102 may be configured to obtain an image of a subject. In some embodiments, the image may include a medical image. For example, the image may include a DR image, an MR image, a PET image, a CT image, a DBT device, etc. The subject may be biological or non-biological. For example, the subject may include a patient, a man-made object, etc. As another example, the subject may include a specific portion (e.g., the chest, the abdomen, the head, the waist, etc.), organ, and/or tissue of a patient. More descriptions for the subject may be found elsewhere in the present disclosure (e.g., FIG. 1A and the descriptions thereof).

In some embodiments, the first acquisition module 2102 may obtain the image from the storage device 130, a local storage device (e.g., a storage device implemented on the terminal device(s) 140) or other storage devices that be in communication with the processing device 120. In some embodiments, the first acquisition module 2102 may obtain the image from an imaging device (e.g., the medical device 110). The imaging device may include a digital X radiographic device (e.g., a DR device, a CT device, etc.).

The image may include image information, such as a signal to noise ratio, gray values, a contrast, a resolution, etc.

The image generation module 2104 may be configured to generate one or more images.

In some embodiments, the image generation module 2104 may generate a first image and a second image based on the image of the subject. In some embodiments, the first image may represent low-frequency information in the image, and the second image may represent high-frequency information in the image. The low-frequency information in the image may also be referred to as a low-frequency component or low-frequency signal.

In some embodiments, the image generation module 2104 may obtain the first image using a low-pass filter to filter the image. The image may include gray values of pixels denoted by f(i,j). The first image may include gray values denoted by $f_L(i,j)$, and (i,j) represent the position of each pixel in the image or the first image.

In some embodiments, the image generation module 2104 may obtain the second image by subtracting the gray value $f_L(i,j)$ of a pixel in the first image from the gray value f(i,j) of a corresponding pixel in the image.

In some embodiments, the image generation module 2104 may obtain the gray values $f_H(i,j)$ of the second image by filtering the image using a high-pass filter. In some embodiments, the image generation module 2104 may obtain the first image by subtracting the gray value $f_H(i,j)$ of each pixel of the second image from the gray value f(i,j) of a corresponding pixel in the image.

In some embodiments, the image generation module 2104 may determine a third image by processing the first image using a local transform model.

In some embodiments, the image generation module 2104 may input the gray values of the pixels in the first image into the local transform model.

In some embodiments, the image generation module 2104 may adjust gray values of pixels in each of a portion of the multiple ranges using a corresponding transform sub-model to obtain the third image.

In some embodiments, the image generation module 2104 may determine a target image of the subject based on the third image and the second image.

In some embodiments, the image generation module 2104 may determine the target image by fusing the third image (also referred to as a first low-frequency image) and the second image.

In some embodiments, the image generation module 2104 may transform the second image (i.e., the high-frequency image) to obtain a fourth image (also referred to as a first high-frequency image). In some embodiments, the image generation module 2104 may determine the target image by fusing the third image and the fourth image.

In some embodiments, the image generation module 2104 may transform the third image using a global transform model to obtain a fifth image (also referred to as a transformed third image or second low-frequency image). In some embodiments, the image generation module 2104 may determine the target image based on the fifth image and the second image.

In some embodiments, the image generation module 2104 may transform the second image (i.e., the high-frequency image) based on a transform ratio between corresponding pixels in the fifth image and the first image to obtain a sixth image (also referred to as second high-frequency image). In some embodiments, the image generation module 2104 may determine the target image by fusing the fifth image and the sixth image.

The transform model determination module 2106 may be configured to determine one or more transform models. In some embodiments, a transform model may be configured to equalize an image. For example, the transform model determination module 2106 may determine a local transform model. In some embodiments, the transform model determination module 2106 may determine multiple ranges of gray values represented in the first image. For example, the first image may include a target region and a background region. The target region in the first image may include a representation of at least a portion of the subject. The background region may include a representation of air. The image generation module 2104 may determine the multiple ranges of gray values based on a segmentation threshold between the target region and the background region. The transform model determination module 2106 may determine the local transform model based at least in part on the multiple ranges of the gray values of the pixels in the first image.

In some embodiments, the transform model determination module 2106 may determine multiple transform sub-models each of which corresponds to one of the multiple ranges based at least in part on the corresponding range of gray values. In some embodiments, the transform model determination module 2106 may determine the local transform local based on the multiple transform sub-models.

In some embodiments, the transform model determination module 2106 may determine the local transform model based on multiple local equalization intensities each of which corresponds to one of the multiple ranges.

In some embodiments, the transform model determination module 2106 may determine a global transform model.

In some embodiments, the transform model determination module 2106 may determine transform ratios each of which corresponds to two corresponding pixels in the transformed third image and the first image, based on a gray value of each of pixels in the fifth image and a gray value of each of pixels in the first image.

The storage module 2108 may be configured to store data, instructions, and/or any other information for image equalization. For example, the storage module 2108 may store the image of the subject, transform models, etc. In some embodiments, the storage module 2108 may be the same as the storage device 130 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, some other components/modules may be added into and/or omitted from the processing device 120.

Figure 22:
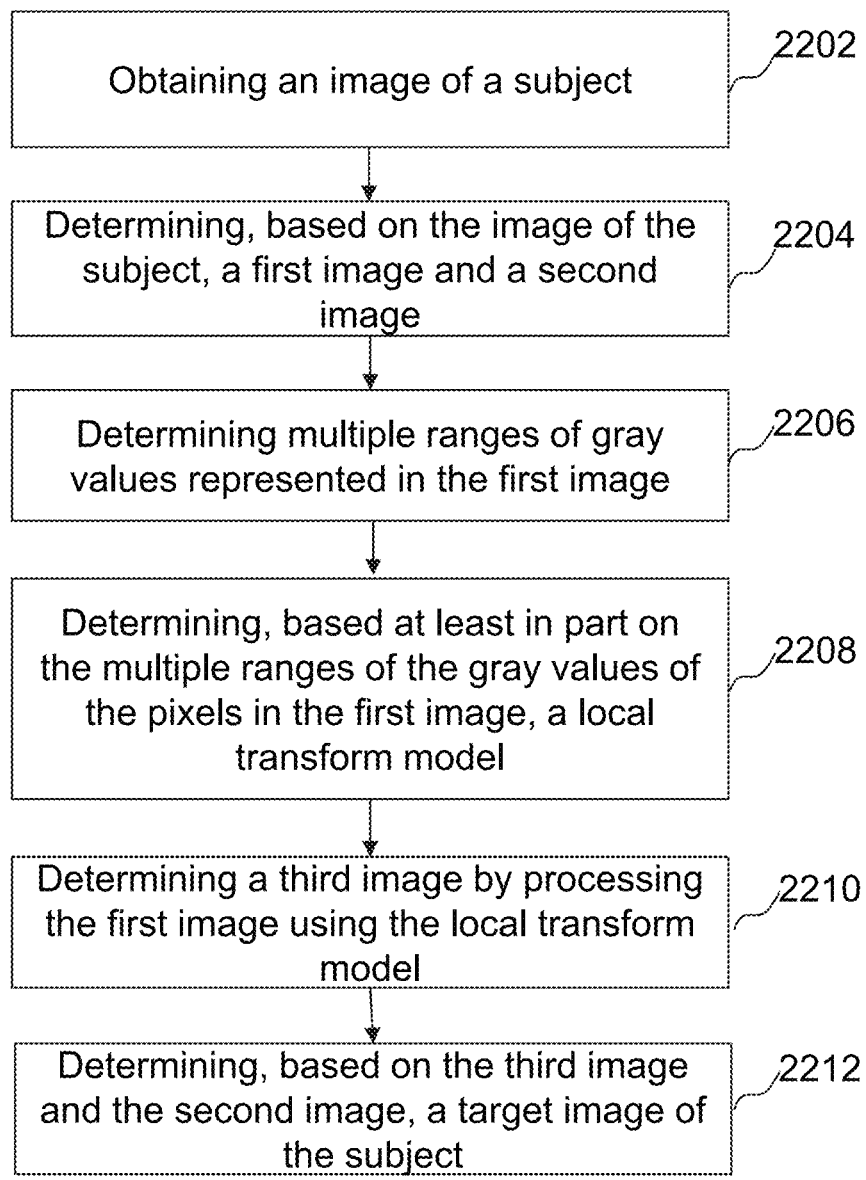
FIG. 22 is a flowchart illustrating an exemplary process for image equalization according to some embodiments of the present disclosure.

FIG. 22 is a flowchart illustrating an exemplary process for image equalization according to some embodiments of the present disclosure. In some embodiments, process 2200 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the terminal 140, the processor 210 and/or the CPU 340 may be configured to perform the process 2200. The operations of the illustrated process presented below are intended to be illustrative. In some embodiments, the process 2200 may be accomplished with one or more additional operations not described and/or without one or more of the operations discussed. Additionally, the order of the operations of the process 2200 illustrated in FIG. 22 and described below is not intended to be limiting.

In 2202, the processing device 120 (e.g., the first acquisition module 2102) may obtain an image of a subject.

In some embodiments, the image may include a medical image. For example, the image may include a DR image, an MR image, a PET image, a CT image, a DBT device, etc. The subject may be biological or non-biological. For example, the subject may include a patient, a man-made object, etc. As another example, the subject may include a specific portion (e.g., the chest, the abdomen, the head, the waist, etc.), organ, and/or tissue of a patient. More descriptions for the subject may be found elsewhere in the present disclosure (e.g., FIG. 1A and the descriptions thereof).

In some embodiments, the processing device 120 may obtain the image from the storage device 130, a local storage device (e.g., a storage device implemented on the terminal device(s) 140) or other storage devices that be in communication with the processing device 120. In some embodiments, the processing device 120 may obtain the image from an imaging device (e.g., the medical device 110). The imaging device may include a digital X radiographic device (e.g., a DR device, a CT device, etc.).

The image may include image information, such as a signal to noise ratio, gray values, a contrast, a resolution, etc.

In 2204, the processing device 120 (e.g., the image generation module 2104) may determine a first image and a second image based on the image of the subject.

In some embodiments, the first image may represent low-frequency information in the image, and the second image may represent high-frequency information in the image. The low-frequency information in the image may also be referred to as a low-frequency component or low-frequency signal. The low-frequency information in the image may relate to pixels in a region whose pixel values change smoothly. The first image may also be referred to as a low-frequency image. The high-frequency information in the image may also be referred to as a high-frequency component or high-frequency signal. The high-frequency information in the image may relate to pixels in a region (e.g., noises, edges, etc.) whose pixel values change dramatically. The second image may also be referred to as a high-frequency image.

In some embodiments, the processing device 120 may obtain the first image using a low-pass filter to filter the image. The image may include gray values of pixels denoted by $f(i,j)$. The first image may include gray values denoted by $f_L(i,j)$, and $(i,j)$ represent the position of each pixel in the first image. In some embodiments, the low-pass filter may include a mean filter, a bilateral filter, a Gaussian filter, a median filter, a universal filter, a separable filter, or the like.

In some embodiments, the processing device 120 may obtain the second image by subtracting the gray value $f_L(i,j)$ of a pixel in the first image from the gray value $f(i,j)$ of a corresponding pixel in the image. The second image may include gray values denoted by $f_H(i,j)$, and $(i,j)$ represent the position of each pixel in the second first image.

In some embodiments, the processing device 120 may obtain the gray values $f_H(i,j)$ of the second image by filtering the image using a high-pass filter. In some embodiments, the processing device 120 may obtain the first image by subtracting the gray value $f_H(i,j)$ of each pixel of the second image from the gray value $f(i,j)$ of a corresponding pixel in the image.

In 2206, the processing device 120 (e.g., the transform model determination module 2106) may determine multiple ranges of gray values represented in the first image.

In some embodiments, the first image may include a target region and a background region. The target region in the first image may include a representation of at least a portion of the subject. The background region may include a representation of air. The target region in the first image may be formed based on projection data generated after X-rays pass through the subject and detected by a detector in an imaging device. The background region in the first image may be formed based on projection data generated after X-rays pass through air while not pass through the subject and detected by the detector in the imaging device.

In some embodiments, the processing device 120 may determine the multiple ranges of gray values based on a segmentation threshold between the target region and the background region. For example, the multiple ranges may include at least one first range from a minimum gray value among the gray values of pixels in the first image to the segmentation threshold between the target region and the background region and at least one second range from the segmentation threshold between the target region and the background region to a maximum gray value among the gray values of pixels in the first image. The at least one first range may include gray values of pixels in the target region representing the subject and the at least one second range may include gray values in the background region in the first image.

Figure 26:
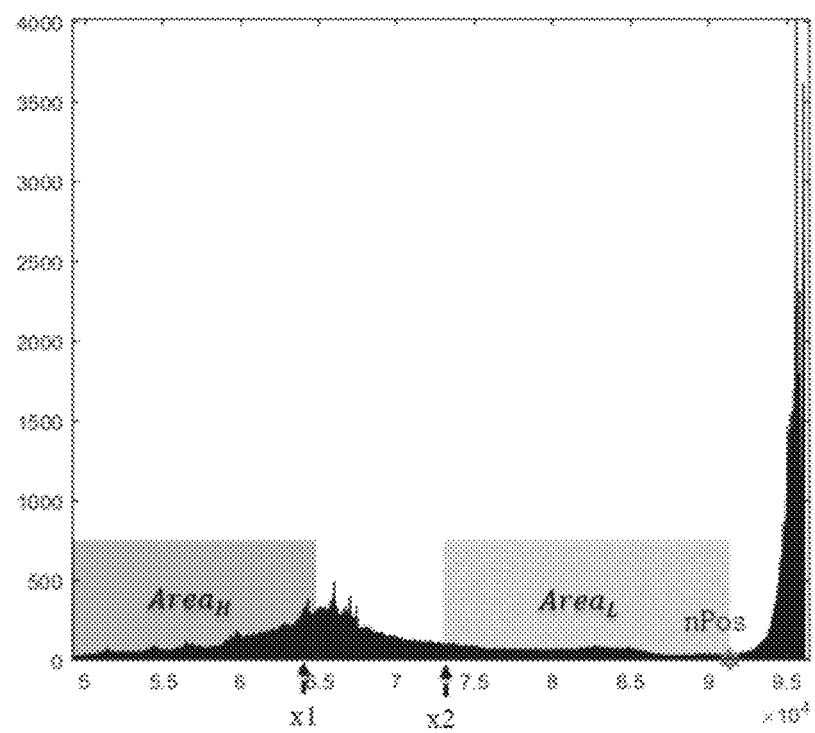
FIG. 26 shows a grayscale histogram of a low-frequency image according to some embodiments of the present disclosure.

For example, FIG. 26 shows a grayscale histogram of a low-frequency image according to some embodiments of the present disclosure. As shown in FIG. 26, the abscissa of the grayscale histogram represents the gray values of the pixels in the first image. The ordinate represents a count of pixels with a certain gray value in the low-frequency image (e.g., the first image). The at least one first range may be a range of [$f_L$ Min,nPos] including gray values of pixels in the target region representing at least a portion of a subject and the at least one second range may be a range of (nPos,$f_L$ Max]) including gray values in a background region in the first image. $f_L$ Min refers to the minimum gray value among the gray values of pixels in the first image. $f_L$ Max refers to the maximum gray value among the gray values of pixels in the first image. nPos refers to the segmentation threshold between the target region and the background region.

In some embodiments, the at least one first range may include multiple third ranges corresponding to different portions (e.g., a tissue of different types, such as the lung, the muscle, a low-density bone, a high-density bone) of the subject. The processing device 120 may divide the at least one first range into the multiple third ranges based on a ratio of a volume of each portion to a volume of the subject. The multiple ranges may include the at least one second range and the multiple third ranges. For example, the processing device 120 may determine one or more dividing points (e.g., (x1,x2) as shown in FIG. 26) between the multiple third ranges based on the ratio of the volume of each portion to the volume of the subject.

In some embodiments, the one or more third ranges may include a high-attenuation range (e.g., [$f_L$ Min,x1] as shown in FIG. 26), an intermediate range (e.g., (x1, x2] as shown in FIG. 26), and a low-attenuation range (e.g., (x2, nPos] as shown in FIG. 26). As used herein, the high-attenuation range may include gray values of pixels in the first image that represent a portion of the subject whose attenuation coefficient of X-ray exceeds a threshold (e.g., bone tissue). The low-attenuation range may include gray values of pixels in the first image that represent a portion of the subject whose attenuation coefficient of X-ray is less than a threshold (e.g., muscular tissue). The intermediate range may include gray values of pixels in the first image that represent a transition portion (e.g., a tissue between the bone tissue and the muscular tissue) of the subject between the portion of the subject corresponding to the high-attenuation range and the portion of the subject corresponding to the low-attenuation range.

Figure 23:
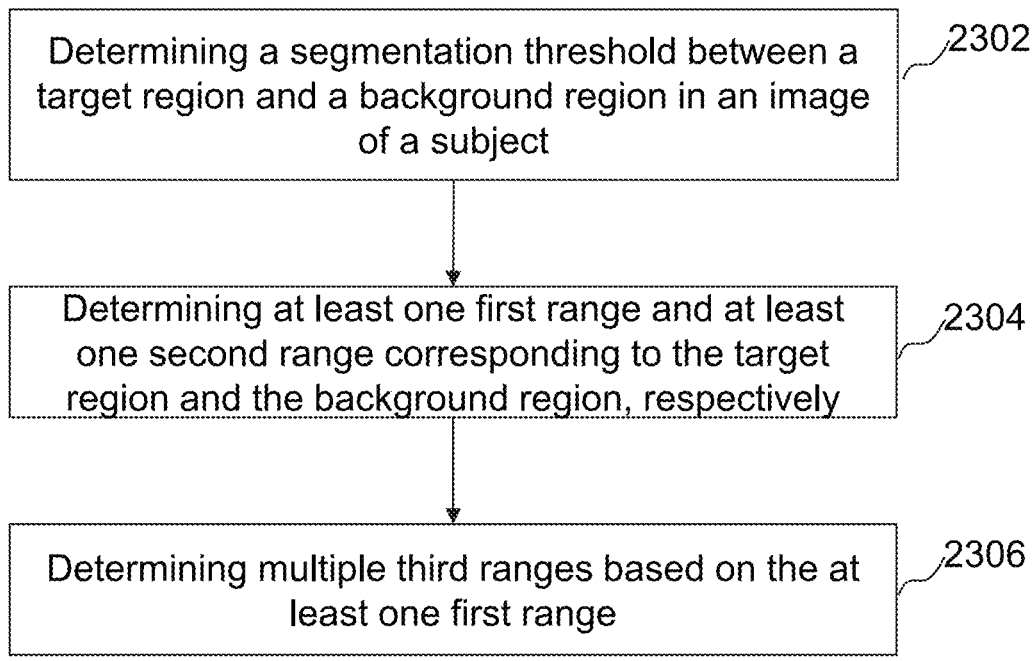
FIG. 23 is a flowchart illustrating an exemplary process for determining multiple ranges of gray values in an image according to some embodiments of the present disclosure.

More descriptions for determining the multiple ranges may be found in FIG. 23 and the descriptions thereof.

In 2208, the processing device 120 (e.g., the transform model determination module 2106) may determine a local transform model based at least in part on the multiple ranges of the gray values of the pixels in the first image.

The local transform model may be configured to adjust at least a portion of the gray values of the pixels in the first image. For example, the local transform model may be used to equalize the gray values of the pixels in the first image. The local transform model may correspond to different local equalization intensities each of which is applicable for gray values in one of the multiple ranges.

In some embodiments, the processing device 120 may determine multiple transform sub-models each of which corresponds to one of the multiple ranges based at least in part on the corresponding range of gray values. The processing device 120 may determine the local transform local based on the multiple transform sub-models. For example, the local transform model may include the multiple transform sub-models. As another example, the multiple transform sub-models may be integrated into the local transform sub-models. In some embodiments, the multiple transform sub-models may include a first transform sub-model corresponding to the at least one first range and a second transform sub-model corresponding to the at least one second range. In some embodiments, the multiple transform sub-models may include a transform sub-model corresponding to the high-attenuation range, a transform sub-model corresponding to the low-attenuation range, a transform sub-model corresponding to the intermediate range, and a transform sub-model corresponding to the background region of the subject.

In some embodiments, the local transform model may be denoted in the form of a function or a curve. The curve corresponding to the local transform model may also be referred to as a target transform curve. In some embodiments, the target transform curve may include multiple sections each of which includes a transform curve corresponding to one of the multiple ranges of the gray values of pixels in the first image. In some embodiments, the multiple sections of the target transform curve may be discontinuous. In some embodiments, the multiple sections of the target transform curve may be continuous. In some embodiments, the target transform curve may be obtained by fitting the multiple transform curves corresponding to the multiple ranges of the gray values of pixels in the first image.

In some embodiments, the processing device 120 may determine the local transform model based on multiple local equalization intensities each of which corresponds to one of the multiple ranges. For example, the processing device 120 may generate each of the multiple transform sub-models each of which corresponds to one of the multiple ranges based at least in part on the corresponding local equalization intensity. The processing device 120 may generate the local transform model based on the multiple transform sub-models.

As a further example, the processing device 120 may determine a slope of a transform curve corresponding to a specific range of the multiple ranges based on a local equalization intensity corresponding to the specific range and gray values in the specific range. The slopes of the multiple transform curves corresponding to the multiple ranges may be different as different local equalization intensities. The processing device 120 may determine the transform curve corresponding to the specific range of the multiple ranges based at least in part on the slope of the transform curve.

Figure 27:
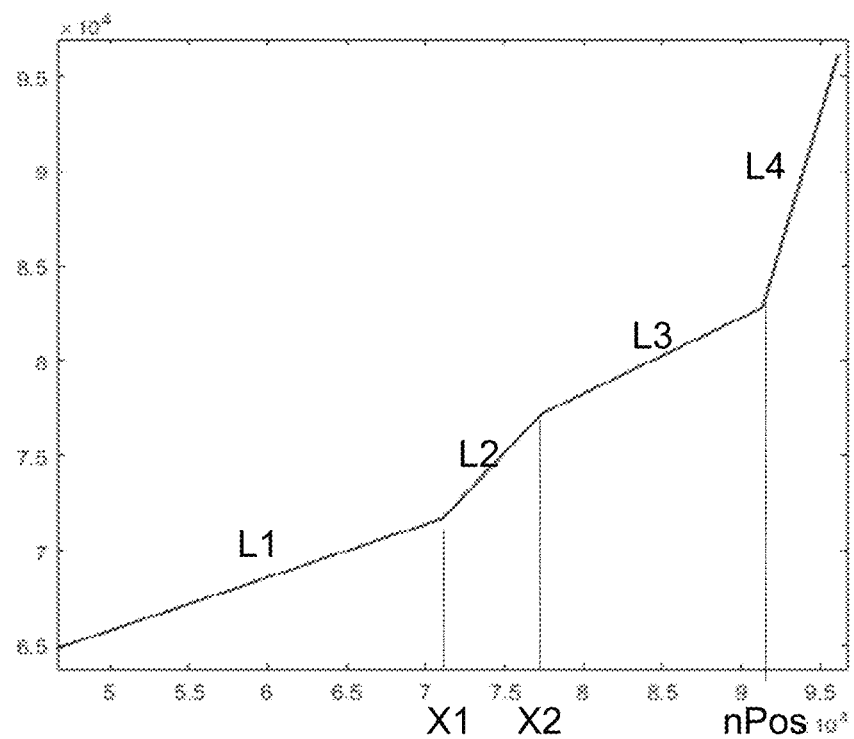
FIG. 27 shows a target transform curve corresponding to the multiple ranges according to some embodiments of the present disclosure.
Figure 28:
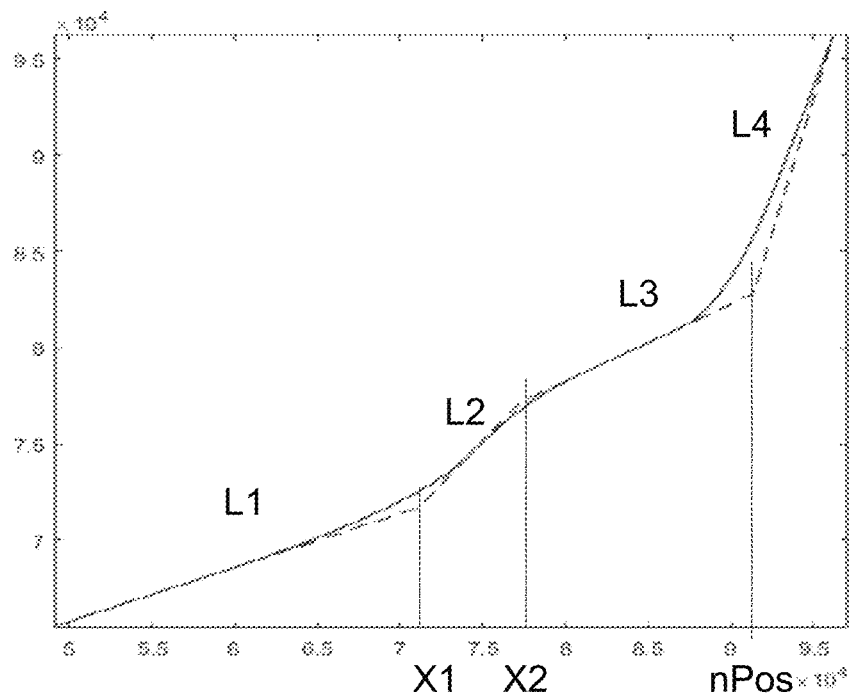
FIG. 28 shows a target transform curve corresponding to the multiple ranges according to some embodiments of the present disclosure.

In some embodiments, the target transform curve may include the multiple transform curves each of which corresponds to one of the multiple ranges. In some embodiments, the processing device 120 may obtain the local transform model (i.e., the target transform curve) by fitting the multiple transform curves corresponding to the multiple ranges of the gray values of pixels in the first image. For example, FIG. 27 shows a target transform curve corresponding to the multiple ranges according to some embodiments of the present disclosure. As shown in FIG. 27, the target transform curve includes multiple transform curves L1-L4 corresponding to ranges ($f_L$ Min, X1), (X1, X2), (X2, nPos), and (nPos, $f_L$ Max), respectively. FIG. 28 shows a target transform curve corresponding to the multiple ranges according to some embodiments of the present disclosure. As shown in FIG. 28, the target transform curve denoted by a dotted line was determined by fitting the multiple transform curves L1-L4. The target transform curve shown in FIG. 28 may be smoother than the target transform curve shown in FIG. 27. Exemplary fitting techniques may include the least square, a quadratic polynomial fitting, a cubic polynomial fitting, a semi-logarithmic fitting regression, a log-Log fitting regression, a logit-log fitting regression, a four-parameter fitting, a cubic spline interpolation, etc.

Figure 24:
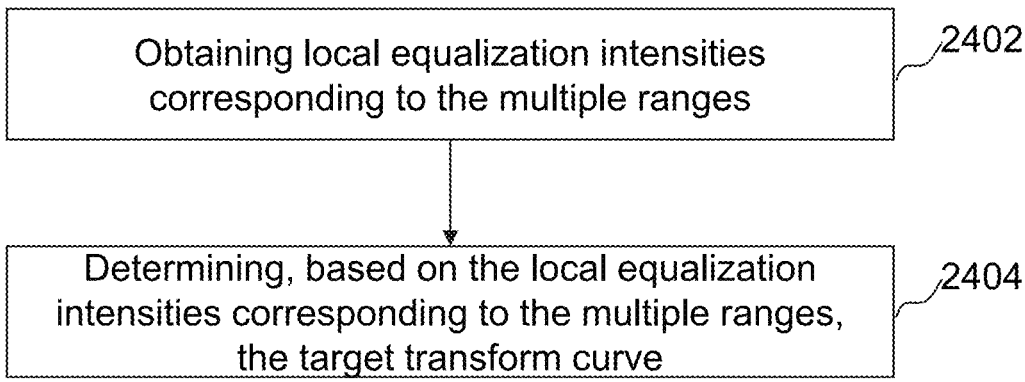
FIG. 24 is a flowchart illustrating an exemplary process for determining a local transform model for a low-frequency image according to some embodiments of the present disclosure.

More descriptions for determining the local transform model may be found in FIG. 24 and the descriptions thereof.

In 2210, the processing device 120 (e.g., the image generation module 2104) may determine a third image by processing the first image using the local transform model.

In some embodiments, the processing device 120 may input the gray values of the pixels in the first image into the local transform model. The local transform model may generate gray values of pixels in the third image based on the inputted gray values. In some embodiments, the local transform model may include the multiple transform sub-models (e.g., the multiple transform curves) each of which corresponds to the multiple ranges of the gray values of pixels in the first image. The processing device 120 may adjust gray values of pixels in each of a portion of the multiple ranges using a corresponding transform sub-model to obtain the third image. Gray values of pixels in each of the rest portion of the multiple ranges may be unchanged or not adjusted.

As a further example, the local transform model may be denoted as the target transform curve. The gray value f(i,j) of a pixel in the first image may be transformed using a transform curve (e.g., the target transform curve or a section of the target transform curve) to obtain the gray value $g_L(i,j)=curve(f(i,j))$ of a corresponding pixel in the third image, where curve refers to the target transform curve, (i,j) refers the position (e.g., coordinates) of the pixel in the image or the third image. In some embodiments, if only one section of the target transform curve is used to transform the first image, only the pixels whose gray values are in one of the multiple ranges corresponding to the section of the target transform curve may be transformed, while the pixels whose gray values are in other ranges of the multiple ranges may be constant.

In some embodiments, the different sections of the target transform curve corresponding to different ranges may be applied to transform gray values of corresponding ranges. For example, a transform curve corresponding to the high-attenuation range may be used to transform gray values of pixels in a high-attenuation region in the image including pixels whose gray values are in the high-attenuation range. A transform curve corresponding to the low-attenuation range and may be used to transform gray values of pixels in a low-attenuation region in the first image, while gray values of pixels in other regions (e.g., the background region or a transition region between the high-attenuation region and the low-attenuation region) in the first image may be unchanged.

In 2212, the processing device 120 (e.g., the image generation module 2104) may determine a target image of the subject based on the third image and the second image.

In some embodiments, the processing device 120 may determine the target image by fusing the third image (also referred to as a first low-frequency image) and the second image. For example, the processing device 120 may add the gray value of each pixel in the third image and the gray value of the corresponding pixel in the second image to obtain the target image. As used herein, corresponding pixels in multiple images (e.g., the third image and the second image) may refer to pixels that are located in the same position in the multiple images (e.g., the third image and the second image).

In some embodiments, the processing device 120 may transform the second image (i.e., the high-frequency image) to obtain a fourth image (also referred to as a first high-frequency image). The processing device 120 may determine the target image by fusing the third image and the fourth image. In some embodiments, the processing device 120 may determine the fourth image based on a transform ratio between corresponding pixels in the third image and the first image. Each pixel in the third image may correspond to a transform ratio. The transform ratio between corresponding pixels in the third image and the first image may be determined according to Equation (1):

$$Ratio=|g_L(i,j)/f_L(i,j)-1|+1 \qquad (1),$$

where $g_L(i,j)$ denotes the gray value of a pixel in the third image, $f_L(i,j)$ denotes the gray value of a corresponding pixel in the first image.

In some embodiments, the fourth image may be obtained according to Equation (2):

$$g_H(i,j)=f_H(i,j)/Ratio^2 \qquad (2)$$

where $g_H(i,j)$ denotes the gray value of a pixel in the fourth image, and $f_H(i,j)$ denotes the gray value of a corresponding pixel in the second image.

In some embodiments, the processing device 120 may transform the third image using a global transform model to obtain a fifth image (also referred to as a transformed third image or second low-frequency image). The processing device 120 may determine the target image based on the fifth image and the second image. For example, the processing device 120 may determine the target image by fusing the fifth image and the second image.

As another example, the processing device 120 may transform the second image (i.e., the high-frequency image) based on a transform ratio between corresponding pixels in the fifth image and the first image to obtain a sixth image (also referred to as second high-frequency image). The processing device 120 may determine the target image by fusing the fifth image and the sixth image. The processing device 120 may determine the transform ratio between corresponding pixels in the fifth image and the first image according to Equation (1). The processing device 120 may determine the sixth image based on the transform ratio between each corresponding pixels in the fifth image and the first image according to Equation (2). More descriptions for determining the target image may be found in FIG. 25 and the descriptions thereof.

Accordingly, the systems and methods of the present disclosure may determine a local transform model based on different local equalization intensities that corresponding to different ranges of gray values in an image, which may be applicable to equalize gray values in different ranges in an image (especially for tissues including large differences in density), thus more image information in the image may be displayed, which may improve the display of the image. The window width and the window level for displaying the equalization image may not need to be adjusted repeatedly, which may improve the efficiency of an operator for observing the equalization image.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

FIG. 23 is a flowchart illustrating an exemplary process for determining multiple ranges of gray values in an image according to some embodiments of the present disclosure. In some embodiments, process 2300 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the terminal 140, the processor 210 and/or the CPU 340 may be configured to perform the process 2300. The operations of the illustrated process presented below are intended to be illustrative. In some embodiments, the process 2300 may be accomplished with one or more additional operations not described and/or without one or more of the operations discussed. Additionally, the order of the operations of the process 2300 illustrated in FIG. 23 and described below is not intended to be limiting. Operation 2206 in FIG. 22 may be performed according to process 2300 as illustrated in FIG. 23.

In 2302, the processing device 120 may determine a segmentation threshold between a target region and a background region in an image of a subject. The image may be a low-frequency image of the subject as described elsewhere in the present disclosure. The low-frequency image of the subject may be obtained as described in connection with operation 2204 in FIG. 2000.

In some embodiments, the processing device 120 may determine the segmentation threshold between the target region and the background region based on a gray value distribution of the first image according to process 1000.

In some embodiments, the processing device 120 may determine the segmentation threshold between the target region and the background region according to process 500.

In some embodiments, the processing device 120 may determine the segmentation threshold using an image segmentation technique. Exemplary image segmentation techniques may include using a maximum inter-class variance algorithm, an adaptive threshold segmentation algorithm, a maximum entropy threshold segmentation algorithm, an iterative threshold segmentation algorithm, etc. For example, using the maximum inter-class variance algorithm, the processing device 120 may determine a grayscale histogram of the image. The grayscale histogram of the image may include two peaks and a trough between the two peaks. The processing device 120 may designate the gray value corresponding to the trough as the segmentation threshold.

In some embodiments, the processing device 120 may determine the segmentation threshold based on at least one of a maximum gray value (denoted as $f_L$ Max), a minimum gray value (denoted as $f_L$ Min), a width of the grayscale histogram (i.e., a difference between the maximum gray value and the minimum gray value ($f_L$ Max–$f_L$ Min). For example, the processing device 120 may determine the segmentation threshold (e.g., nPos as shown in FIG. 26) by multiplying the maximum gray value of the image by a proportion or percentage (such as 90%). As another example, the processing device 120 may determine a gray value by multiplying the width of the grayscale histogram (i.e., ($f_L$ Max–$f_L$ Min)) of the image with a proportion or percentage (such as 90%). The processing device 120 may determine the segmentation threshold by adding the gray value to the minimum gray value ($f_L$ Min) of the first image. In some embodiments, the proportion or percentage may be set by a user or according to a default setting of the medical system 100. For example, the proportion or percentage may be determined according to a large number of experimental calculations or historical experience.

In some embodiments, the processing device 120 may determine the segmentation threshold using a threshold identification model. The threshold identification model may be obtained by a processing device that is the same as or different from the processing device 120 using a plurality of training samples based on a training algorithm (e.g., a backpropagation algorithm, a gradient descent algorithm, etc.). Each of the plurality of training samples may include a segmentation threshold of an image and the image. The threshold identification model may be obtained by the processing device training a machine learning model using the plurality of training samples. The machine learning model may be described elsewhere in the present disclosure. The processing device 120 may input the gray value distribution (e.g., a grayscale histogram) of the image or the image into the threshold identification model, then the segmentation threshold between the target region and the background region may be determined. In 2304, the processing device 120 may determine, based on the segmentation threshold, at least one first range and at least one second range corresponding to the target region and the background region, respectively.

The at least one first range may be from the minimum gray value among the gray values of pixels in the image to the segmentation threshold between the target region and the background region. The at least one second range may be from the segmentation threshold between the target region and the background region to the maximum gray value among the gray values of pixels in the image. The at least one first range may include gray values of pixels in the target region representing the subject and the at least one second range may include gray values in the background region in the image.

In 2306, the processing device 120 may determine multiple third ranges based on the at least one first range.

According to attenuation coefficients of X-ray, the type of tissue in the subject may include a high-attenuation portion, a low-attenuation portion, a transition portion between the high-attenuation portion and the low-attenuation portion, or the like, or a combination thereof. For example, the high-attenuation portion may have a greater attenuation coefficient of X-rays, such as bone tissue. The low-attenuation portion may have a smaller attenuation coefficient of X-rays such as muscle tissue. The transition portion may be a portion between bone tissue and muscle tissue. The multiple third ranges may include a high-attenuation range corresponding to the high-attenuation portion, a low-attenuation range corresponding to the low-attenuation portion, an intermediate corresponding to the transition portion, or the like, or a combination thereof.

The image may include a high-attenuation region, a low-attenuation region, a transition region between the high-attenuation region and the low-attenuation region, or the like, or a combination thereof, including a representation of the high-attenuation portion, the low-attenuation portion, the transition portion between the high-attenuation portion and the low-attenuation portion, or the like, or a combination thereof, respectively.

The high-attenuation region may include pixels whose gray values are in a high-attenuation range. The low-attenuation region may include pixels whose gray values are in a low-attenuation range. The transition region between the high-attenuation region and the low-attenuation region may include pixels whose gray values are in an intermediate range. The multiple third ranges may include the high-attenuation range, the low-attenuation range, and the intermediate range.

In some embodiments, the processing device 120 may divide the at least one first range into the multiple third ranges based on ratios of volumes of tissue of different types to the total volume of the subject. For example, the processing device 120 may determine a ratio (denoted as $Area_H$) of the volume of the high-attenuation portion to the total volume of the subject, a ratio (denoted as $Area_L$) of the volume of the low-attenuation portion to the total volume of the subject, and/or a ratio of the volume of the transition portion to the total volume of the subject. The processing device 120 may determine a first dividing point (also referred to as first inflection point) between the high-attenuation range and the intermediate range based on the ratio $Area_H$ and/or a second dividing point between the intermediate range and the low-attenuation range based on the ratio $Area_L$ according to Equation (3) and Equation (4), respectively:

$$x1 = f_L \text{ Min} + Area_H \times \text{HistogramSpan} \quad (3)$$

$$x2 = n\text{Pos} - Area_L \times \text{HistogramSpan} \quad (4),$$

where x1 refers to the first dividing point, x2 refers to the second dividing point, $f_L$ Min denotes the minimum gray value of the first image, HistogramSpan denotes the width of a grayscale histogram of the target region, nPos denotes the segmentation threshold of the target region and the background region, $Area_H$ denotes the ratio of the high-attenuation portion in the subject, and $Area_L$ denotes the ratio of the low-attenuation portion in the subject. The processing device 120 may determine the one or more third ranges may include the high-attenuation range (e.g., ($f_L$ Min, x1] as shown in FIG. 26,), the intermediate range ((x1, x2] as shown in FIG. 26), and the low-attenuation range ((x2, nPos] as shown in FIG. 26) based on the first dividing point and the second dividing point. The high-attenuation range may be from the minimum gray value to the first dividing point. The low-attenuation range may be from the second dividing point to the segmentation threshold. The intermediate range may be from the first dividing point to the second dividing point.

In some embodiments, the ratios $Area_H$ and/or $Area_L$ of the high-attenuation portion and low-attenuation portion may be determined based on a ratio recognition model. The ratio recognition model may be obtained by a processing device that is the same as or different from the processing device 120 using a plurality of training samples based on a training algorithm (e.g., a backpropagation algorithm, a gradient descent algorithm, etc.). Each of the plurality of training samples may include ratios of the high-attenuation portion and/or low-attenuation portion represented in an image and the image. The ratio recognition model may be obtained by the processing device training a machine learning model using the plurality of training samples. The machine learning model may be described elsewhere in the present disclosure.

The sum of ratios $Area_H$ and $Area_L$ does not exceed 1.

In some embodiments, the width HistogramSpan of the grayscale histogram of the target region may be determined according to Equation (5):

$$\text{HistogramSpan} = n\text{Pos} - f_L \text{ Min} \quad (5).$$

In some embodiments, the division of the range of the gray value may be automatically performed by the transform model determination module 2106 or may be performed by an operator via a user interface.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

FIG. 24 is a flowchart illustrating an exemplary process for determining a local transform model for a low-frequency image according to some embodiments of the present disclosure. In some embodiments, process 2400 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the terminal 140, the processor 210 and/or the CPU 340 may be configured to perform the process 2400. The operations of the illustrated process presented below are intended to be illustrative. In some embodiments, the process 2400 may be accomplished with one or more additional operations not described and/or without one or more of the operations discussed. Additionally, the order of the operations of the process 2400 illustrated in FIG. 24 and described below is not intended to be limiting. Operation 2208 in FIG. 22 may be performed according to process 2400 as illustrated in FIG. 24.

In 2402, the processing device 120 may obtain local equalization intensities corresponding to multiple ranges of gray values of pixels in an image. The image may be a low-frequency image of the subject as described elsewhere in the present disclosure. The low-frequency image of the subject may be obtained as described in connection with operation 2204 in FIG. 22. The multiple ranges of gray values of pixels in the image may be determined as described elsewhere in the present disclosure (e.g., FIGS. 22 and 23 and the descriptions thereof).

Each of the local equalization intensities may correspond to one of the multiple ranges. For example, the multiple ranges may include a high-attenuation range corresponding to the high-attenuation portion of the subject, a low-attenuation range corresponding to the low-attenuation portion of the subject, and an intermediate corresponding to the transition portion of the subject. The local equalization intensities may include an equalization intensity $Intensity_H$ corresponding to the high-attenuation range, an equalization intensity $Intensity_M$ corresponding to the intermediate range, an equalization intensity $Intensity_M$ corresponding to the low-attenuation range.

In some embodiments, the local equalization intensities may be set by a user or according to a default setting of the medical system 100. The processing device 120 may obtain the local equalization intensities from a storage device (e.g., the storage device 130). For example, the local equalization intensities may be inputted by an operator (such as a doctor) based on clinical experience or a large amount of experimental data via a user interface implemented on a terminal device (e.g., the terminal 140) or an imaging device (e.g., the medical device 110). As another example, the range of a local equalization intensity may be set to any value from 0 to 20. In some embodiments, the operator may adjust at least one of the local equalization intensities corresponding to one of the multiple ranges based on the effect of the target image. The user interface of the medical device 110 may include option controls corresponding to the equalization intensity of the high-attenuation range, the equalization intensity of the intermediate range, the equalization intensity of the low-attenuation range, and the equalization intensity of the image. For example, the option controls may include an input text box, sliding button, etc. The operator may enter or select different equalization intensities through the option controls.

In 2404, the processing device 120 may determine, based on the local equalization intensities corresponding to the multiple ranges, the target transform curve.

In some embodiments, the processing device 120 may determine, based on the local equalization intensities, multiple transform curves each of which corresponds to one of the multiple ranges. The processing device 120 may determine the target transform curve based on the multiple transform curves. For example, the target transform curve may include the multiple transform curves each of which corresponds to one of the multiple ranges. As another example, the processing device 120 may fit the multiple transform curves to generate the target transform curve.

In some embodiments, the slope of a transform curve and a local equalization intensity corresponding to one of the multiple ranges of the gray values of pixels in the image may be positively or negatively correlated. The processing device 120 may determine the slope of the transform curve based on the local equalization intensity corresponding to one of the multiple ranges of the gray values of pixels in the image. Further, the processing device 120 may determine the transform curve based on an end point of a transform curve corresponding to a previous range of the multiple ranges. For example, as shown in FIG. 26, the previous range of the intermediate range from inflection point X1 to inflection point X2 may be the high-attenuation range. The previous range of the low-attenuation range may be the intermediate range. In some embodiments, the processing device 120 may determine the transform curve corresponding to the high-attenuation range based on the slope corresponding to the transform curve and the mean gray value $f_L$Mean of the image.

In some embodiments, the relationship between the slope of a transform curve corresponding to one of the multiple ranges of gray values in the image and the equalization intensity corresponding to the range of gray values may be determined by a user or according to a default setting of the medical system 100. In some embodiments, the relationship between the slope of a transform curve corresponding to one of the multiple ranges of gray values in the image and the equalization intensity corresponding to the range of gray values may be determined based on a large amount of data, or based on clinical experience.

In some embodiments, the transform curve corresponding to each range of gray values may be determined according to the following Equations (6) to (9):

$$\text{Curve 1: } y_H = k1*x+b \tag{6}$$

$$\text{Curve 2: } y_M = k2*(x-x1)+y \tag{7}$$

$$\text{Curve 3: } y_L = k3*(x-x2)+y2 \tag{8}$$

$$\text{Curve 4: } y_B = k4*(x-x3)+y3 \tag{9}$$

where curve 1 corresponds to the high-attenuation range, curve 2 corresponds to the intermediate range, curve 3 corresponds to the low-attenuation range, and curve 4 corresponds to the second range corresponding to the background region.

The high-attenuation range may be [$f_L$ Min,x1], where b denotes a mean of gray values in the image, denoted as $f_L$Mean, k1 refers to the slope of curve 1, that is equal to 1−0.04*Intensity$_H$. Intensity$_H$ refers to the local equalization intensity corresponding to the high-attenuation range.

The intermediate range may be [x1+1,x2], y1 denotes Curve 1(x1)=k1*x1+b, i.e., the value of $y_H$ when x is equal to x1, k2 refers to the slope of Curve 2, that is equal to 1−0.04*Intensity$_M$, and x1 refers to the first dividing point between the high-attenuation range and the intermediate range. Intensity$_M$ refers to the local equalization intensity corresponding to the intermediate range.

The low-attenuation range may be [x2+1, nPos], y2 denotes Curve 2(x2)=k2*(x2−x1)+y1, i.e., the value of $y_M$ when x is equal to x2, k3 refers to the slope of Curve 3, that is equal to 1−0.04*Intensity$_L$. nPos refers to the segmentation threshold between the target region and the background region. Intensity$_L$ refers to the local equalization intensity corresponding to the low-attenuation range. x2 refers to the second dividing point between the low-attenuation range and the intermediate range.

The second range may be[nPos+1,$f_L$ Max], x3 denotes $f_L$ Max, y3 denotes Curve 3(nPos)=k3*(nPos−x2)+y2, i.e., the value of $y_L$ when x is equal to nPos, k4 refers to the slope of Curve 3, that is equal to ($f_L$ Max−Curve 3(nPos))/($f_L$ Max−nPos).

One or more local equalization intensities may be changed, and the slope of the transform curves determined based on the one or more local equalization intensities may be changed accordingly, thereby causing the change of one or more transform curves determined based on the changed local equalization intensities. When the gray values of the image are transformed by the transform curves, the display effect of the image may be changed.

Figure 29:
FIG. 29 illustrates target images obtained based on transform curves corresponding to the high-attenuation range according to some embodiments of the present disclosure.
Figure 29:
Figure 30:
FIG. 30 illustrates target images obtained based on transform curves corresponding to the low-attenuation range according to some embodiments of the present disclosure.
Figure 30:

In some embodiments, the user (e.g., an operator) may adjust the local equalization intensities corresponding to different ranges according to the display of the target image. For example, FIG. 29 illustrates target images obtained based on transform curves corresponding to the high-attenuation range according to some embodiments of the present disclosure. Image 1 as shown in FIG. 29 is a target image obtained using a transform curve determined based on a local equalization intensity corresponding to the high-attenuation range that is equal to 0. Image 2 as shown in FIG. 29 is a target image obtained using a transform curve determined based on a local equalization intensity corresponding to the high-attenuation range that is equal to 20. Image 1 and image 2 include representations of the same subject (a portion of a leg). The gray values corresponding to the high-attenuation range, i.e., the bone tissue in image 2 change with respect to the gray values corresponding to the high-attenuation range, i.e., the bone tissue in image 1. As another example, FIG. 30 illustrates target images obtained based on transform curves corresponding to the low-attenuation range according to some embodiments of the present disclosure. Image 1 as shown in FIG. 30 is a target image obtained using a transform curve determined based on a local equalization intensity corresponding to the low-attenuation range that is equal to 0. Image 2 as shown in FIG. 30 is a target image obtained using a transform curve determined based on a local equalization intensity corresponding to the low-attenuation range that is equal to 20. The gray values corresponding to the low-attenuation range, i.e., the muscle tissue in image 2 change with respect to the gray values corresponding to the low-attenuation range, i.e., the muscle tissue in image 1. The operator may adjust the local equalization intensities of different ranges according to actual needs.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 25:
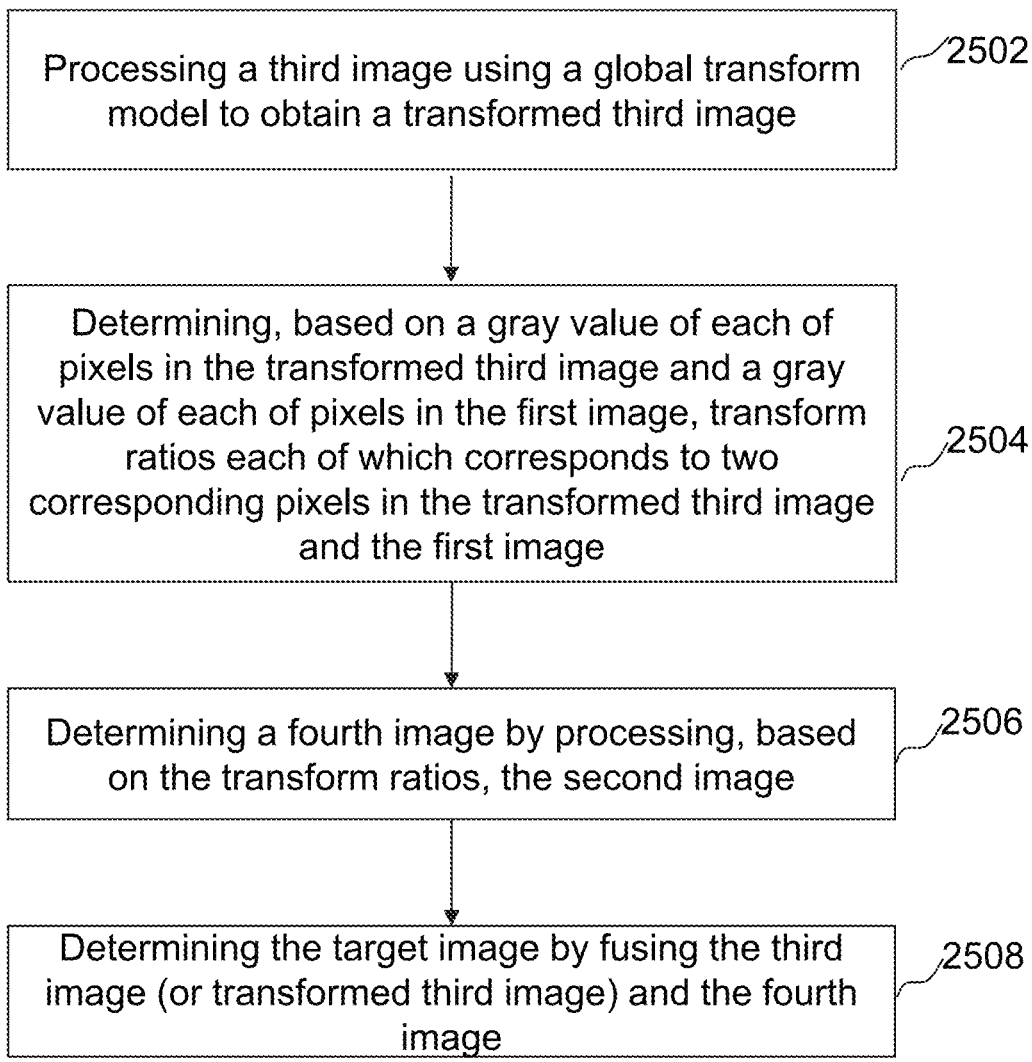
FIG. 25 is a flowchart illustrating an exemplary process for image equalization according to some embodiments of the present disclosure.

FIG. 25 is a flowchart illustrating an exemplary process for processing an image according to some embodiments of the present disclosure. In some embodiments, process 2500 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the terminal 140, the processor 210, and/or the CPU 340 may be configured to perform the process 2500. The operations of the illustrated process presented below are intended to be illustrative. In some embodiments, the process 2500 may be accomplished with one or more additional operations not described and/or without one or more of the operations discussed. Additionally, the order of the operations of the process 2500 illustrated in FIG. 25 and described below is not intended to be limiting. Operation 2212 in FIG. 22 may be performed according to process 2500 as illustrated in FIG. 25.

In 2502, the processing device 120 (e.g., the image generation module 2104) may process a third image using a global transform model to obtain a transformed third image.

The third image may be obtained as described in connection with operation 2210 in FIG. 22. For example, the processing device 120 may determine the third image by transforming a first image (i.e., a low-frequency image) using a local transform model. The third image may also be referred to as a first low-frequency image.

In some embodiments, the global transform model may be determined based on a mean gray value of the first image denoted as $g_L$Mean and a global equalization intensity denoted as Intensity$_{whole}$ corresponding to all gray values in the first image.

In some embodiments, the global transform model may be in the form of a global transform curve. The global transform curve may be determined based on the global equalization intensity Intensity$_{whole}$ of the first image and/or the mean gray value $g_L$Mean of the first image. For example, the slope of the global transform curve may be determined based on the global equalization intensity Intensity$_{whole}$. Further, the global transform curve may be denoted as Equation (10) as follows:

$$y_w = k*x + b \tag{10}$$

where k=1−0.02×Intensity$_{whole}$, b refers to the mean gray value of the first image $g_L$Mean, Intensity$_{whole}$ denotes the global equalization intensity.

The transformed third image may be obtained according to Equation (10). Gray values in the transformed third image may be $g'_L(i,j) = k*g_L(i,j)+b$, where $g_L(i,j)$ denotes the gray value of the third image. If the global equalization intensity is 0, the third image may not be transformed.

In 2504, the processing device 120 (e.g., the transform model determination module 2106) may determine transform ratios each of which corresponds to two corresponding pixels in the transformed third image and the first image, based on a gray value of each of pixels in the fifth image and a gray value of each of pixels in the first image.

The transform ratio between corresponding pixels in the transformed third image and the first image may be determined according to Equation (11):

$$\text{Ratio} = |g_L(i,j)/f_L(i,j) - 1| + 1 \tag{11}$$

where $g_L(i,j)$ denotes the gray value of a pixel in the transformed third image, and $f_L(i,j)$ denotes the gray value of a corresponding pixel in the first image.

In 2506, the processing device 120 (e.g., the image generation module 2104) may determine a fourth image by processing the second image based on the transform ratios.

In some embodiments, the fourth image may be obtained according to Equation (12):

$$g_H(i,j) = f_H(i,j)/\text{Ratio}^2 \tag{12}$$

where $g_H(i,j)$ denotes the gray value of a pixel in the fourth image, and $f_H(i,j)$ denotes the gray value of a corresponding pixel in the second image.

In 2508, the processing device 120 (e.g., the image generation module 2104) may determine the target image by fusing the fourth image and the transformed third image (or the third image).

In some embodiments, the processing device 120 may add the gray value of each pixel in the transformed third image (or the third image) and the gray value of the corresponding pixel in the fourth image to obtain the target image.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 31:
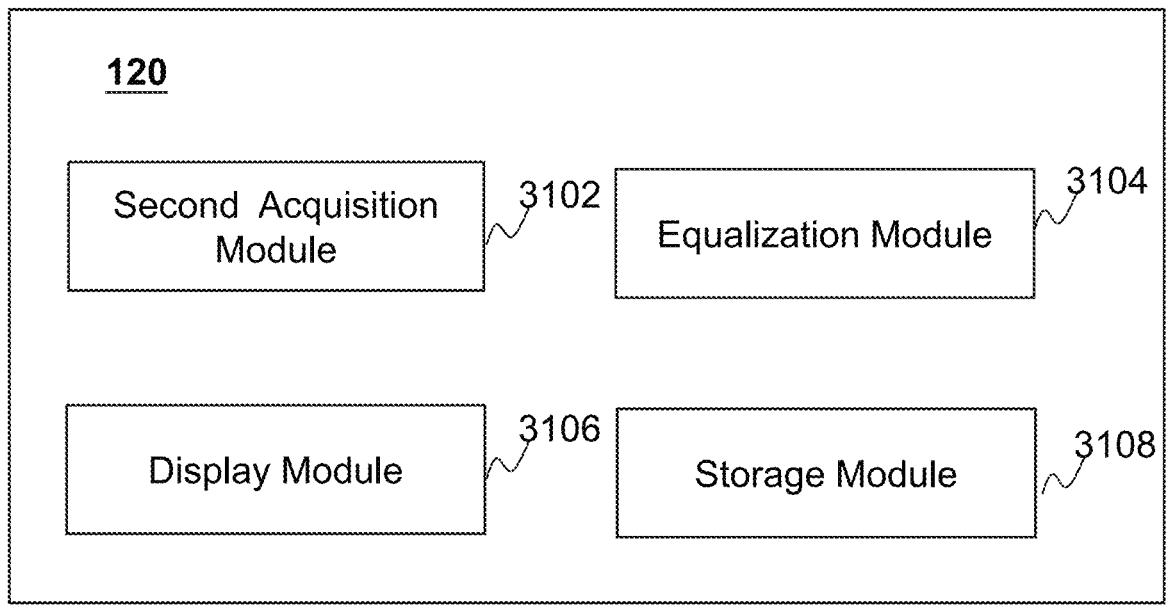
FIG. 31 is a schematic diagram illustrating an exemplary processing device for processing image according to some embodiments of the present disclosure.

FIG. 31 is a schematic diagram illustrating an exemplary processing device for processing image according to some embodiments of the present disclosure. As shown, the processing device 120 may include a second acquisition module 3102, an equalization module 3104, a display module 3106, and a storage module 3108. In some embodiments, the second acquisition module 3102, the equalization module 3104, the display module 3106, and the storage module 3108 may be connected to and/or communicate with each other via a wireless connection (e.g., a network), a wired connection, or a combination thereof.

The second acquisition module 3102 may obtain an image of a subject and one or more equalization intensities. In some embodiments, the image may be a medical image. More descriptions for the image may be found elsewhere in the present disclosure (e.g., FIG. 22 and the descriptions thereof). In some embodiments, the image may be displayed on the user graphical interface implemented on a terminal (e.g., the terminal 140).

In some embodiments, the equalization intensity may be a parameter for processing images. More descriptions for the equalization intensity may be found elsewhere in the present disclosure (e.g., FIGS. 22-25, and the descriptions thereof). Specifically, one or more equalization intensities may be obtained through input controls on the user graphical interface. For example, the user may click on the "equalization intensity" button on the user graphical interface, so that the second acquisition module 3102 may obtain the equalization intensity and display the equalization intensity on the user graphical interface. In some embodiments, the value of the equalization intensity may be adjusted. In some embodiments, the range of the equalization intensity on the user graphical interface may be 0-20. The user may enter different values on the user graphical interface to adjust the value of the equalization intensity.

The equalization module 3104 may generate an equalization image based on one or more equalization intensities and one or more gray values of the image. In some embodiments, the equalization image may be obtained by the processing device 120 performs an equalization operation on the image.

In some embodiments, the equalization module 3104 may process the image using a low-pass filter to obtain a low-frequency image of the image. The equalization module 3104 may obtain a high-frequency image by subtracting the gray value of each pixel in the low-frequency image from the gray value of the corresponding pixel in the image.

In some embodiments, the equalization module 3104 may equalize or transform the low-frequency image to obtain a first low-frequency image using a local transform model that is determined based on one or more local equalization intensities as described elsewhere in the present disclosure. The equalization module 3104 may determine the equalization image by fusing the high-frequency image and the first low-frequency image. The local transform model may be in the form of a target transform curve including multiple sections each of which corresponds to one of the multiple ranges of gray values of pixels in the image. Each of the multiple sections of the target transform curve may be determined based on one of the one or more local equalization intensities corresponding to the one of the multiple ranges of gray values of pixels in the image as described elsewhere in the present disclosure (e.g., FIG. 22, and the descriptions thereof). For example, the slope of each section of the multiple sections may be determined based on one of the one or more local equalization intensities corresponding to the one of the multiple ranges of gray values of pixels in the image.

In some embodiments, the equalization module 3104 may equalize or transform the high-frequency image to obtain a first high-frequency image as described elsewhere in the present disclosure that is determined based on local one or more equalization intensities (e.g., FIGS. 22 and 25, and the descriptions thereof). The equalization module 3104 may determine the equalization image by fusing the first high-frequency image and the first low-frequency image or the low-frequency.

In some embodiments, the equalization module 3104 may equalize or transform the first low-frequency image to obtain a second low-frequency image using a global transform model as described elsewhere in the present disclosure that is determined based on local one or more equalization intensities (e.g., FIG. 25, and the descriptions thereof). The equalization module 3104 may determine the equalization image by fusing the high-frequency image and the second low-frequency image.

The display module 3106 may dynamically display the transform curve and/or the equalization image corresponding to the equalization intensity. In some embodiments, the transform model (e.g., the local transform curve) and the equalization image that is determined based on the transform model may be dynamically displayed on the user graphical interface. For example, if an operator (such as a doctor) adjusts the value of the equalization intensities, the change of the local transform curve and the equalization image may be dynamically displayed on the user graphical interface. In some embodiments, the display module 3106 may dynamically display the local transform curve and/or the equalization image corresponding to the equalization intensities.

The storage module 3108 may be configured to store data, instructions, and/or any other information for image equalization. For example, the storage module 3108 may store the image of the subject, transform models, etc. In some embodiments, the storage module 2108 may be the same as the storage device 130 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, some other components/modules may be added into and/or omitted from the processing device 120.

Figure 32:
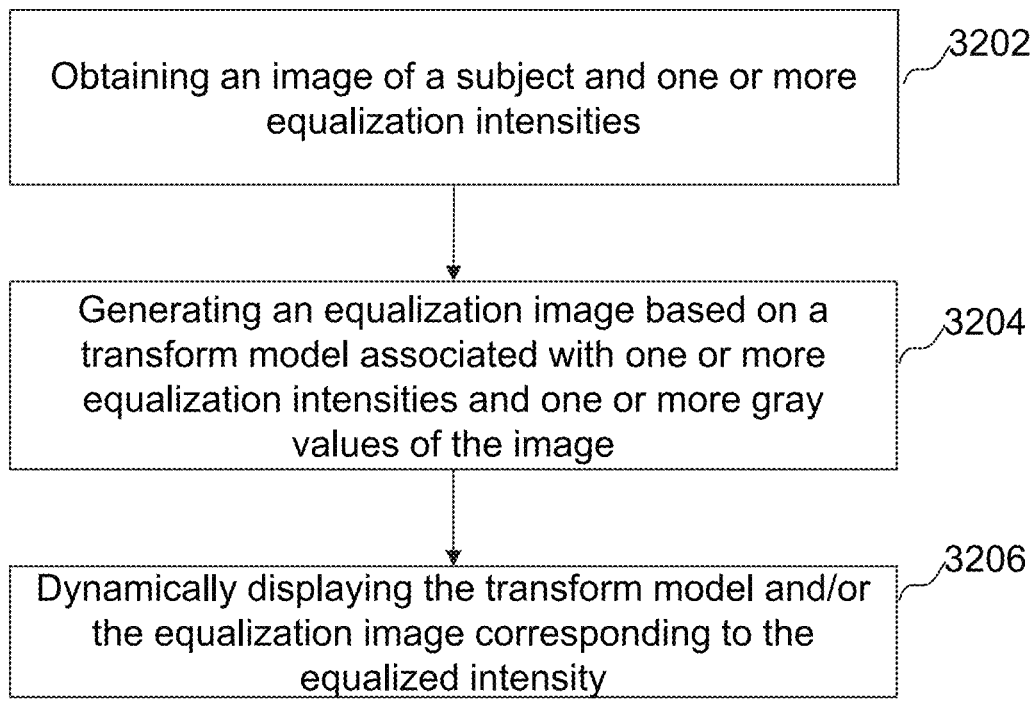
FIG. 32 is a flowchart illustrating an exemplary process for processing an image according to some embodiments of the present disclosure.

FIG. 32 is a flowchart illustrating an exemplary process for processing an image according to some embodiments of the present disclosure. In some embodiments, process 3200 may be implemented as a set of instructions (e.g., an application) stored in the storage device 130, storage 220, or storage 390. The processing device 120, the processor 210, and/or the CPU 340 may execute the set of instructions, and when executing the instructions, the processing device 120, the terminal 140, the processor 210, and/or the CPU 340 may be configured to perform the process 3200. The operations of the illustrated process presented below are intended to be illustrative. In some embodiments, the process 3200 may be accomplished with one or more additional operations not described and/or without one or more of the operations discussed. Additionally, the order of the operations of the process 3200 illustrated in FIG. 32 and described below is not intended to be limiting.

In 3202, the processing device 120 (e.g., the second acquisition module 3102) may obtain an image of a subject and one or more equalization intensities.

In some embodiments, the image may be a medical image. More descriptions for the image may be found elsewhere in the present disclosure (e.g., FIG. 22 and the descriptions thereof). In some embodiments, the image may be displayed on the user graphical interface implemented on a terminal (e.g., the terminal 140).

In some embodiments, the equalization intensity may be a parameter for processing images. More descriptions for the equalization intensity may be found elsewhere in the present disclosure (e.g., FIGS. 22-25, and the descriptions thereof). Specifically, one or more equalization intensities may be obtained through input controls on the user graphical interface. For example, the user may click on the "equalization intensity" button on the user graphical interface, so that the second acquisition module 3102 may obtain the equalization intensity and display the equalization intensity on the user graphical interface. In some embodiments, the value of the equalization intensity may be adjusted. In some embodiments, the range of the equalization intensity on the user graphical interface may be 0-20. The user may enter different values on the user graphical interface to adjust the value of the equalization intensity.

In 3204, the processing device 120 (e.g., the equalization module 3104) may generate an equalization image based on a transform model associated with one or more equalization intensities and one or more gray values of the image.

In some embodiments, the equalization image may be obtained by the processing device 120 performs an equalization operation on the image.

In some embodiments, the processing device 120 may process the image using a low-pass filter to obtain a low-frequency image of the image. The processing device 120 may obtain a high-frequency image by subtracting the gray value of each pixel in the low-frequency image from the gray value of the corresponding pixel in the image.

In some embodiments, the processing device 120 may equalize or transform the low-frequency image to obtain a first low-frequency image using a local transform model that is determined based on one or more local equalization intensities as described elsewhere in the present disclosure. The processing device 120 may determine the equalization image by fusing the high-frequency image and the first low-frequency image. The local transform model may be in the form of a target transform curve including multiple sections each of which corresponds to one of the multiple ranges of gray values of pixels in the image. Each of the multiple sections of the target transform curve may be determined based on one of the one or more local equalization intensities corresponding to the one of the multiple ranges of gray values of pixels in the image as described elsewhere in the present disclosure (e.g., FIG. 22, and the descriptions thereof). For example, the slope of each section of the multiple sections may be determined based on one of the one or more local equalization intensities corresponding to the one of the multiple ranges of gray values of pixels in the image.

In some embodiments, the processing device 120 may equalize or transform the high-frequency image to obtain a first high-frequency image as described elsewhere in the present disclosure that is determined based on local one or more equalization intensities (e.g., FIGS. 22 and 25, and the descriptions thereof). The processing device 120 may determine the equalization image by fusing the first high-frequency image and the first low-frequency image or the low-frequency.

In some embodiments, the processing device 120 may equalize or transform the first low-frequency image to obtain a second low-frequency image using a global transform model as described elsewhere in the present disclosure that is determined based on local one or more equalization intensities (e.g., FIG. 25, and the descriptions thereof). The processing device 120 may determine the equalization image by fusing the high-frequency image and the second low-frequency image.

In 3206, the processing device 120 (e.g., the display module 3106) may dynamically display the transform model and/or the equalization image corresponding to the one or more equalization intensities.

In some embodiments, the transform model (e.g., the local transform curve) and the equalization image that is determined based on the transform model may be dynamically displayed on the user graphical interface. For example, if an operator (such as a doctor) adjusts the value of the equalization intensities, the change of the local transform curve and the equalization image may be dynamically displayed on the user graphical interface. In some embodiments, the display module 3106 may dynamically display the local transform curve and/or the equalization image corresponding to the equalization intensities. By dynamically displaying the local transform curve and the equalization image, the operator (e.g., a doctor) may observe in real-time whether the equalization image meets requirements, which may be convenient for the operator to diagnose related diseases through the equalization image.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 33:
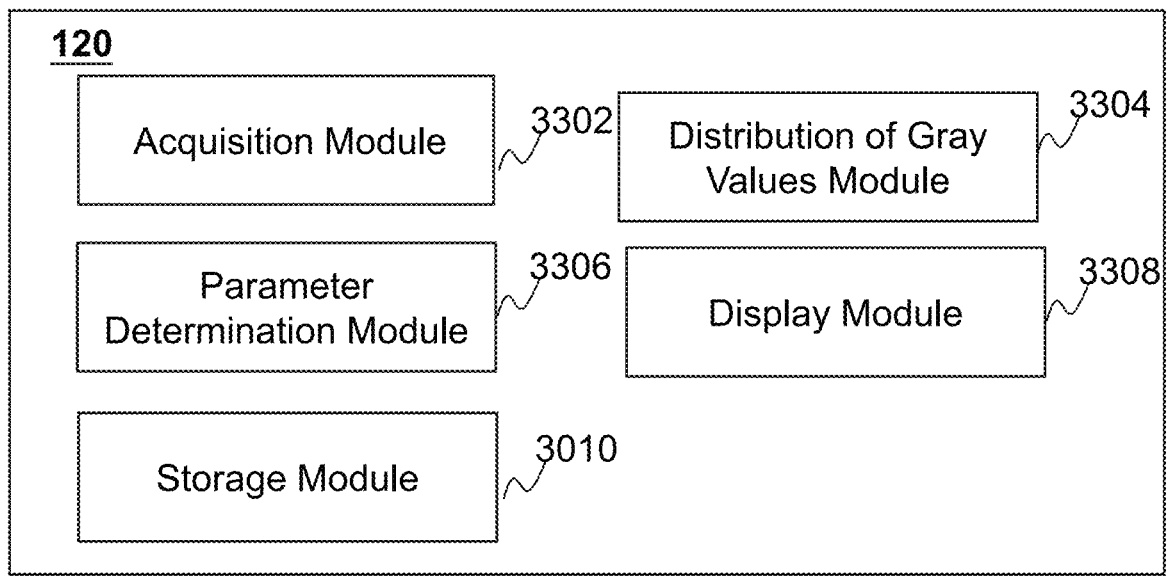
FIG. 33 is a schematic diagram illustrating an exemplary processing device for processing an image according to some embodiments of the present disclosure.

FIG. 33 is a schematic diagram illustrating an exemplary processing device for processing an image according to some embodiments of the present disclosure. As shown, the processing device 120 may include an acquisition module 3302, a distribution of gray values module 3304, a parameter determination module 3306, a display module 3308, and a storage module 3310. In some embodiments, the acquisition module 3302, the distribution of gray values module 3304, the parameter determination module 3306, the display module 3308, and the storage module 3310 may be connected to and/or communicate with each other via a wireless connection (e.g., a network), a wired connection, or a combination thereof.

The acquisition module 3302 may be configured to obtain an image of a subject. The image including a target region that includes a representation of at least a portion the subject. In some embodiments, the image may include a medical image. For example, the image may include a DR image, an MR image, a PET image, a CT image, etc. The subject may be biological or non-biological. For example, the subject may include a patient, a man-made object, etc. As another example, the subject may include a specific portion, organ, and/or tissue of a patient. As still another example, the subject may include a breast. More descriptions for the subject and the image may be found elsewhere in the present disclosure (e.g., FIGS. 1 and 5, and the descriptions thereof).

The target region may be an image region identified from the image. The target region (e.g., a region of interest (ROI)) may be the focus of image analysis for further processing. For example, the target region may represent a tumor, one or more nodules, polyps, a lesion, etc.

The distribution of gray values module 3304 may be configured to determine a distribution of gray values of pixels in the target region. The distribution may indicate a count of pixels corresponding to each gray value in the target region. In some embodiments, the distribution of the gray values of the pixels in the target region may include a grayscale histogram.

The parameter determination module 3306 may be configured to determine a characteristic display parameter for the target region based on the distribution of the gray values of the pixels in the target region. The characteristic display parameter may include at least one of a window width or a window level for the target region.

In some embodiments, the parameter determination module 3306 may perform an iterative process to determine at least one of a window width or a window level for the target region. The iterative process may include a plurality of iterations. For each iteration of the iterative process, the parameter determination module 3306 may determine an accumulated count of pixels in a current iteration by summing a count of pixels corresponding to a current gray value with an accumulated count of pixels determined in a prior iteration. The parameter determination module 3306 may determine whether the accumulated count of pixels in the current iteration satisfies a current condition. The parameter determination module 3306 may designate a gray value in the target region as the current gray value in response to determining that the accumulated count of pixels in the current iteration does not satisfy the condition. The parameter determination module 3306 may terminate the iterative process until the accumulated count of pixels in the current iteration satisfies the current condition and determine, based at least in part on the current gray value, the at least one of the window width or the window level for the target region. In the iterative process, the parameter determination module 3306 may update the condition with the increase of the accumulated count of pixels.

In some embodiments, the parameter determination module 3306 may divide the grayscale histogram into multiple intervals and perform the iteration process based on the multiple intervals.

The display module 3308 may be configured to display the image based on the characteristic display parameter.

The storage module 3110 may be configured to store data, instructions, and/or any other information for image display. For example, the storage module 3110 may store the image of the subject, the characteristic display parameters, etc. In some embodiments, the storage module 3110 may be the same as the storage device 130 in configuration.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, some other components/modules may be added into and/or omitted from the processing device The storage module 3310 may be configured to store data, instructions, and/or any other information for processing and displaying an image.

Figure 34:
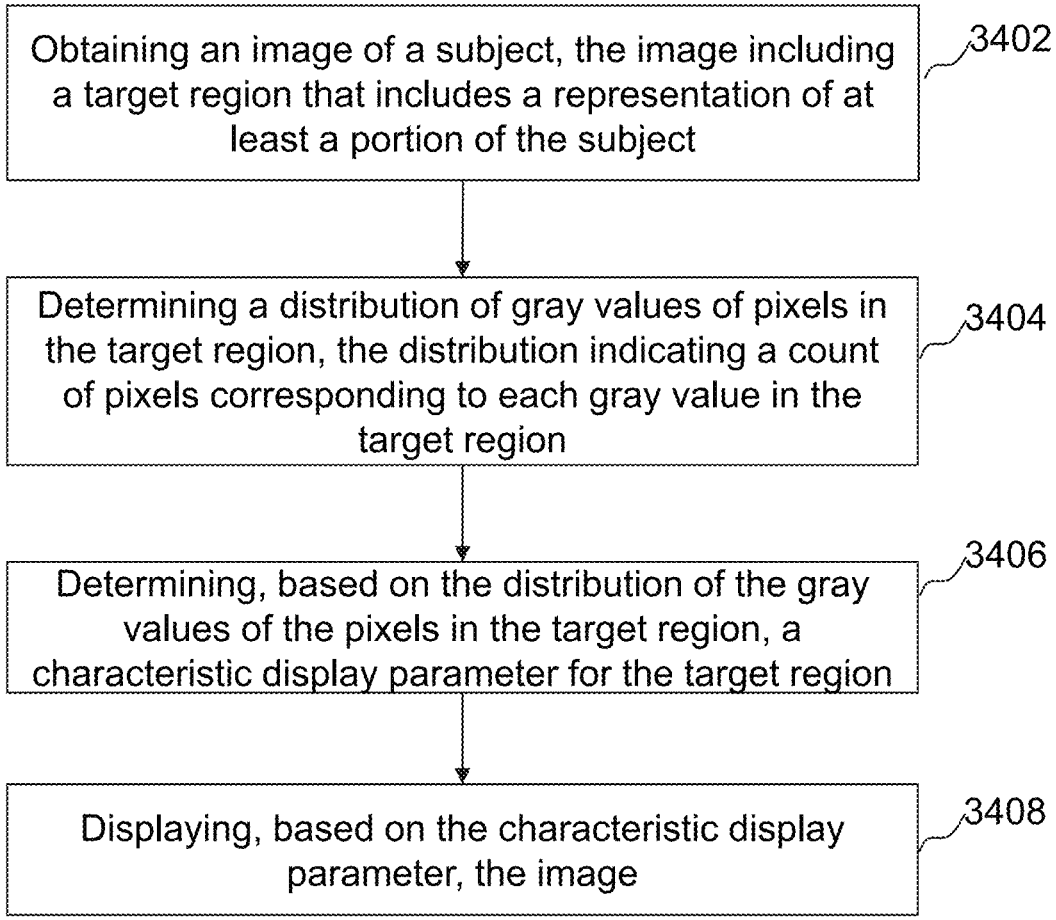
FIG. 34 is a flowchart illustrating an exemplary process for processing an image according to some embodiments of the present disclosure.

FIG. 34 is a flowchart illustrating an exemplary process for processing an image according to some embodiments of the present disclosure. In some embodiments, process 3400 may be implemented as a set of instructions stored in the storage device 130, storage 220, or storage 390. The processing device 120, the processor 210, and/or the CPU 340 may execute the set of instructions, and when executing the instructions, the processing device 120, the terminal 140, the processor 210, and/or the CPU 340 may be configured to perform the process 3400. The operations of the illustrated process presented below are intended to be illustrative. In some embodiments, the process 3400 may be accomplished with one or more additional operations not described and/or without one or more of the operations discussed. Additionally, the order of the operations of the process 3400 illustrated in FIG. 34 and described below is not intended to be limiting.

Some embodiments of the present disclosure provide a method for image processing to automatically determine one or more characteristic display parameters for displaying an image. For example, a window technique may be used to display normal tissues or lesions with different densities/signals via a window associated with CT values. One or more characteristic display parameters for display an image using the window technique may include a window width (WW) and a window level (WL). The window width may be a range of CT values (also referred to as CT value range) in a CT image. In the CT value range, some tissues and/or lesions whose CT values are within the CT value range may be displayed in different simulated grayscale values in an image. Tissues and lesions whose CT values exceed the CT value range may be displayed as white shadows or black shadows in the image, and have no difference in grayscale. The window level may be the central position of the window. Since different tissues or lesions have different CT values, a suitable window width and window level may be determined for observing the details of a certain tissue to obtain improved display. For traditional image processing, the window width and window position may be usually determined by an operator according to experience. When the window width and window level cannot meet the requirements for image display, the operator may need to adjust the window width and window level, which increases the workload of the doctor and decrease the accuracy.

In 3402, the processing device 120 (e.g., the acquisition module 3302) may obtain an image of a subject, the image including a target region that includes a representation of at least a portion the subject.

In some embodiments, the image may include a medical image. For example, the image may include a DR image, an MR image, a PET image, a CT image, etc. The subject may be biological or non-biological. For example, the subject may include a patient, a man-made object, etc. As another example, the subject may include a specific portion, organ, and/or tissue of a patient. As still another example, the subject may include a breast. More descriptions for the subject and the image may be found elsewhere in the present disclosure (e.g., FIGS. 1 and 5, and the descriptions thereof).

The target region may be an image region identified from the image. The target region (e.g., a region of interest (ROI)) may be the focus of image analysis for further processing. For example, the target region may represent a tumor, one or more nodules, polyps, a lesion, etc.

In some embodiments, the target region may be determined from the image using an image processing technique (e.g., an image segmentation technique). The image processing may determine one or more specific regions with unique properties and determine a target region (e.g., a region of interest) from the one or more specific regions. The image processing technique may include using a threshold-based segmentation algorithm, a region-based segmentation algorithm, an edge-based segmentation algorithm, a specific theory-based segmentation algorithm, etc.

In some embodiments, the target region may be determined based on an automatic segmentation technique, a semi-automatic segmentation technique, etc. In some embodiments, the target region may be determined by a user (e.g., a doctor, a technician) manually. For example, the user may determine the outline or boundary of the target region from the image manually.

In some embodiments, a threshold segmentation algorithm may be used to process the image to determine the target region. Using the threshold segmentation algorithm, pixels in an image may be classified into several categories (or group) based on a segmentation threshold and the difference in grayscale between a target and the background to distinguish the target and the background. By determining whether the characteristic attribute of each pixel in the image meets the segmentation threshold, the target region or the background region in which one the pixel in the image belongs to may be determined, and then a grayscale image may be converted into a binary image. In some embodiments, the Otsu algorithm may be used for image processing. In some embodiments, the segmentation threshold may be input by a user according to experience. In some embodiments, the segmentation threshold may be determined by the medical system 100 according to, for example, process 500, process 1000, or any other algorithms. The threshold segmentation algorithm may convert the grayscale image into a binary image, which may effectively distinguish the target from the background. For example, if a doctor wants to observe a tumor in the stomach through an image, then a threshold segmentation algorithm may be used to distinguish a tumor region (i.e., the target region) from other tissues in the stomach.

In some embodiments, the determining the target region may include removing a region representing air (also referred to as air region or background region). The air region may be a non-target region or a direct exposure region, i.e., an empty exposure region. The empty exposure region in an image may be formed based on projection data generated by a detector in an imaging device (e.g., the medical device 110) after receiving X-rays that only pass through the air before reaches the detector. The target region may represent a subject (e.g., a lesion or a tumor). In some embodiments, removing the air region from the image may include determining whether the image includes the air region. For example, whether the image includes the air region may be determined according to process 1400 as illustrated in FIG. 14. In response to a determination that the image includes the air region, the air region may be determined from the image. For example, the air region (i.e., the background region) may be determined from the image according to process 1000 as illustrated in FIG. 10. Then the air region may be removed from the image. For example, gray values in the air region may be set as "0" or "255" to remove the air region from the image. Accordingly, the interference of the air region with the determination of the target region may be eliminated effectively, which is helpful for a user (e.g., the doctor) to make the medical diagnosis based on the image.

In some embodiments, the processing device 120 may determine the target region from the image according to process 500 as described in FIG. 5.

In some embodiments, the processing device 120 may determine the target region from the image according to process 1000 as described in FIG. 10.

In 3404, the processing device 120 (e.g., the distribution of gray values module 3304) may determine a distribution of gray values of pixels in the target region, the distribution indicating a count of pixels corresponding to each gray value in the target region.

The distribution of the gray values of the pixels in the target region may indicate a count of pixels in the target region whose gray values are the same.

In some embodiments, the distribution of the gray values of the pixels in the target region may include a grayscale histogram. A histogram is a statistical graph, which is represented by a series of vertical stripes or line segments with different heights. When the vertical stripes or line segments are densely distributed, the histogram may show a curve. The transverse axis of a histogram may indicate a data type (e.g., a pixel parameter of a type), and the vertical axis may indicate the distribution of the data type. In some embodiments, the transverse axis of the grayscale histogram of the target region may denote gray values, and the vertical axis may denote a count of pixels corresponding to each of the gray values. The grayscale histogram of the target region may be determined by determining a count of pixels with each of the gray values in the target region and arranging the counts of pixels according to the gray values from small to large. As used herein, the gray values in the target region may refer to gray values of pixels in the target region after deduplication. The shape of the grayscale histogram may be determined based on the distribution of the gray values in the target region. If the gray values in the target region are more and the difference in the count of pixels corresponding to each gray value is small, the grayscale histogram may include multiple peaks, that is, the grayscale histogram of the target region may be relatively wide and the peaks may be not too steep. If the gray values in the target region are relatively concentrated (i.e., gray values are close to each other), the grayscale histogram may have a steep single-peak.

In 3406, the processing device 120 (e.g., the parameter determination module 3306) may determine a characteristic display parameter for the target region based on the distribution of the gray values of the pixels in the target region.

The characteristic display parameter may include at least one of a window width or a window level for the target region.

In some embodiments, the processing device 120 may perform an iterative process to determine at least one of a window width or a window level for the target region. The iterative process may include a plurality of iterations. For each iteration of the iterative process, the processing device 120 may determine an accumulated count of pixels in a current iteration by summing a count of pixels corresponding to a current gray value with an accumulated count of pixels determined in a prior iteration. The processing device 120 may determine whether the accumulated count of pixels in the current iteration satisfies a current condition. The processing device 120 may designate a gray value in the target region as the current gray value in response to determining that the accumulated count of pixels in the current iteration does not satisfy the condition. The processing device 120 may terminate the iterative process until the accumulated count of pixels in the current iteration satisfies the current condition and determine, based at least in part on the current gray value, the at least one of the window width or the window level for the target region. For each iteration, the gray value and the accumulated count of pixels may be updated. The iterative process may also be referred to as a statistic process. An iteration in the iterative process may also be referred to as a statistic. The count of iterations may also be referred to as a count of statistics or a count of accumulations of pixels. More descriptions for the iterative process may be found elsewhere in the present disclosure (e.g., FIG. 35, and the descriptions thereof).

In the iterative process, the processing device 120 may update the condition with the increase of the accumulated count of pixels. For example, the condition may include a count threshold, the processing device 120 may decrease the count threshold with the increase of the accumulated count of pixels. As another example, the processing device 120 may update the current condition after a count of iterations (e.g., 1, 2, 3, etc.) are performed. With the increase of the accumulated count of pixels and the increase of the count of statistics, the accumulated count of pixels is easy to satisfy the condition, which may improve the accuracy of the window, thereby avoiding some gray values to be removed and not displayed.

In some embodiments, the processing device 120 may divide the grayscale histogram into multiple intervals and perform the iteration process based on the multiple intervals. The count of pixels corresponding to each gray value may be accumulated for each interval according to one or more rules to obtain the accumulated count of pixels until the accumulated count of pixels satisfies the condition (i.e., the current condition).

In some embodiments, if the grayscale histogram of the target region is divided into the multiple intervals along the vertical axis, the count of pixels corresponding to each gray value may be accumulated from an interval corresponding to a minimum height in the grayscale histogram to a next interval in sequence (i.e., from the bottom to top of the grayscale histogram). If the accumulation of the count of pixels corresponding to each gray value in a current interval is completed, and the accumulated count of pixels does not satisfy the current condition, the count of pixels corresponding to each gray value in an adjacent interval (i.e., a next interval) may be accumulated until the accumulated count of pixels satisfies the current condition. For the current interval for statistics, the count of pixels corresponding to the gray values in the current interval may be accumulated from the left side to the center and from the right side to the center of the grayscale histogram in sequence. In other words, the count of pixels corresponding to gray values in the current interval that is smaller than a gray value corresponding to the center of the grayscale histogram may be accumulated from small to large in sequence. The count of pixels corresponding to gray values in the current interval that is greater than the gray value corresponding to the center of the grayscale histogram may be accumulated from large to small in sequence. If the accumulated count of pixels corresponding to a current gray value in a current interval that is located at the left side of the center of the histogram satisfies the condition, the current gray value may be designated as a starting point (also referred to as a first end) of the window. A maximum gray value in the target region that belongs to the current interval may be designated as an end point (also referred to as a second end) of the window. If the accumulated count of pixels corresponding to a current gray value in a current interval that is located at the right side of the center of the histogram satisfies the condition, the current gray value may be designated as the end point of the window. A maximum gray value in the target region that belongs to the current interval and located at the left side of the grayscale histogram may be designated as the starting point of the window.

In some embodiments, if the grayscale histogram of the target region is divided into the multiple intervals along the transverse axis, the count of pixels corresponding to each gray value may be accumulated from an interval including a minimum gray value in the grayscale histogram. For the multiple intervals for statistics, the count of pixels corresponding to the gray values in the multiple intervals may be accumulated from the left side to the center and from the right side to the center of the grayscale histogram in sequence. If the accumulation of the count of pixels corresponding to each gray value in a current interval that is located at the left side of the grayscale histogram is completed, and the accumulated count of pixels does not satisfy the current condition, the count of pixels corresponding to each gray value in a next interval that is located at the right side of the grayscale histogram may be accumulated until the accumulated count of pixels satisfies the current condition. The count of pixels corresponding to gray values in the current interval that is smaller than a gray value corresponding to the center of the grayscale histogram may be accumulated from small to large in sequence. The count of pixels corresponding to gray values in the current interval that is greater than the gray value corresponding to the center of the grayscale histogram may be accumulated from large to small in sequence. If the accumulated count of pixels corresponding to a current gray value in a current interval that is located at the left side of the center of the histogram satisfies the condition, the current gray value may be designated as a starting point of the window. A maximum gray value in the target region that belongs to a next interval may be designated as an end point of the window. If the accumulated count of pixels corresponding to a current gray value in a current interval that is located at the right side of the center of the histogram satisfies the condition, the current gray value may be designated as the end point of the window. A maximum gray value in the target region that belongs to a previous interval and located at the left side of the grayscale histogram may be designated as the starting point of the window. More descriptions for the accumulation of the count of pixels may be found in FIGS. 35 and 36.

A difference between gray values corresponding to the starting point and the end point may be designated as the window width. A center between the gray values corresponding to the starting point and the end point may be designated as the window level.

In 3408, the processing device 120 (e.g., the display module 3308) may display the image based on the characteristic display parameter.

In some embodiments, the image may be displayed in the form of gray values. To contain more organizational information, the data depth (bit depth) of the image may be greater than 8 bit. For example, the data depth (bit depth) may include 12 bit, 14 bit, 15 bit, 16 bit, etc. In some embodiments, the bit depth of the image may exceed 8 bit, the processing device 120 may convert the image into a processed image with a bit depth of 8 bit based on the determined characteristic display parameter (e.g., the window width and the window level).

According to process 3500, the window width and window level for display the target region of the image may be determined according to the gray value distribution without operations of a user (e.g., a doctor), which improves the accuracy of the window width and window level, and the window width and window level for display the target region of the image determined according to the gray value distribution may be more suitable for the target region with improved display, thereby improving the accuracy for diagnosis based on the displayed target region. Especially for digital X-ray photography (DR) imaging, an image may be influenced by the large volume of a subject to be imaged, the complex positioning of different parts of the subject, etc. The window width and window level determined based on the above method for processing an image may greatly improve the stability of display effect of the image and reduce the workload of an operator (e.g., the doctor) to adjust the window width and window level twice.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Figure 35:
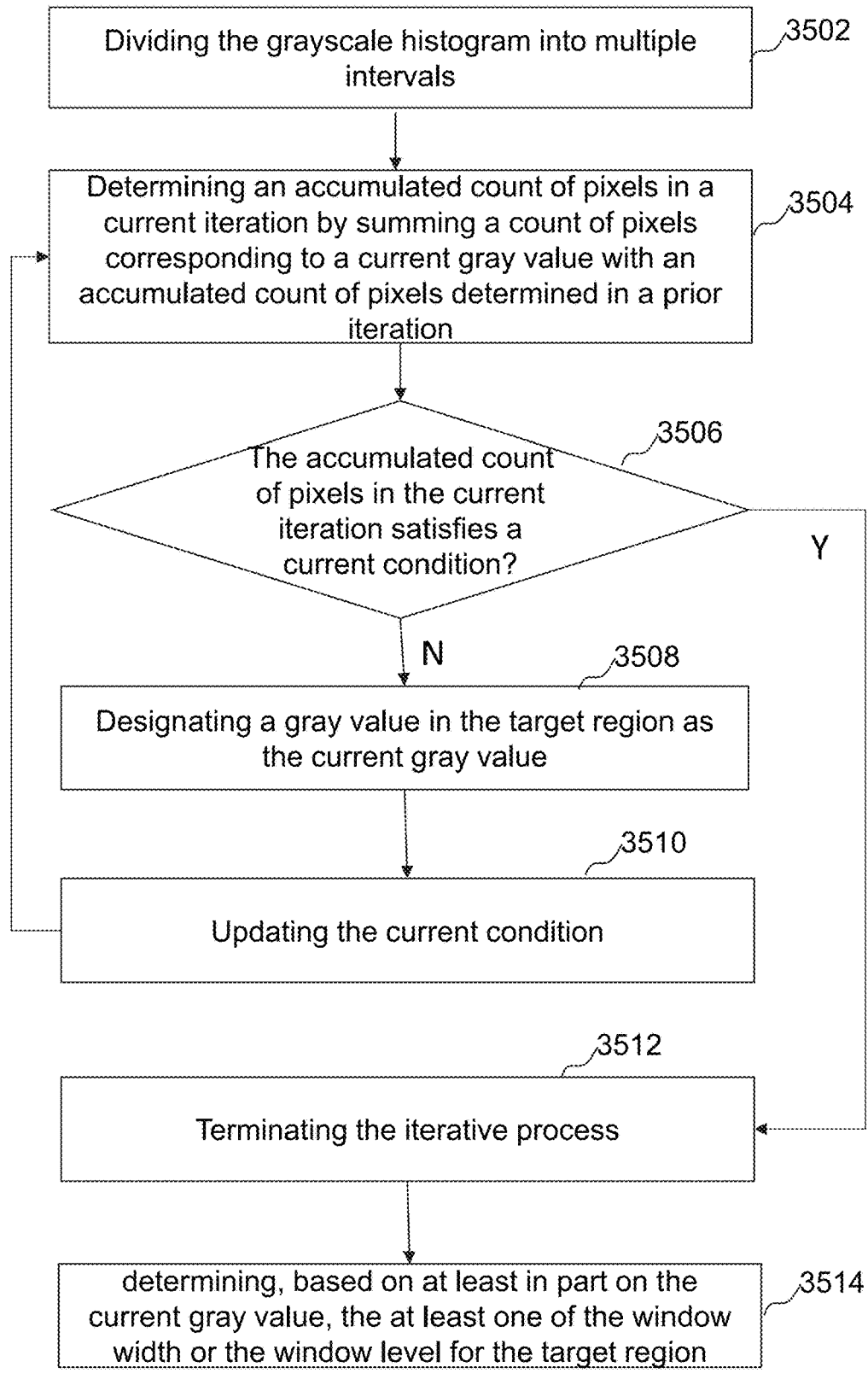
FIG. 35 is a flowchart illustrating an exemplary process for an iterative process for determining a window width or a window level for the target region according to some embodiments of the present disclosure.

FIG. 35 is a flowchart illustrating an exemplary process for an iterative process for determining a window width or a window level for the target region according to some embodiments of the present disclosure. In some embodiments, process 3500 may be implemented as a set of instructions stored in the storage device 130, storage 220, or storage 390. The processing device 120, the processor 210 and/or the CPU 340 may execute the set of instructions, and when executing the instructions, the processing device 120, the terminal 140, the processor 210 and/or the CPU 340 may be configured to perform the process 3500. The operations of the illustrated process presented below are intended to be illustrative. In some embodiments, the process 3500 may be accomplished with one or more additional operations not described and/or without one or more of the operations discussed. Additionally, the order of the operations of the process 3500 illustrated in FIG. 35 and described below is not intended to be limiting. The iterative process may include multiple iterations. For illustration purposes, a current iteration of the iterations is described in the following description. The current iteration may include one or more operations of the process 3500.

In 3502, the processing device 120 may divide a grayscale histogram of a target region of an image into multiple intervals. The grayscale histogram may indicate a gray value distribution of pixels in the target region. The grayscale histogram may represent a count of pixels whose gray values are the same in the target region. The grayscale histogram may include a transverse axis and a vertical axis. In some embodiments, the transverse axis may indicate gray values and the vertical axis may indicate a count of pixels. In some embodiments, the transverse axis may indicate a count of pixels and the vertical axis may indicate gray values. The following descriptions are provided with reference to the transverse axis of the grayscale histogram as the gray values and the vertical axis of the grayscale histogram as the count of pixels, unless otherwise stated. It is understood that this is for illustration purposes and not intended to be limiting.

Each of the multiple intervals may include multiple gray values in the target region and a count of pixels corresponding to each of the multiple gray values.

Figure 36:
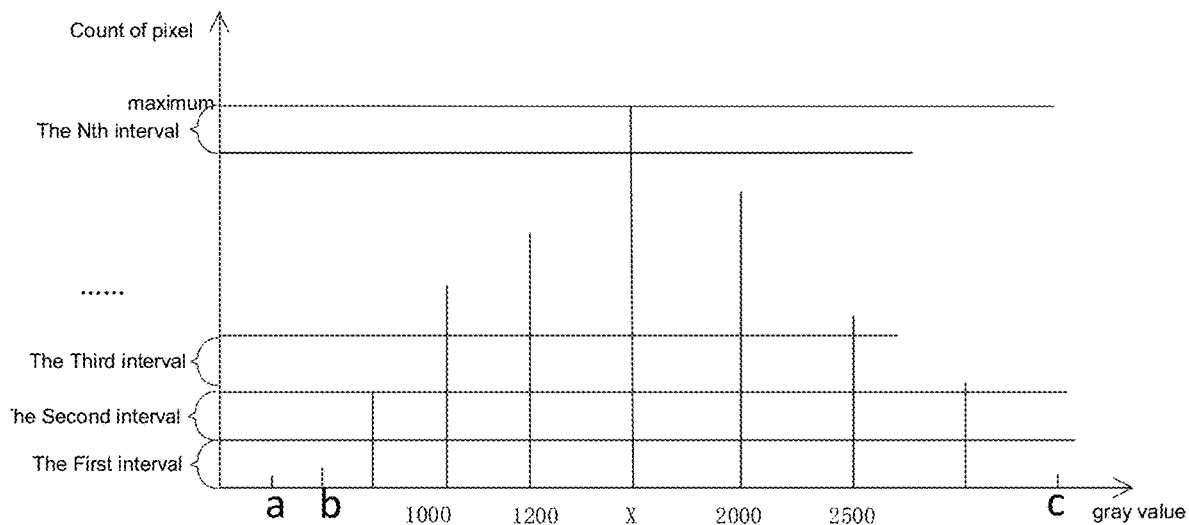
FIG. 36 shows an exemplary grayscale histogram that is divided along the vertical axis according to some embodiments of the present disclosure.

In some embodiments, the processing device 120 may divide the grayscale histogram into the multiple intervals along the vertical axis. As used herein, the division of the grayscale histogram along the vertical axis may refer to dividing the grayscale histogram via dividing the vertical axis into multiple ranges. Each of the multiple intervals may include a range of counts of pixels of certain gray values. For example, FIG. 36 shows an exemplary grayscale histogram according to some embodiments of the present disclosure. As shown in FIG. 36, the grayscale histogram is divided into multiple intervals (e.g., a first interval, a second interval, a third interval, . . . , an Nth interval, etc.) along the vertical axis. Each interval may correspond to a range of the count of pixels (e.g., 0-500, 500-1000, 1000-1500, etc.) The heights of the first interval, the second interval, the third interval, . . . , the Nth interval may be increased in sequence. As used herein, the height of an interval may refer to a maximum count of pixels in the interval.

In some embodiments, the processing device 120 may determine a total count of pixels in the target region and divide the grayscale histogram into the multiple intervals along the vertical axis based on the total count of pixels in the target region. For example, the processing device 120 may determine a count of the multiple intervals, and divide the grayscale histogram into the multiple intervals along the vertical axis based on the total count of pixels and the count of the multiple intervals.

In some embodiments, the processing device 120 may determine a maximum count of pixels in the vertical axis (or the height of the highest point) in the grayscale histogram of the target region and divide the grayscale histogram into the multiple intervals along the vertical axis based on the maximum count of pixels in the vertical axis and the count of the multiple intervals. The count of the multiple intervals may be set according to the maximum count of pixels corresponding to a gray value in the target region.

In some embodiments, the multiple intervals may have the same width along the vertical axis, that is, the grayscale histogram may be divided into equal parts in the vertical direction. As used herein, the width of an interval refers to a difference between a maximum count of pixels and a minimum count of pixels in the interval. For example, if the maximum count of pixels in the vertical axis in the grayscale histogram is 8000, the maximum count 8000 may be divided into equal parts. The width of each part may be used as a step height. As a further example, if the maximum count of 8000 is divided into 100 equal parts, the height of each equal part is 80, that is, the step height is 80. As still another example, as shown in FIG. 36, the maximum count of pixels corresponds to a gray value X, and the maximum count of pixels was divided into N equal parts. Each equal part may be designated as an interval, and each interval has the same width.

In some embodiments, the multiple intervals may have different widths along the vertical axis. For example, the widths of the multiple intervals may decrease with the increase of the count of pixels. As another example, the maximum count of pixels may be divided into unequal parts.

Figure 39:
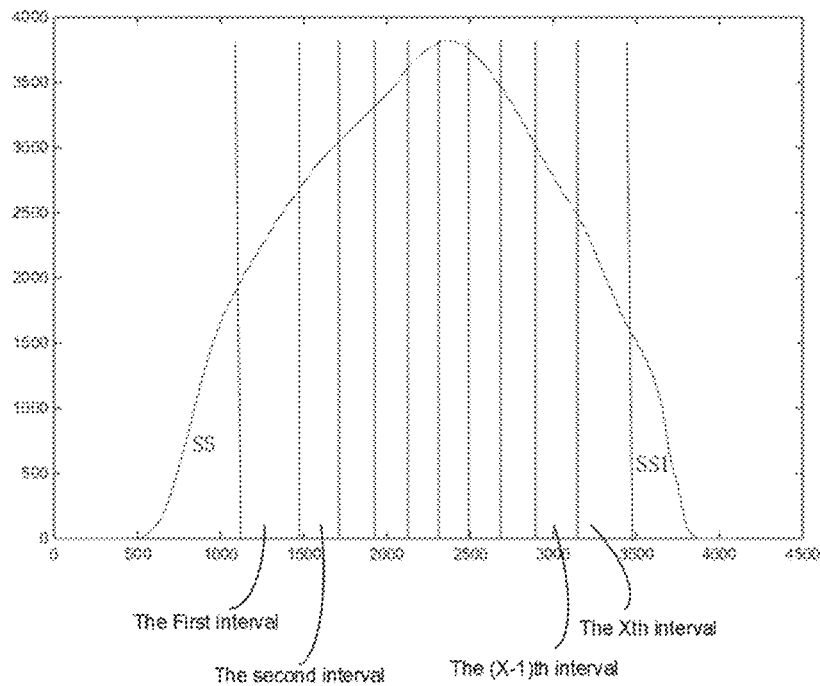
FIG. 39 shows an exemplary grayscale histogram that is divided along the transverse axis according to some embodiments of the present disclosure.

In some embodiments, the processing device 120 may divide the grayscale histogram along the transverse axis into the multiple intervals. As used herein, the division of the grayscale histogram along the transverse axis may refer to dividing the grayscale histogram via dividing the transverse axis into multiple ranges. For example, FIG. 39 shows an exemplary grayscale histogram according to some embodiments of the present disclosure. As shown in FIG. 39, the grayscale histogram is divided into multiple intervals (e.g., a first interval, a second interval, . . . , an (X−1)th interval, an Xth interval, etc.) along the transverse axis. Each interval may correspond to a range of gray values (e.g., 1000-1500, 1500-1800, 1800-2000, etc.).

In some embodiments, the processing device 120 may divide the grayscale histogram along the transverse axis into the multiple intervals based on a total count of pixels or the total count of effective pixels in the grayscale histogram of the target region. The effective pixels in the grayscale histogram of the target region refers to pixels obtained after the preprocessing of the target region of the image or the grayscale histogram of the target region.

For example, the preprocessing of the grayscale histogram may include removing gray values within a range (e.g., a range on the left and right sides of the grayscale histogram) to form an effective region of the grayscale histogram. As shown in FIG. 39, region SS and region SS1 in FIG. 39 are removed by the preprocessing process. In some embodiments, some unstable points exist in the grayscale histogram of the target region, and the gray values in the ranges on the left and right sides of the histogram may be removed to avoid interference of these unstable points. For example, the count of pixels corresponding to the gray values within the range (e.g., a range on the left and right sides of the grayscale histogram) that are deleted may be of a proportion of the total count of the pixels in the target region. The proportion may be within 5% of the total count of pixels in the target region. As another example, the count of gray values within the range (e.g., a range on the left and right sides of the grayscale histogram) that are deleted may be of a proportion of the total count of the gray values in the target region. For example, 1% of gray values may be removed on the left and right sides of the grayscale histogram. By removing some unstable points in the grayscale histogram of the target region, the display effect of the image displayed according to the window width and window level may be more stable, which may improve the accuracy of medical diagnosis.

Each of the multiple intervals may include a range of gray values and a count of pixels corresponding to each gray value in the range. In some embodiments, each interval may have different width of a range of gray values along the transverse axis. In some embodiments, each interval may have the same width of a range of gray values along the transverse axis. In other words, a difference between a maximum gray value and a minimum gray value corresponding to each interval may be the same. In some embodiments, each interval may correspond to the same count of pixels. In other words, the count of pixels in the target region whose gray values are in each interval may be the same. The count of the multiple intervals may be set according to the total count of pixels in the target region. For example, if the total count of pixels of 80,000 in the target region is divided into 100 equal parts, then the count of pixels in each equal part is 800, that is, the count of pixels in each interval is 800. In other embodiments, it may also be divided into multiple intervals with an unequal count of pixels according to the gray distribution of the target region.

In 3504, the processing device 120 (e.g., the parameter determination module 3306) may determine an accumulated count of pixels in a current iteration by summing a count of pixels corresponding to a current gray value with an accumulated count of pixels determined in a prior iteration. The current gray value may refer to a gray value in the target region that belong to a current interval. In some embodiments, when the current iteration is a first iteration, if the grayscale histogram is divided along the vertical axis, the current interval may be an interval located at the bottom-most of the grayscale histogram with a minimum height; if the grayscale histogram is divided along the transverse axis, the current interval may be an interval located at the left most of the grayscale histogram with a minimum range of gray values.

Figure 37:
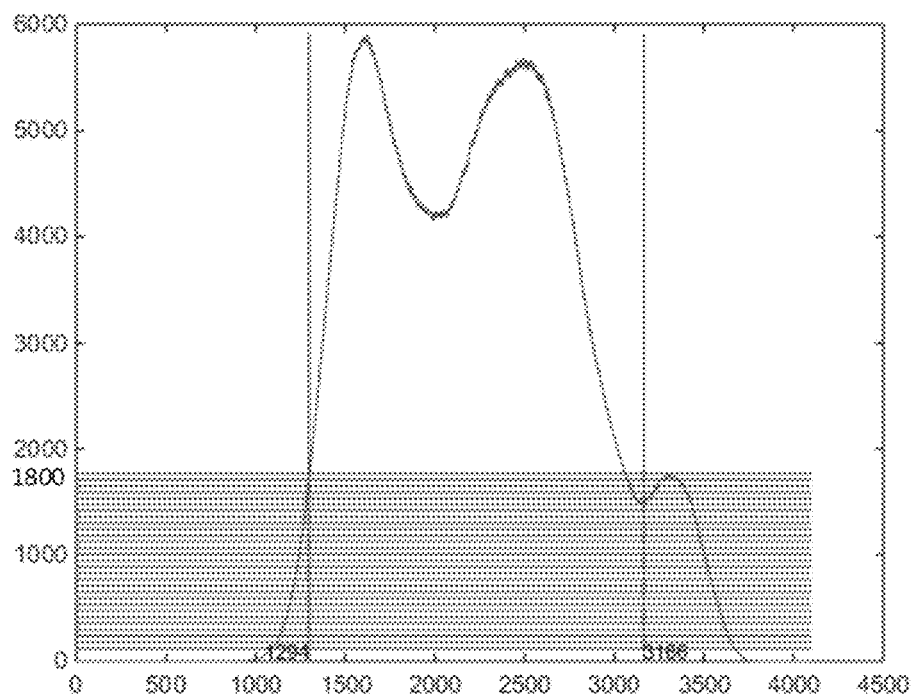
FIGS. 37 and 38 show an exemplary grayscale histogram according to some embodiments of the present disclosure.

In some embodiments, if the grayscale histogram is divided along the vertical axis, the current interval may include gray values in the target region that are located at the left side of the center of the grayscale histogram and gray values in the target region that is located at the right side of the center of the grayscale histogram. The gray values in the target region that are located at the left side of the center of the grayscale histogram may be less than a gray value corresponding to the center of the grayscale histogram and the gray values that are located at the right side of the center of the grayscale histogram may exceed the gray value corresponding to the center of the grayscale histogram. As shown in FIG. 37, the first interval includes gray values "a" and "b" that are located at the left side of the center of the grayscale histogram and gray value "c" that are located at the right side of the center of the grayscale histogram. If the current gray value is located at the left side of the center of the grayscale histogram, the current gray value in the current iteration may exceed a prior gray value in the current interval used in the prior iteration. If the current gray value is located at the right side of the center of the grayscale histogram, the current gray value in the current iteration may be less than a prior gray value in the current interval in the prior iteration. In other words, the processing device 120 may accumulate the count of pixels corresponding to each gray value in the current interval from the left side to the center of the grayscale histogram and from the right side to the center of the grayscale histogram in sequence.

In some embodiments, if the grayscale histogram is divided along the transverse axis, the current interval may include gray values in the target region that are located at the left side of the center of the grayscale histogram or gray values in the target region that are located at the right side of the center of the grayscale histogram. As shown in FIG. 39, the first interval includes gray values that are located at the left side of the center of the grayscale histogram and the Xth interval includes gray values that are located at the right side of the center of the grayscale histogram. If the current interval is located at the left side of the center of the grayscale histogram, the current gray value in the current iteration may exceed a prior gray value in the current interval used in the prior iteration. If the current interval is located at the right side of the center of the grayscale histogram, the current gray value in the current iteration may be less than a prior gray value in the current interval in the prior iteration. In other words, the processing device 120 may accumulate the count of pixels corresponding to each gray value in the current interval from the left side to the center of the grayscale histogram or from the right side to the center of the grayscale histogram in sequence.

In 3506, the processing device 120 (e.g., the parameter determination module 3306) may determine whether the accumulated count of pixels in the current iteration satisfies a current condition.

In response to a determination that the accumulated count of pixels in the current iteration does not satisfy a current condition, the processing device 120 may proceed to perform operation 3508 and operation 3510.

In response to a determination that the accumulated count of pixels in the current iteration satisfies a current condition, the processing device 120 may proceed to perform operation 3512.

In some embodiments, the current condition may include a current count threshold. Whether the accumulated count of pixels in the current iteration satisfies the current condition may include whether the accumulated count of pixels in the current iteration exceeds or equals the current count threshold. If the accumulated count of pixels in the current iteration exceeds or equals the current count threshold, the accumulated count of pixels in the current iteration may satisfy the current condition.

In some embodiments, when the current iteration is a first iteration, the current count threshold may be an initial count threshold. The initial count threshold may be set by a user or according to a default setting of the medical system 100. For example, the initial threshold may be set to 5 to 20% of the total count of pixels in the grayscale histogram or the preprocessed grayscale histogram. As a further example, the initial threshold may be set to 15% of the total count of pixels in the grayscale histogram or the preprocessed grayscale histogram.

In some embodiments, the current condition may be the same as a prior condition in a prior iteration. In some embodiments, the current condition may be different from a prior condition in a prior iteration. For example, the current count threshold may be less than a prior count threshold in the prior iteration.

In 3508, the processing device 120 (e.g., the parameter determination module 3306) may designate a gray value in the target region as the current gray value.

In some embodiments, the processing device 120 may determine the gray value according to one or more rules.

In some embodiments, if the grayscale histogram is divided along the vertical axis, the one or more rules may include at least one of a first rule or a second rule. The first rule may include determining an interval among the multiple intervals from a bottom interval to a top interval along the vertical axis in sequence. In other words, if the current gray value in the current iteration is a last one gray value to be accumulated in the current interval, the processing device 120 may designate a gray value (e.g., a first gray value) in a next interval adjacent to the current interval as the current gray value. For example, if gray values in the current interval are distributed at two sides of the center of the transvers axis or all the gray values are distributed at the right side of the center of the transvers axis, the at least one gray value to be accumulated in the current interval may be a minimum gray value in the current interval that is located on the right side of the center of the transvers axis; if all the gray values are distributed at the left side of the center of the transvers axis, the at least one gray value to be accumulated in the current interval may be a maximum gray value in the current interval.

The second rule may relate to determining the gray value in the current interval from two sides to a center of the transverse axis in sequence (e.g., from small to large or from large to small). If the current gray value in the current iteration is not a last one gray value to be accumulated in the current interval, the processing device 120 may designate a gray value in the current interval as the current gray value. Further, if the current gray value is not the last one gray value to be accumulated in the current interval at the left side of the center of the grayscale histogram, the processing device 120 may update the current gray value based on a gray value that is located at the left side of the center of the grayscale histogram in the current interval and exceeds the current gray value. If the current gray value is not the last one gray value in the current interval at the right side of the center of the grayscale histogram, the processing device 120 may update the current gray value based on a gray value that is located at the right side of the center of the grayscale histogram in the current interval and is less than the current gray value. In other words, the processing device 120 may accumulate the count of pixels corresponding to each gray value in the current interval from the left side to the center of the grayscale histogram and from the right side to the center of the grayscale histogram in sequence.

As shown in FIG. 36, in multiple iterations, the processing device 120 may update the current gray value based on gray values in the first interval of the multiple intervals from a left side to the center of the transverse axis in sequence (i.e., from small to large) and from a right side to the center of the transverse axis when the current gray value is a last one gray value at the left side of the grayscale histogram in the first interval.

In some embodiments, if the grayscale histogram is divided along the transverse axis, the first rule may relate to determining an interval from the multiple intervals from two sides to a center of the transverse axis in sequence, and the second rule may relate to determining the gray value in the interval from the left side to the center of the transverse axis or from the right side to the center of the transverse axis in sequence. In other words, if the current gray value in the current iteration is a last one gray value (i.e., a maximum gray value) in the current interval that is located at the left side of the grayscale histogram, the processing device 120 may designate a gray value (e.g., a maximum gray value) in a next interval that is located at the right side of the grayscale histogram as the current gray value. If the current gray value in the current iteration is a last one gray value (i.e., a maximum gray value) in the current interval that is located at the right side of the grayscale histogram, the processing device 120 may designate a gray value (e.g., a minimum gray value) in a next interval that is located at the left side of the grayscale histogram as the current gray value. If the current gray value is not the last one gray value in the current interval that is located at the right side of the center of the grayscale histogram, the processing device 120 may update the current gray value based on a gray value that is located at the right side of the center of the grayscale histogram in the current interval and is less than the current gray value. If the current gray value is not the last one gray value in the current interval that is located at the left side of the center of the grayscale histogram, the processing device 120 may update the current gray value based on a gray value that is located at the left side of the center of the grayscale histogram in the current interval and exceeds the current gray value.

As shown in FIG. 39, in multiple iterations, when the current interval is the first interval, the processing device 120 may update the current gray value based on gray values in the first interval of the multiple intervals from the left side to the right side in sequence (i.e., from small to large). If the accumulated count of pixels in the current iteration does not satisfy the current condition when counts of pixels corresponding to all gray values in the first interval are accumulated, the processing device 120 may update the current gray value based on gray values in the Xth interval of the multiple intervals from the right side to the left side in sequence (i.e., from large to small). If the accumulated count of pixels in the current iteration does not satisfy the current condition when counts of pixels corresponding to all gray values in the Xth interval are accumulated, the processing device 120 may update the current gray value based on gray values in the second interval of the multiple intervals from the left side to the right side in sequence (i.e., from small to larger) until the current condition is satisfied.

In 3510, the processing device 120 (e.g., the parameter determination module 3306) may update the current condition.

In some embodiments, updating the current condition may include updating the current count threshold. In some embodiments, the processing device 120 may update the current count threshold by decreasing the current count threshold with a reduction. In some embodiments, the reduction of the current count threshold may be different in each iteration. In some embodiments, the reduction of the current count threshold may be the same in each iteration. In some embodiments, the reduction of the current count threshold in multiple iterations associated with gray values in the same interval may be the same.

In some embodiments, the processing device 120 may determine the reduction of the current count threshold for the current iteration based on the range of gray values (also referred to as grayscale distribution range of the grayscale histogram) in the target region (or the preprocessed target region) and/or and the altitude climb information of the grayscale histogram. In some embodiments, the grayscale distribution range of the grayscale histogram refers to a range from the minimum gray value to the maximum gray value in the grayscale histogram (or the preprocessed grayscale histogram). The altitude climb information may indicate a steep degree of the peaks in the grayscale histogram. By updating the count threshold according to the gray distribution range of the grayscale histogram and the altitude climb information of the grayscale histogram, the count threshold may be updated according to the specific shape of the grayscale histogram, which may ensure the updated count threshold as close as possible to an ideal value.

In some embodiments, the count threshold may be updated based on the grayscale distribution range of the grayscale histogram and the altitude climb information of the grayscale histogram, which may be applicable for a grayscale histogram with different shapes, for example, a shape including a sharp single peak or a shape including a multi-peak with a gentle large span. In some embodiments, the count threshold may be updated according to the shape of the grayscale histogram. For example, when the grayscale histogram includes a sharp single-peak, the reduction of the count threshold in each iteration may be determined only based on the altitude climb information of the histogram, and if the grayscale histogram has a gentle multi-peak, the reduction of the count threshold in each iteration may be determined according to the gray distribution range of the grayscale histogram.

In some embodiments, if the grayscale histogram is divided into the multiple intervals along the vertical axis, the reduction of the count threshold may be determined according to the grayscale distribution range and the altitude climb information according to Equation (13) as follows:

$$A1 = A2 - \frac{S \times \frac{n}{N}}{C1 - C2}, \quad (13)$$

where A1 denotes the updated count threshold, A2 denotes the current count threshold, S denotes the total count of pixels or effective pixels in the grayscale histogram, n denotes a count of intervals in which counts of pixels have been accumulated, N denotes the total count of the multiple intervals, C1 denotes the maximum gray value of the grayscale histogram, and C2 denotes the minimum gray value of the grayscale histogram. n/N corresponds to the climbing height information (e.g., the steep degree) of the grayscale histogram. (C1-C2) denotes the gray distribution range. (A2-A1) denotes the reduction of the count threshold in the current iteration. According to Equation (9), in the same interval, the reduction of the count threshold (A2-A1) may be constant, and in different intervals, the reduction of the count threshold (A2-A1) may be variable as the count of intervals in which counts of pixels have been accumulated changes. Specifically, in the same interval, in each iteration, the current threshold may be updated by decreasing with the same reduction and for different intervals, the reduction of the count threshold may be different. Specifically, along the vertical axis, in the interval with a lower height, the reduction of the count threshold may be smaller, and in the interval with a higher height, the reduction of the count threshold may be greater, thereby speeding up the termination of the iterative process.

In some embodiments, if the grayscale histogram is divided into the multiple intervals along the transverse axis, the reduction of the count threshold may be determined based on the gray distribution range and the degree of contraction toward the center of the grayscale histogram. The degree of contraction toward the center of the grayscale histogram may indicate a concentration degree of the distribution of gray values. Further, the processing device 120 may determine the reduction of the count threshold according to Equation (14) as follows:

$$B1 = B2 - \frac{Z \times \frac{x}{X}}{D1 - D2}, \quad (14)$$

where B1 denotes the updated count threshold, B2 denotes the current count threshold before updating, Z denotes the total count of pixels or effective pixels in the grayscale histogram, x denotes a count of intervals in which counts of pixels have been accumulated in the current iteration, X denotes the total count of the multiple intervals, D1 denotes the maximum gray value of the grayscale histogram, and D2 denotes the minimum gray value of the grayscale histogram. x/X indicates the degree of contraction toward the center. (D1-D2) denotes the gray distribution range. (B2-B1) denotes the reduction of the count threshold in the current iteration.

In 3512, the processing device 120 (e.g., the parameter determination module 3306) may terminate the iterative process.

In response to the determination that the accumulated count of pixels in the current iteration equals or exceeds the count threshold, the processing device 120 may terminate the iterative process.

In 3513, the processing device 120 (e.g., the parameter determination module 3306) may determine the at least one of the window width or the window level for the target region based on at least in part on the current gray value.

Figure 38:
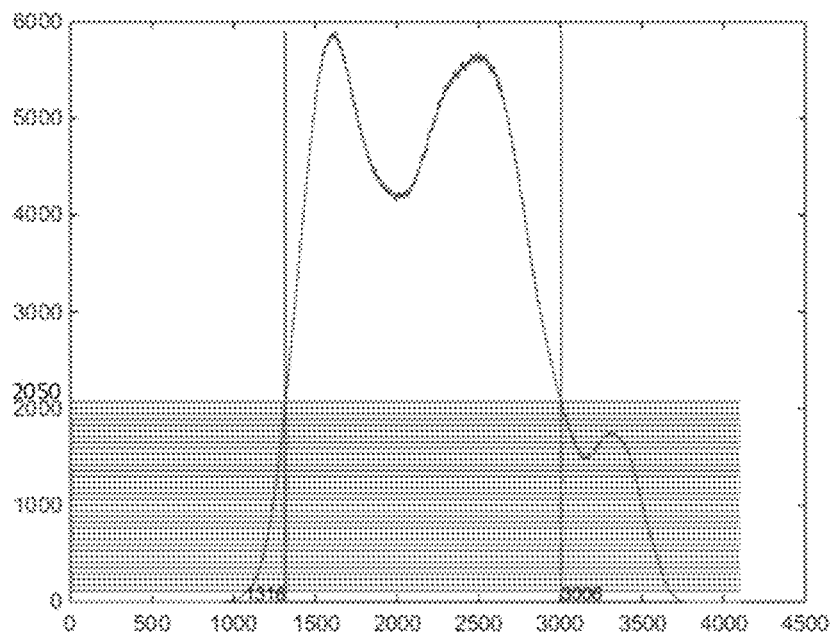

In some embodiments, when the grayscale histogram is divided along the vertical axis, if the current interval is located at the left side of the center of the histogram, the current gray value may be designated as a starting point of the window. A maximum gray value in the target region that belongs to the current interval may be designated as an end point of the window. If the current interval is located at the right side of the center of the grayscale histogram, the current gray value may be designated as the end point of the window. A maximum gray value in the target region that belongs to the current interval and is located at the left side of the grayscale histogram may be designated as the starting point of the window. For example, FIGS. 37 and 38 show an exemplary grayscale histogram according to some embodiments of the present disclosure. As shown in FIG. 37, the maximum count of pixels in the current interval is 1800. The accumulated count of pixels in the current interval on the left side of the grayscale histogram does not reach the count threshold and the gray value of 1294 is the last one gray value (i.e., a maximum gray value) in the current interval at the left side of the grayscale histogram. Then, the accumulation of the count of pixels may be performed from the right side to the center in the current interval and when the gray value is of 3166, the accumulated count of pixels in the current interval equals or exceeds the count threshold. The gray value of 1294 may be designated as the starting point of the window and the gray value of 3166 may be designated as the ending point of the window which are determined according to process 3500 based on the changed count threshold. As shown in FIG. 38, the starting point of the window corresponds to the gray value 1316, and the end point of the window corresponds to the gray value 3006 which are determined based on the unchanged count threshold. The gray value of the end point of the window on the right side of the grayscale histogram in FIG. 38 is smaller than the gray value of the end point of the window on the right side of the grayscale histogram in FIG. 37, i.e., the end point in FIG. 38 goes more toward the center than that in FIG. 37, which may cause pixels of the image whose gray values exceed the gray value of the end point of the window to be not visible or unclear. The updated count threshold in this disclosure may retain the part of the removed image that the user wants to see. It can avoid that the grayscale originally expected to be displayed is removed and not displayed, to ensure that the final display image may meet the needs, and the doctor does not need to perform the second adjustment process.

In some embodiments, when the grayscale histogram is divided along the transverse axis, if the current interval is located at the left side of the center of the histogram, the current gray value may be designated as a starting point of the window. A maximum gray value in the target region that belongs to a next interval that is located at the right side of the center of the histogram may be designated as an end point of the window. If the current interval is located at the right side of the center of the histogram, the current gray value may be designated as the end point of the window. A maximum gray value in the target region that belongs to a previous interval and located at the left side of the grayscale histogram may be designated as the starting point of the window. A difference between gray values corresponding to the starting point and the end point may be designated as the window width. A center between the gray values corresponding to the starting point and the end point may be designated as the window level (i.e., the center of the window width). For example, if the end point on the left side of the grayscale histogram is 1000 and the end point on the right side of the grayscale histogram is 4000, then the window width is 3000 and the window level is 2500.

Accordingly, although the initial count threshold also needs to be set according to experience at the beginning of the iterative process, the count threshold may be updated as closer and closer to the ideal value based on the gray value distribution of the target region in an image, which may improve the accuracy of the characteristic display parameter, thereby improving the display of the target region without the need for a second adjustment by an operator.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python, or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one storage device storing executable instructions, and
   at least one processor in communication with the at least one storage device, when executing the executable instructions, causing the system to perform operations including:
      obtaining an image of a subject;
      determining a plurality of image blocks in the image;
      extracting grayscale features from each of the plurality of image blocks, wherein the grayscale features include a grayscale feature of a first type and a grayscale feature of a second type;
      determining, based on the grayscale features, a relationship between the grayscale feature of the first type and the grayscale feature of the second type;
      determining, based on the relationship, a segmentation threshold; and
      segmenting, based on the segmentation threshold, the image.

2. The system of claim 1, wherein to determine a plurality of image blocks in the image, the at least one processor is configured to cause the system to perform the operations including:
   determining a first count of first lines along a first direction;
   determining a second count of second lines along a second direction; and
   dividing, based on the first count of first lines and the second count of second lines, the image into the plurality of image blocks.

3. The system of claim 1, wherein the grayscale feature of the first type includes a mean or median of gray values of pixels in an image block, and the grayscale feature of the second type includes a standard deviation or a variance of the gray values of the pixels in the image block.

4. The system of claim 1, wherein to determine a relationship between the grayscale feature of the first type and the grayscale feature of the second type, the at least one processor is configured to cause the system to perform the operations including:
   determining, based on the grayscale features, a plurality of points in a coordinate system associated with the grayscale feature of the first type and the grayscale feature of the second type, coordinates of each of the plurality of points representing the grayscale features; and
   determining, based on at least a portion of the plurality of points, the relationship between the grayscale feature of the first type and the grayscale feature of the second type using a fitting technique.

5. The system of claim 4, wherein the segmenting, based on the segmentation threshold, the image including determining one or more target regions from the images, and the fitting technique is determined based on a count of the one or more target regions.

6. The system of claim 4, wherein the at least one processor is configured to cause the system to perform the operations including:
   determining the at least a portion of the plurality of points by performing at least one of a downsampling operation or an operation for removing abnormal points.

7. The system of claim 6, wherein the operation for removing abnormal points includes:
   determining a range of grayscale features of the first type of the plurality of points;
   dividing the range of the grayscale features of the first type into multiple sub-ranges;
   for each of the multiple sub-ranges,
   determining a first mean of grayscale features of the second type of points each of whose grayscale feature of the first type is in the sub-range;
   classifying, based on the first mean, the points into multiple groups;
   determining a second mean of grayscale features of the second type of points in each of the multiple groups; and
   determining, based on the second mean, the abnormal points.

8. The system of claim 7, wherein
the multiple groups include a first group and a second group, the first group including points each of whose grayscale feature of the second type exceeds the first mean, and the second group including points each of whose grayscale feature of the second type is less than the first mean;

an abnormal point in the first group includes the grayscale feature of the second type that exceeds the second mean; and an abnormal point in the second group includes the grayscale feature of the second type that is less than the second mean.

9. The system of claim 1, wherein to determine, based on the relationship, the segmentation threshold, the at least one processor is configured to cause the system to perform the operations including:

determining, based on the relationship, a value of the grayscale feature of the first type when the grayscale feature of the second type is minimum or maximum; and designating the value of the grayscale feature of the first type as the segmentation threshold.

10. The system of claim 1, wherein the segmenting, based on the segmentation threshold, the image including:

determining, based on the segmentation threshold, a target region that includes a representation of the subject;

and the at least one processor is configured to cause the system to perform the operations including:

determining a distribution of gray values of pixels in the target region, the distribution indicating a count of pixels corresponding to each gray value in the target region;

determining, based on the distribution of the gray values of the pixels in the target region, a characteristic display parameter for the target region; and displaying, based on the characteristic display parameter, the image.

11. A method implemented on a computing device including at least a processor and a storage device, the method comprising:

obtaining an image of a subject;

determining a plurality of image blocks in the image;

extracting grayscale features from each of the plurality of image blocks;

determining, based on the grayscale features, a segmentation threshold;

determining, based on the segmentation threshold, a target region that includes a representation of the subject;

determining, based on gray values of pixels in the target region, a characteristic display parameter for the target region; and displaying, based on the characteristic display parameter, the image.

12. The method of claim 11, wherein the determining, based on gray values of pixels in the target region, a characteristic display parameter for the target region comprises:

determining a distribution of the gray values of pixels in the target region, the distribution indicating a count of pixels corresponding to each gray value in the target region;

determining, based on the distribution of the gray values of the pixels in the target region, the characteristic display parameter for the target region.

13. The method of claim 12, wherein the characteristic display parameter includes at least one of a window width or a window level for the target region.

14. The method of claim 13, wherein the determining, based on the distribution of the gray values of the pixels in the target region, the at least one of the window width or the window level for the target region includes:

performing an iterative process including a plurality of iterations, for each iteration of the iterative process, determining an accumulated count of pixels in a current iteration by summing a count of pixels corresponding to a current gray value with an accumulated count of pixels determined in a prior iteration;

determining whether the accumulated count of pixels in the current iteration satisfies a current condition;

in response to determining that the accumulated count of pixels in the current iteration does not satisfy the condition, designating a gray value in the target region as the current gray value; and updating the current condition;

terminating the iterative process until the accumulated count of pixels in the current iteration satisfies the current condition; and determining, based at least in part on the current gray value, the at least one of the window width or the window level for the target region.

15. The method of claim 14, wherein the distribution of the gray values of the pixels in the target region includes a grayscale histogram that includes a transverse axis denoting the gray values and a vertical axis denoting a count of pixels corresponding to each of the gray values.

16. The method of claim 15, wherein the performing an iterative process includes:

dividing the grayscale histogram along the vertical axis into multiple intervals, each of the multiple intervals including a range of counts of pixels of certain gray values; and the designating a gray value in the target region as the current gray value including:

determining the gray value according to at least one of a first rule or a second rule, wherein the first rule relates to determining an interval from the multiple intervals from a bottom interval to a top interval along the vertical axis in sequence, and the second rule relates to determining the gray value in the interval from two sides to a center of the transverse axis.

17. The method of claim 16, wherein the determining, based at least in part on the current gray value, the at least one of the window width or the window level for the target region includes:

determining that the current gray value is located on a left side of the center of the transverse axis;

designating the current gray value as a first end of the window width if the current gray value is located on the left side of the center of the transverse axis; and designating a gray value corresponding to a same interval as the current gray value as a second end of the window width, the second end of the window width being located on a right side of the center of the transverse axis.

18. The method of claim 16, wherein the current condition includes a count threshold, and the updating the current condition includes:

decreasing, based on a range of the gray values in the grayscale histogram, a total count of pixels in the grayscale histogram, and an interval corresponding to the current gray value, and a count of the multiple intervals, the count threshold.

19. The method of claim 11, further comprising:
segmenting the image based on the segmentation threshold.

20. A non-transitory computer readable medium storing instructions, the instructions, when executed by at least one processor, causing the at least one processor to implement a method comprising:
obtaining an image of a subject;
determining a plurality of image blocks in the image;
extracting grayscale features from each of the plurality of image blocks, wherein the grayscale features include a grayscale feature of a first type and a grayscale feature of a second type;
determining, based on the grayscale features, a relationship between the grayscale feature of the first type and the grayscale feature of the second type;
determining, based on the relationship, a segmentation threshold; and
segmenting, based on the segmentation threshold, the image.

* * * * *